US 7,491,791 B2

(12) United States Patent
Cody et al.

(10) Patent No.: US 7,491,791 B2
(45) Date of Patent: Feb. 17, 2009

(54) METHOD FOR PRODUCING SUBMICRON POLYTETRAFLUOROETHYLENE POWDER AND PRODUCTS THEREOF

(75) Inventors: Charles A. Cody, Robbinsville, NJ (US); William Neuberg, Perrineville, NJ (US); Manshi Sui, Hillsborough, NJ (US); Youssef Awad, North Brunswick, NJ (US); Paul Carey, Montclair, NJ (US)

(73) Assignee: Shamrock Technologies Inc., Newark, NJ (US)

( * ) Notice: Subject to any disclaimer, the term of this patent is extended or adjusted under 35 U.S.C. 154(b) by 164 days.

(21) Appl. No.: 10/543,514

(22) PCT Filed: Jan. 26, 2004

(86) PCT No.: PCT/US2004/002209

§ 371 (c)(1),
(2), (4) Date: Aug. 23, 2006

(87) PCT Pub. No.: WO2004/067608

PCT Pub. Date: Aug. 12, 2004

(65) Prior Publication Data

US 2007/0072956 A1 Mar. 29, 2007

Related U.S. Application Data

(60) Provisional application No. 60/442,829, filed on Jan. 27, 2003, provisional application No. 60/473,102, filed on May 23, 2003.

(51) Int. Cl.
*C08F 6/00* (2006.01)
*C08F 6/22* (2006.01)

(52) U.S. Cl. ............... 528/480; 428/402; 524/356; 524/366; 524/379; 528/483; 528/486; 528/491; 528/493; 528/495; 528/497; 528/499

(58) Field of Classification Search ............... 428/402; 524/356, 366, 379; 528/483, 486, 491, 493, 528/495, 497, 499, 480

See application file for complete search history.

(56) References Cited

U.S. PATENT DOCUMENTS

| 3,766,031 | A | | 10/1973 | Dillon | |
| 3,838,030 | A | * | 9/1974 | Kagiya et al. | 522/156 |
| 4,029,870 | A | | 6/1977 | Brown et al. | 526/255 |
| 4,036,718 | A | | 7/1977 | Brown et al. | 204/159.2 |
| 4,052,278 | A | | 10/1977 | Brown et al. | 204/159.2 |
| 4,287,032 | A | | 9/1981 | Pellegri | |
| 4,748,005 | A | | 5/1988 | Neuberg et al. | 422/186 |
| 4,777,192 | A | | 10/1988 | Neuberg et al. | 522/156 |
| 4,888,122 | A | | 12/1989 | McCready | 508/165 |
| 5,149,727 | A | | 9/1992 | Luniewski | 522/156 |
| 5,181,268 | A | | 1/1993 | Chien | 385/128 |
| 5,296,113 | A | | 3/1994 | Luniewski | 204/157.15 |
| 5,616,648 | A | * | 4/1997 | Wu | 524/805 |
| 5,891,573 | A | * | 4/1999 | Neuberg et al. | 428/402 |
| 5,968,997 | A | | 10/1999 | Luniewski et al. | 522/156 |
| 6,013,795 | A | | 1/2000 | Manzara et al. | |
| 6,274,254 | B1 | | 8/2001 | Abys et al. | |
| 6,881,784 | B2 | * | 4/2005 | Cody et al. | 524/794 |
| 2003/0199639 | A1 | | 10/2003 | Coats | |

FOREIGN PATENT DOCUMENTS

| JP | 48-38340 | 6/1973 |
| JP | 2000-26614 | 1/2000 |
| JP | 2001-513579 | 9/2001 |
| WO | WO 00/07549 | 2/1999 |
| WO | PCT/US03/31263 | 10/2003 |
| WO | PCT/US03/31264 | 10/2003 |

OTHER PUBLICATIONS

Supplementary European Search Report dated Oct. 21, 2008 corresponding to European Patent Application No. 04705334.3.
U.S. Appl. No. 10/389,569, filed Mar. 2003, Cody.
International Search Report for PCT/US04/02209 dated.

* cited by examiner

*Primary Examiner*—Terressa M Boykin
(74) *Attorney, Agent, or Firm*—Ostrolenk, Faber, Gerb & Soffen, LLP

(57) ABSTRACT

A method for treating polytetrafluoroethylene (PTFE) in its reactor latex form to produce a dry submicron PTFE powder that remains stable without rheology modifiers, surfactants, wetting agents, pH adjusters or other stabilizing additives. Reactor latex PTFE formed during an emulsion polymerization process can be irradiated, with an electron beam or gamma rays, during or after the polymerization to form a product where the dry submicron PTFE powder is free-flowing, tends not to self-agglomerate and tends not to dust into the air upon handling so that the PTFE is readily dispersible when placed in a desired application system or medium.

19 Claims, 51 Drawing Sheets

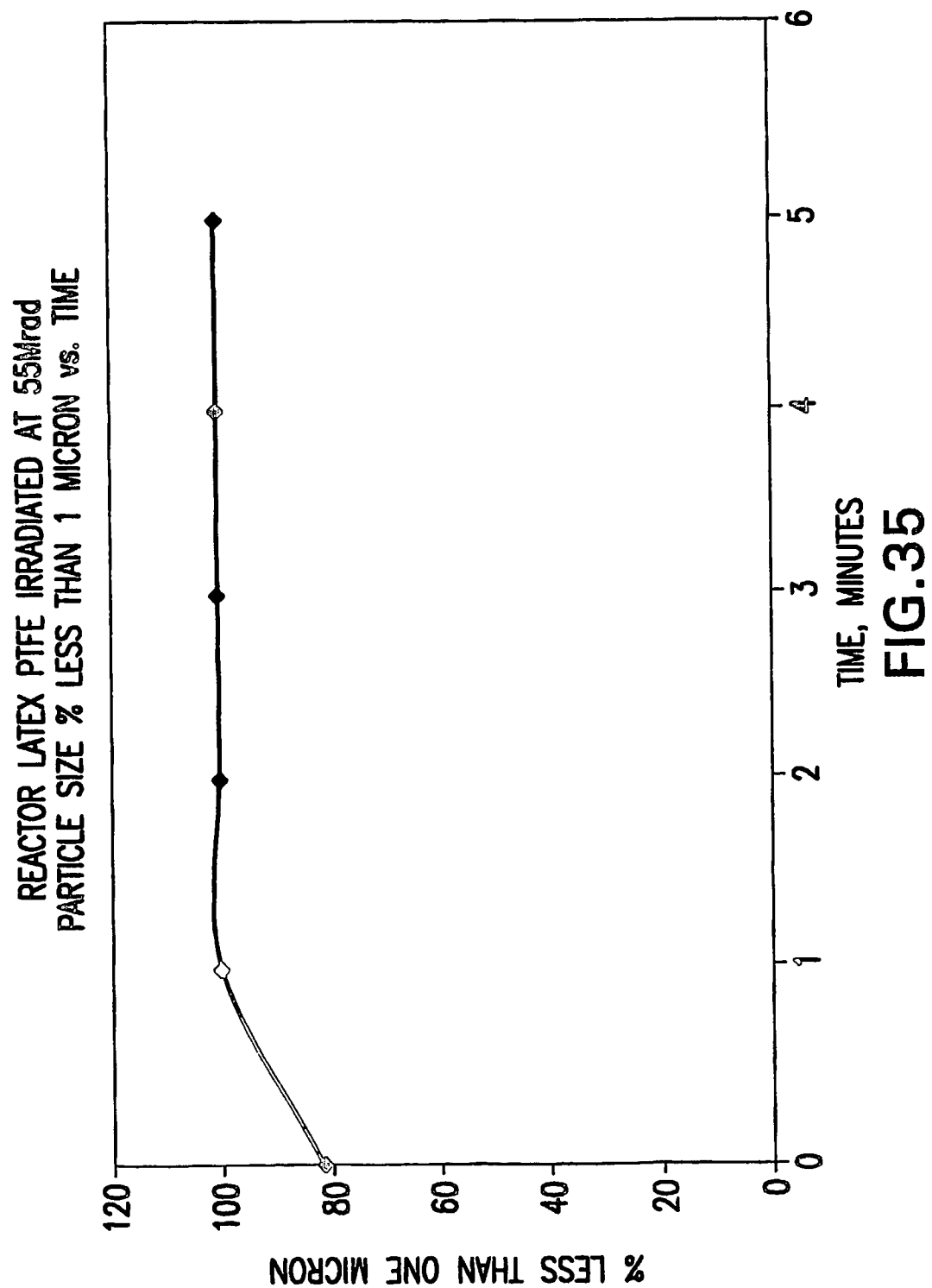

METHOD FOR PRODUCING SUBMICRON POLYTETRAFLUOROETHYLENE POWDER AND PRODUCTS THEREOF

CROSS REFERENCE TO RELATED APPLICATION

The present application is a 35 U.S.C. § 371 national phase conversion of PCT/US2004/002209 filed 26 Jan. 2004, which claims priority of U.S. provisional application Ser. No. 60/442,829 filed Jan. 27, 2003 and U.S. provisional application Ser. No. 60/473,102 filed May 23, 2003, both of which are incorporated by reference herein in their entireties.

FIELD OF THE INVENTION

The present invention generally relates to an improved method for producing submicron polytetrafluoroethylene (PTFE) powder. More particularly, the present invention relates to a method whereby submicron PTFE powder is formed via the irradiation of PTFE in its reactor latex form. In addition, the present invention relates to the submicron PTFE powder formed according to the method disclosed herein, wherein the powder is free-flowing, is readily-dispersible in a desired application system, has little tendency to self-agglomerate, and has little tendency to dust into the air upon handling. Furthermore, the present invention relates to an improved method of dispersing PTFE particles to submicron size in aqueous and organic dispersion media as well as the dispersions formed according to such method.

BACKGROUND OF THE INVENTION

Polytetrafluoroethylene (PTFE) in its reactor latex form and methods for making such reactor latex PTFE materials are generally known in the art. As used herein, the phrases "PTFE in its reactor latex form" and "reactor latex PTFE" describe a suspension, in water, of PTFE particles in their primary particle size, that results from the synthesis of PTFE via an emulsion polymerization process. The term "latex" is commonly used in the art to describe a water emulsion of a synthetic rubber or plastic obtained by polymerization or a dispersion of polymerization products or rubber-like substances.

Often, the primary particle size of the PTFE particles in reactor latex PTFE is from about 0.1 μm to about 0.5 μm. Samples of reactor latex PTFE typically comprise from about 10% to about 40% by weight solid PTFE particles in water.

Many such reactor latex PTFE materials are characteristically unstable over extended periods of time and with changing temperature. For example, the PTFE particles in some reactor latex products may collapse in a time period as short as ten days, even when the products are maintained at a low temperature. In addition, the PTFE particles in known reactor latex PTFE products tend to collapse, coagulate, or smear when subjected to mild physical agitation, vibration, or mechanical handling. This characteristic instability leads to disadvantages in the ability to use the PTFE particles in such products, since collapsed, coagulated or smeared PTFE particles do not readily disperse in target application systems.

Therefore, in the past, when it has been desired to use reactor latex PTFE products to create a useful PTFE dry powder product or a useful liquid PTFE dispersion, it has often been necessary to add rheological modifiers, surfactants, pH-modifying agents, and the like to such products to enable the formation of a viable PTFE "end product." The PTFE end products would have to be maintained at a low temperature. Thus, previously known processes involving the formation of a useful PTFE end product from reactor latex PTFE starting material often have been costly and time consuming. A reference that discusses formation of PTFE via emulsion polymerization is S. Ebnesajjad, "Fluoroplastics Volume 1: Non-Melt Processible Fluoroplastics, The Definitive User's Guide and Databook", Plastics Design Library (2000), incorporated by reference herein.

The above recitation reveals that a need exists for a method by which PTFE in its reactor latex form may be treated and subsequently recovered in order to form a submicron PTFE powder that is stable and is easily dispersible in various application systems, such as aqueous and organic media.

Irradiation using electron beam radiation or gamma ray radiation is a key step in the method of the present invention. Previously described processes and patented disclosures have discussed the importance of irradiation in the formation of useful PTFE end products. However, such disclosures focus on irradiating a dry, powder PTFE material.

For example, an early description of the irradiation of PTFE is contained in U.S. Pat. No. 3,766,031 to Dillon, the specification of which is hereby incorporated by reference herein in its entirety, which describes how PTFE may be placed in trays and subjected to irradiation.

Furthermore, U.S. Pat. Nos. 4,748,005 and 4,777,192 to Neuberg et al., owned by the assignee of the present invention and hereby incorporated by reference herein in their entirety, disclose commercial batch processing of PTFE, wherein PTFE material is placed in a ribbon blender and electron beam irradiation is directed into a portion of the blender while the PTFE material is agitated by the blender.

Other U.S. patents disclosing methods of irradiating PTFE particles and apparatuses used for the irradiation of PTFE particles include U.S. Pat. Nos. 5,149,727, 5,296,113 and 5,968,997 to Luniewski et al., the specifications of which are hereby incorporated by reference herein in their entirety.

In contrast to the present invention, the irradiation of a dry, powder PTFE material in ambient air (where oxygen, $O_2$, is readily available) allows for the $O_2$ in the air to interact with the dry PTFE and form end groups (for example, —COF groups) at the ends of the PTFE polymer chains. Such end groups then react with water to form —COOH groups.

Other methods have been described in the art for making PTFE powder that is readily dispersible to submicron-sized particles in a target application system. For example, the methods described in co-assigned U.S. patent application Ser. No. 10/389,569 filed on Mar. 14, 2003 reveal ways in which submicron PTFE powder can be formed. However, such methods often involve processing steps, such as grinding in a solvent and the like, which may increase the amount of time and expense necessary to form readily dispersible submicron PTFE powder from a PTFE starting material.

Generally, the formation of a readily dispersible submicron PTFE powder is important because so many end uses exist for submicron or small particle size PTFE powder products. For example, PTFE powder products may be used in the formation of PTFE tape, PTFE tubing, and sintered PTFE sheets or tape. Furthermore, small amounts (e.g., about 0.1 to 2% by weight) of powdered PTFE may be incorporated into a variety of compositions to provide the following favorable and beneficial characteristics: (i) in inks, PTFE provides excellent mar and rub resistance characteristics; (ii) in cosmetics, PTFE provides a silky feel; (iii) in sunscreens, PTFE provides increased shielding from UV rays or increased SPF (sun protection factor); (iv) in greases and oils, PTFE provides superior lubrication; and (v) in coatings and thermoplastics, PTFE provides improved abrasion resistance, chemical resistance, weather resistance, water resistance, and film hardness.

Other, more specific end uses for submicron PTFE powders and dispersions include, but are certainly not limited to: (i) incorporating a uniform dispersion of submicron PTFE particles into electroless nickel coatings to improve the friction and wear characteristics of such coatings (Hadley et al., *Metal Finishing*, 85:51-53 (December 1987)); (ii) incorporating submicron PTFE particles into a surface finish layer for an electrical connector contact, wherein the PTFE particles provide wear resistance to the surface finish layer (U.S. Pat. No. 6,274,254 to Abys et al.); (iii) using submicron PTFE particles in a film-forming binder as a solid lubricant in an interfacial layer, wherein the interfacial layer is part of an optical waveguide fiber (U.S. Pat. No. 5,181,268 to Chien); (iv) using a submicron PTFE powder (along with a granulated PTFE powder and $TiO_2$) in a dry engine oil additive, wherein the additive increases the slip characteristics of the load bearing surfaces (U.S. Pat. No. 4,888,122 to McCready); and (v) combining submicron PTFE particles with autocatalytically-applied nickel/phosphorus for use in a surface treatment system for metals and metal alloys, wherein the PTFE imparts lubrication, low friction, and wear resistance to the resulting surface ("Niflor Engineered Composite Coatings," Hay N., International, Ltd. (1989)). Additional specific examples of end uses for PTFE involve incorporating PTFE into engine oils, using PTFE as a thickener in greases, and using PTFE as an industrial lubricant additive. Wilson, *Industrial Lubrication and Tribology*, 44:3-5 (March/April 1992).

Furthermore, the use of dispersible submicron PTFE powder as an additive to the polymers used to make certain fibers is important in that the PTFE powder improves the non-wetting properties and lowers the coefficient of friction of the fibers and the textiles made from such fibers. Thus, fibers incorporating dispersible submicron PTFE powder are useful in industrial textiles such as textile articles used for filtration and dewatering processes. Such fibers incorporating dispersible PTFE powder may also be used in producing carpets, fabrics for sportswear and outerwear, hot-air balloons, car and plane seats, umbrellas, and the like. The incorporation of PTFE into such textiles results in many advantages, such as the textile articles being easier to clean, having a decreased coefficient of friction, and having improved wear resistance. Attention is invited to International patent application No. PCT/US03/31263 and International patent application No. PCT/US03/31264, both of which were filed on Oct. 1, 2003 for more discussion of the use of PTFE powder that is dispersible to submicron in size in making synthetic fibers.

For many applications or end uses incorporating submicron PTFE powder and submicron PTFE dispersions, such as the end uses described above, the beneficial effects being imparted to the application system are derived from the chemical inertness of the PTFE particles and/or the low coefficient of friction of the PTFE particles. In addition, because submicron PTFE particles have such low particle size, they possess a significantly higher ratio of surface area to weight when compared to larger PTFE particles. Thus, submicron PTFE particles (as compared to larger PTFE particles) are better able to supply their useful effects to a desired application system when incorporated at the same weight load. Therefore, novel methods for preparing submicron PTFE powders and submicron PTFE dispersions are quite advantageous for many end uses, products and compositions.

In short, a need exists for a method whereby PTFE in its reactor latex form may be treated and subsequently recovered to produce a PTFE powder that is readily dispersible as submicron sized particles in a target application system. In addition, a need exists for a method of preparing submicron PTFE powder from the reactor latex form of PTFE. wherein the resulting submicron PTFE powder is free-flowing, is readily dispersible in desired application systems, and tends not to self-agglomerate, so that neither costly chemical additives nor a substantial amount of time or mechanical energy is required to disperse the submicron PTFE powder into a desired application system. The present invention addresses these concerns by disclosing a method of producing a stable submicron PTFE that is readily dispersible as submicron sized particles in a target application. Specifically, the submicron PTFE produced in the method of the present invention dispersed in a target application will provide favorable and beneficial characteristics such as (i) excellent mar and rub resistance characteristics in inks; (ii) a silky fee in cosmetics; (iii) increased shielding from UV rays in sunscreens; (iv) superior lubrication in greases and oils; (v) improved abrasion resistance, chemical resistance, weather resistance, water resistance, and film hardness in coatings and thermoplastics; and (vi) increased UV stability and tensile strength in fibers.

SUMMARY OF THE INVENTION

The present invention generally relates to a method for treating PTFE in its reactor latex form and subsequently recovering the PTFE particles in a dry powder form to result in a submicron PTFE powder that is readily dispersible in a desired application system. In addition, the present invention relates to the submicron PTFE powder product formed according to the present method, wherein the submicron PTFE powder is free-flowing, tends not to self-agglomerate, is readily dispersible when placed in a desired application system, and tends not to dust into the air upon handling.

As used herein, the common chemical shorthand term "PTFE" is used to denote polytetrafluoroethylene. However, for simplicity, the general term "PTFE" is also used herein to describe copolymers wherein the bulk of the copolymer material is polytetrafluoroethylene. For example, the term "PTFE" is used herein to denote polytetrafluoroethylene that is copolymerized with, or further comprises, the following polymers: fluorinated ethylene-propylene copolymer ("FEP"); perfluoroalkoxy resin ("PFA"), which is a copolymer of tetrafluoroethylene and perfluorovinylethers ethylene-tetrafluoroethylene copolymer ("ETFE"); polychlorotrifluoroethylene ("PCTFE"); "ECTFE," which is the copolymer of ethylene and chlorotrifluoroethylene; polyvinylidene fluoride ("PVDF"); and polyvinyl fluoride ("PVF"). Where the term "PTFE" is used herein to describe polytetrafluoroethylene that is copolymerized with one of the above-named polymers, it is contemplated that the actual polytetrafluoroethylene content in the copolymer is about 70% or more by weight.

It is also contemplated that polychlorotrifluoroethylene (PCTFE), as well as PCTFE copolymerized with ethylene (ECTFE) and PCTFE copolymerized with vinylidene fluoride (VDF) may be substituted for PTFE or the above listed PTFE copolymers and this modification will remain within the scope of the present invention.

Furthermore, with respect to the terminology used herein, the phrase "dry submicron PTFE powder" denotes the PTFE powder end-product resulting from the method of the present invention, wherein the PTFE particles are dispersible to submicron size when the dry submicron PTFE powder is dispersed into a chosen application system.

The PTFE starting material that is first provided in the method of the present invention is reactor latex PTFE, which typically comprises about 10% to about 40% solid PTFE in water. Typically, the PTFE particles in the PTFE reactor latex starting material have a primary particle size of less than 1.0 µm and more particularly, a primary particle size of from about 0.1 µm to about 0.5 µm. The particle size is determined from an average of the distribution of particle sizes in a given sample of material.

In preferred embodiments of the present invention, the PTFE reactor latex starting material is the reaction product of an emulsion polymerization process. Note that the conditions of the emulsion polymerization reaction that forms the starting material may vary, and certain alterations to the polymerization conditions may produce PTFE reactor latex material having a primary particle size (i.e., 0.05 µm) that is even lower than that described above. Therefore, the method of the present invention may result in PTFE powder that is dispersible to almost any particle size below 1.0 µm.

In preferred embodiments of the present method, the reactor latex PTFE starting material is irradiated with electron beam radiation at a dosage of from about 5 to about 120 megarads, preferably from about 15 to about 120 megarads, and most preferably from about 25 to about 120 megarads. In another preferred embodiment of the present invention, the PTFE reactor latex material is irradiated using gamma ray radiation.

In particularly preferred embodiments, the irradiation of the reactor latex PTFE material takes place after the emulsion polymerization reaction that synthesizes the reactor latex material. However, it is contemplated that in alternative embodiments, the irradiation may take place during the emulsion polymerization reaction so that the resulting reactor latex material is already irradiated at the conclusion of the reaction.

Since the reactor latex PTFE comprises PTFE particles suspended in water, the irradiation of the PTFE particles differs from the irradiation of dry PTFE particles discussed in detail in the Background section above. Specifically, because the irradiation takes place in an aqueous environment where oxygen is not as readily available as it is in ambient air, the formation of certain end groups (such as —COF groups, which typically go on to react with water and form —COOH groups) is prevented.

Following the step of irradiation, certain embodiments of the present invention provide for the immediate use of the irradiated PTFE reactor latex material as part of a dispersion. Specifically, if the emulsion reactants are irradiated after polymerization or if the emulsion reactants are irradiated during polymerization, the irradiated PTFE reactor latex material may be used as a 25% dispersion (FIG. 1).

In other embodiments, the irradiated PTFE reactor latex material may be concentrated to form a non-agglomerating dispersion so the PTFE concentration increases to 50 to 70% solid material by weight. In certain embodiments, the concentrated, irradiated PTFE reactor latex material may then be used as a 60-70% concentrated dispersion. In a further embodiment, this concentrated PTFE may be used as an intermediate step before recovering the dry submicron PTFE powder that will readily disperse to submicron PTFE.

In particularly preferred embodiments, however, the concentrated, irradiated PTFE reactor latex material moves on to a step whereby the solid PTFE is recovered from the aqueous concentrate. The recovery of the dry submicron PTFE powder may take place in any known fashion, such as by filtration and drying, by evaporation of the water, by centrifugation and subsequent filtration and drying, etc.

The dry submicron PTFE powder of the present invention is readily dispersible to submicron-sized particles when dispersed into a desired application system. The method for determining whether or not the dry submicron PTFE powder is sufficiently dispersible involves particle size analysis of the PTFE particles when the powder is dispersed into the desired application system. For example, if a need exists for a fine PTFE powder that is dispersible in isopropyl alcohol (IPA) so that about 100% of the PTFE particles are less than 1.00 µm in size when in the IPA, one would use the method of the present invention to form dry submicron PTFE powder, disperse a sample of the powder in a sample of IPA, and perform particle size analysis on the dispersed sample. Such particle size analysis may be done using a standard Malvern particle size analyzer, discussed in more detail below.

After the PTFE reactor latex material is irradiated, concentrated, dried and recovered as dry submicron PTFE powder, it is dispersed into a desired application system. It is typically observed that the dispersed PTFE particles nearly all have a particle size of less than 1.00 µm. Thus, unexpectedly, the dry submicron PTFE powder formed according to the method of the present invention is readily dispersible into many desired application systems and requires only a low level of mixing or agitation of the powdered agglomerate in the chosen application system. This dispersion of the dry submicron PTFE powder into, for example, a solvent, a resin, a coating, or another desired application system allows the PTFE powder to disperse into submicron-sized PTFE particles.

The method of the present invention possesses certain advantages over known methods of producing submicron PTFE powders and dispersions. For example, the present method does not require the addition of surfactants, wetting agents, rheology agents or modifiers, or pH-adjusting agents. However, the aforementioned agents (and other agents) may be added if desired or needed in the particular application system chosen by the user.

Furthermore, the submicron PTFE powder resulting from this method is free-flowing and has little tendency to form self-agglomerating products that will not disperse into a desired application system. Moreover, the submicron PTFE, produced in the method of the present invention, dispersed into a desired application system will provide favorable and beneficial characteristics such as (i) excellent mar and rub resistance characteristics in inks; (ii) a silky fee in cosmetics; (iii) increased shielding from UV rays in sunscreens; (iv) superior lubrication in greases and oils; (v) improved abrasion resistance, chemical resistance, weather resistance, water resistance, and film hardness in coatings and thermoplastics; and (vi) increased UV stability and tensile strength in fibers. Not wishing to be bound by theory, it is believed that the step of irradiating the PTFE reactor latex material alters the consistency of the primary PTFE particles so that the PTFE particles are more readily dispersible and do not exhibit their typical tendencies to display stickiness and fibrillation.

The present invention is. further described below with respect to the specific embodiments disclosed herein.

BRIEF DESCRIPTION OF THE DRAWINGS

Further objects and advantages of the present invention will be more fully appreciated from a reading of the detailed description when considered with the accompanying drawings, wherein:

FIG. 35 shows a graph of the percentage of PTFE particles from reactor latex PTFE irradiated at 55 Megarads, with a particle size less than 1.00 µm in size vs. time of sonication.

DETAILED DESCRIPTION OF THE INVENTION

Figure 1:
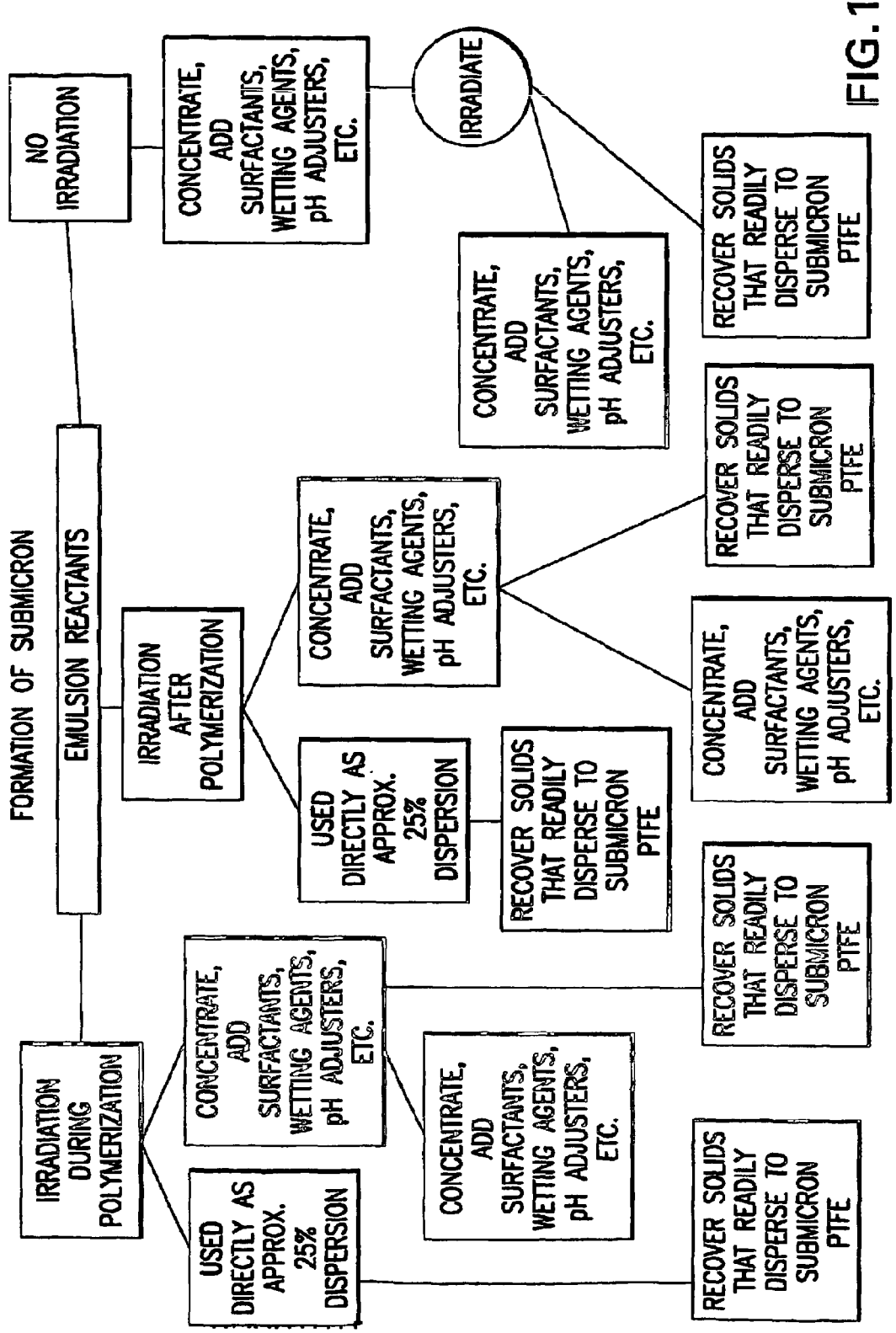
FIG. 1 shows a flow diagram representing the steps in various embodiments of the method of the present invention.

The present invention discloses a method for treating PTFE in an environment that suppresses surface oxidation of the PTFE raw material to prepare a dry submicron PTFE powder that is readily dispersible in a desired application system. The environment may, for example, be aqueous. In one inventive method PTFE in its reactor latex is used as the raw material and treated. Processed raw material is subsequently recovered as PTFE particles in a dry powder form from which submicron sized PTFE particles are readily dispersible in a desired application system. In addition, the present invention relates to the dry submicron PTFE powder formed according to the present method, where the dry submicron PTFE powder is free-flowing, has little tendency to dust into the air upon handling, and has little tendency to self-agglomerate when placed in a desired application system or medium.

As discussed earlier, the PTFE starting material that is first provided for use in the present method is reactor latex PTFE, which typically comprises from about 10% to about 40% solid PTFE in water. This PTFE reactor latex starting material may be formed via an emulsion polymerization reaction.

Examples of PTFE starting material that may be employed in the present invention include commercially available products. It should be noted that because of its extreme instability, most commercially available reactor latex PTFE contains rheology modifiers, surfactants, wetting agents, pH adjusters, etc. In an exemplary embodiment of the present invention the reactor latex PTFE is irradiated before the addition of any rheology modifiers, surfactants, wetting agents, pH adjusters, etc., to make a dry submicron PTFE powder that is stable without the need of these additives. However, in a further embodiment of the present invention a stabilized reactor latex, i.e. a reactor latex with additives, may be irradiated to form a dry submicron PTFE powder.

Additional examples of commercially available PTFE reactor latex starting materials that are appropriate for use in the present invention may be found in S. Ebnesajjad, "Fluoroplastics Volume 1: Non-Melt Processible Fluoroplastics, The Definitive User's Guide and Databook", Plastics Design Library (2000), which is incorporated by reference herein in its entirety.

As explained in detail above, the term "PTFE" is used herein to denote polytetrafluoroethylene as well as various copolymers, wherein the bulk of the copolymer material is polytetrafluoroethylene, and more particularly, copolymers wherein about 70% by weight or more of the copolymer content is polytetrafluoroethylene.

In one preferred embodiment of the present invention, the PTFE reactor latex material is irradiated using electron beam radiation. In another preferred embodiment of the present invention, the PTFE reactor latex material is irradiated using gamma ray radiation.

In the method of the present invention, the resulting dry submicron PTFE powder should have a fluffy consistency and should only require minimal shaking, for example, in a plastic bag, in order to eliminate any weak agglomerates formed by the particles. Alternatively, the resulting dry submicron PTFE powder sample may be passed through an apparatus commonly used to powder material in order to eliminate any weak agglomerates formed by the collection process. For example, the dry submicron PTFE powder sample may be passed through an air mill for one pass in order to eliminate any weak agglomerates formed by the collection process. The resulting product formed according to the above method should then be submicron PTFE powder that is readily dispersible.

The dry submicron PTFE powder formed according to the method of the present invention has the desired characteristics of being free-flowing and tending not to self-agglomerate. Thus, the resulting dry submicron PTFE powder has an increased ability to disperse in a chosen application system or target medium. The increased ability to disperse in a chosen application system better enables the dry submicron PTFE powder formed according to the present method to impart desired characteristics to that system.

In a further embodiment of the present invention, surfactants, wetting agents and suspension aids can be employed with the dry submicron PTFE powder to lessen any long term tendency to self agglomerate in the chosen application system or target medium.

In the method of the present invention, an important step involves the determination of the particle size of the dry submicron PTFE powder particles in order to confirm that they are submicron in size. Specifically, the terms "submicron" and "submicron in size" are used herein to describe particle size analysis results for samples of the PTFE powder resulting from the present method, wherein 85% or more by numerical count of the PTFE particles in the particle size test medium are less than 1.00 μm in size, more preferably, wherein 90% or more by numerical count of the PTFE particles in the particle size test medium are less than 1.00 μm in size, and most preferably, wherein 95% or more by numerical count of the PTFE particles in the particle size test medium are less than 1.00 μm in size.

In certain preferred embodiments of the present invention, the particle size analysis of the resulting submicron PTFE powder particles is carried out using a Malvern Mastersizer 2000 Particle Size Analyzer, which is a laser scattering particle size distribution analyzer, commercially available from Malvern Instruments Ltd. in Malvern, UK. Several distinct procedures are used for particle size analysis of the PTFE particles, depending on whether the sample of the resulting submicron PTFE powder to be analyzed is in dry form or has been dispersed into a particular liquid dispersant.

When samples of the dry submicron PTFE powder formed according to the present method are analyzed, a standard operating procedure may be set up. For example, in certain preferred embodiments, the dry powder PTFE QSOP ("Quality Standard Operating Procedure") that is stored in the Malvern Mastersizer may be selected in order to perform the particle size analysis of the dry submicron PTFE powder particles. This QSOP is outlined in Table 1 below:

TABLE 1

QSOP for Particle Size Analysis of Dry Submicron PTFE Powder

| Criteria | Setting | Value |
| --- | --- | --- |
| Sample Selection | Scirocco 2000(A) | |
| Material | PTFE | |
| | Refractive Index | 1.38 |
| | Absorption | 0.1 |
| Labels | Factory Settings | |
| Reports & Saving | Factory Settings | |
| Measurement | Measurement Time | 12 seconds |
| | Measurement Snaps | 12,000 |
| Background | Background Time | 12 seconds |
| | Background Snaps | 12,000 |
| Sample Settings | Sample Tray | General Purpose (<200 g) |
| | Dispersive Air Pressure | 4 Bar |
| | Aliquots | Single |
| | Feed Rate | 79% |
| | Measurement Cycle | Single |

Specifically, the Mastersizer employs a Scirocco 2000 dry accessory when samples of dry submicron PTFE powder are being studied. In preferred embodiments, the lid of the Scirocco 2000 is opened, approximately 2 grams of the dry submicron PTFE powder sample are added to the sample tray, and the lid is closed. The Mastersizer 2000 software program may then be opened by selecting the appropriate icon. The desired SOP is selected (here, the QSOP for dry submicron PTFE powder), and the sample information is then entered. The particle size analysis is then begun by pressing start.

In preferred embodiments, the particle size analysis of the dry submicron PTFE powder is repeated approximately 5 times, with an overall recording time of about 1 minute, in order to average out small deviations in the particle size measurements.

When the dry submicron PTFE powder formed according to the present invention is dispersed in a particular liquid application system or dispersant, distinct procedures for measuring the particle size of the PTFE particles are used, depending on what liquid is chosen as the dispersant for the dry submicron PTFE powder. The Malvern Mastersizer 2000 is still used for particle size analysis of the liquid dispersions of the PTFE powder; however the Hydro 2000S is used rather than the Scirocco 2000 dry accessory. Furthermore, during all particle size analyses with the Malvern Mastersizer, for samples wherein the submicron PTFE powder has been dispersed into a liquid application system, a carrier solution is required.

In embodiments where IPA is selected as the "dispersant" (or the liquid medium into which the submicron PTFE powder is dispersed for particle size analysis), approximately 2 grams of the dry submicron PTFE powder may be placed into a plastic 20 mL-capacity cuvette, and the cuvette may be filled with IPA up to the 20 mL mark. Thus, IPA serves as the carrier solution. Optionally, about 0.2 grams of Surfynol TG-E surfactant (STGE) may be added to the IPA carrier solution. STGE is a nonionic surfactant, manufactured by Air Products and Chemical, Inc., which aids in rapidly dispersing and maintaining the dispersion of the submicron PTFE as it is incorporated into the chosen carrier solution. The cuvette is then capped securely and is shaken for about 30 seconds to disperse the sample of the dry submicron PTFE powder into the IPA. Subsequently, the cuvette is opened, and the sample is sonicated for about 1 minute. In other embodiments, about 2% by weight of the dry submicron PTFE powder is added to a given volume of IPA, and the powder is mixed with the IPA using a blender or a high-speed disperser for about 3-5 minutes. The Mastersizer 2000 software program may then be opened by selecting the appropriate icon. The desired SOP is set up (here, the SOP for submicron PTFE powder dispersed in IPA), and the sample information is then entered. The SOP for the Malvern Mastersizer that is used in measuring the particle size of submicron PTFE powder particles dispersed in IPA is outlined in Table 2 below.

TABLE 2

SOP for Particle Size Analysis: Dry Submicron PTFE Powder Dispersed in IPA

| Criteria | Setting | Value |
|---|---|---|
| Sample Selection | Hydro 2000S(A) | |
| Material | PTFE | |
| | Refractive Index | 1.38 |
| | Absorption | 0.1 |
| Dispersant Name | IPA | |
| | Refractive Index | 1.39 |
| | Absorption | 0.1 |
| Labels | Factory Settings | |
| Reports & Saving | Factory Settings | |
| Measurement | Measurement Time | 6 seconds |
| | Measurement Snaps | 6,000 |
| Background | Background Time | 6 seconds |
| | Background Snaps | 6,000 |
| Obscuration Limits | Low | 10% |
| | Upper | 20% |
| Sample Settings | Pump Speed | 1000 RPM |
| | Tip Displacement | 100% |
| | Ultrasonics | Checked pre-measurement 20 sec. |
| | Tank Fill | Manual |
| Cycles | Aliquots | Single |
| | Measurements | 2 per aliquot |
| | Cleaning | Before each aliquot (check enable) |

TABLE 2-continued

SOP for Particle Size Analysis: Dry Submicron PTFE Powder Dispersed in IPA

| Criteria | Setting | Value |
|---|---|---|
| | Clean Mode | Manual |
| | Measurement Cycle | Multiple |
| | Delay | 10 Seconds |

The Malvern Mastersizer system is then cleaned with IPA, since IPA is used as the dispersant in the system. The appropriate refractive index values for both IPA and PTFE (shown in Table 2 above) are set on the Mastersizer, and the background is measured. Then, the sample of dry submicron PTFE powder dispersed in IPA is added to the Mastersizer until a message appears indicating that the requisite amount of sample has been added in order to properly measure the particle size of the PTFE particles.

The sonicator is then turned on at 50%, and the "start" button is pressed. The particle size measurements may be taken approximately 5 times (for example, once per minute for 5 minutes) in order to average out small deviations in the particle size measurements obtained.

In typical studies wherein particle size analysis is performed for sample of dry submicron PTFE powder formed according to the present method and dispersed in IPA, the results have shown that about 95% or more of the PTFE particles have a particle size of less than one micron.

Additionally, the Malvern Mastersizer particle size analyzer may be used to determine the particle size of the submicron PTFE particles in embodiments where the dry submicron PTFE powder formed according to the present method is dispersed in mineral oil. To prepare the carrier solution for such embodiments, about 15 mL of Lonzest SMO surfactant may be mixed with 1 gallon of a mineral oil, such as Magiesol Oil #47. Then, about 1 gram of the dry submicron PTFE powder may be placed in a plastic cuvette, and about 20 mL of the mineral oil carrier solution may be added to the cuvette. The mixture is then shaken for about 30 seconds. Subsequently, the sample is sonicated for 1 minute. In other embodiments, the sample of dispersed submicron PTFE powder to be tested is prepared by mixing about 2% by weight of the dry submicron PTFE powder, formed according to the present method, into a mineral oil using either a blender or a high-speed disperser for about 3-5 minutes. About 5-10 drops of IPA and 5-10 drops of water may be added to the system.

The SOP is then set up on the Malvern Mastersizer for particle size analysis of samples of dry submicron PTFE powder dispersed in mineral oil. This SOP is shown in Table 3 below.

TABLE 3

SOP for Particle Size Analysis: Dry Submicron PTFE Powder Dispersed in Mineral Oil

| Criteria | Setting | Value |
|---|---|---|
| Sample Selection | Hydro 2000S(A) | |
| Material | PTFE | |
| | Refractive Index | 1.38 |
| | Absorption | 0.1 |
| Dispersant Name | Mineral Oil | |
| | Refractive Index | 1.4 |
| | Absorption | 0.1 |
| Labels | Factory Settings | |
| Reports & Saving | Factory Settings | |

TABLE 3-continued

SOP for Particle Size Analysis: Dry Submicron
PTFE Powder Dispersed in Mineral Oil

| Criteria | Setting | Value |
|---|---|---|
| Measurement | Measurement Time | 6 seconds |
|  | Measurement Snaps | 6,000 |
| Background | Background Time | 6 seconds |
|  | Background Snaps | 6,000 |
| Obscuration Limits | Low | 10% |
|  | Upper | 20% |
| Sample Settings | Pump Speed | 1000 RPM |
|  | Tip Displacement | 100% |
|  | Ultrasonics | Checked pre-measurement 20 sec. |
|  | Tank Fill | Manual |
| Cycles | Aliquots | Single |
|  | Measurements | 2 per aliquot |
|  | Cleaning | Before each aliquot (check enable) |
|  | Clean Mode | Manual |
|  | Measurement Cycle | Multiple |
|  | Delay | 10 Seconds |

The Mastersizer's system is then cleaned first with IPA and then with the mineral oil carrier solution described above. The background is then measured. The sample containing dry submicron PTFE powder dispersed in the mineral oil solution is then added to the Mastersizer until a message appears indicating that enough of the sample has been added to measure the particle size of the PTFE particles. The sonicator is then turned on at 50%, and the "start" button is pressed. The particle size measurements may be repeated about 5 times (for example, after 1 minute for about 5-7 times) in order to average out small deviations in the particle size measurements obtained.

Typical particle size analysis results for samples of dry submicron PTFE powder formed according to the present method and dispersed in mineral oil show that more than about 95% of the PTFE particles have a particle size of less than one micron.

Likewise, the Malvern Mastersizer may be used to determine the particle size of the dry submicron PTFE particles in embodiments where the dry submicron PTFE powder is dispersed in water. Specifically, about 1 gram of the dry submicron PTFE powder may be placed in a plastic 20 mL-capacity cuvette, to which 10 mL of IPA is added. The cuvette is then capped and shaken well, possibly for about 15 seconds. Then, 10 mL of water are added to the cuvette, and the contents are shaken for about 15 seconds. Subsequently, about 0.2 grams (or 10 drops from a pipette) of STGE surfactant is added to the cuvette. The cuvette is again capped and shaken for about 15 seconds. The cuvette is then opened, and the sample is sonicated for 1 minute. In other embodiments, about 2% by weight of the dry submicron PTFE powder formed according to the present method is dispersed in a given volume of water, and about 2% by weight of the STGE surfactant is added. In such embodiments, the dispersion is mixed using either a blender or a high-speed disperser for about 3-5 minutes. Subsequently, a solution of about 98% water and about 2% STGE surfactant is prepared, which acts as the carrier solution.

The SOP used for the particle size analysis of samples of the dry submicron PTFE powder formed according to the present method and dispersed in water is outlined below in Table 4:

TABLE 4

SOP for Particle Size Analysis: Submicron
PTFE Powder Dispersed in Water

| Criteria | Setting | Value |
|---|---|---|
| Sample Selection | Hydro 2000S(A) |  |
| Material | PTFE |  |
|  | Refractive Index | 1.38 |
|  | Absorption | 0.1 |
| Dispersant Name | Water |  |
|  | Refractive Index | 1.33 |
|  | Absorption | 0.1 |
| Labels | Factory Settings |  |
| Reports & Saving | Factory Settings |  |
| Measurement | Measurement Time | 6 seconds |
|  | Measurement Snaps | 6,000 |
| Background | Background Time | 6 seconds |
|  | Background Snaps | 6,000 |
| Obscuration Limits | Low | 10% |
|  | Upper | 20% |
| Sample Settings | Pump Speed | 1000 RPM |
|  | Tip Displacement | 100% |
|  | Ultrasonics | Checked pre-measurement 20 sec. |
|  | Tank Fill | Manual |
| Cycles | Aliquots | Single |
|  | Measurements | 2 per aliquot |
|  | Cleaning | Before each aliquot (check enable) |
|  | Clean Mode | Manual |
|  | Measurement Cycle | Multiple |
|  | Delay | 10 Seconds |

The Mastersizer's system is then cleaned with IPA, and the system is subsequently flushed with water twice. Then, 0.3 grams of the STGE surfactant are added to the Mastersizer system. The background is then measured. The sample containing the dry submicron PTFE powder dispersed in water is then added to the Mastersizer until a message appears indicating that enough sample has been added for particle size determination. The sonicator is then turned on at 50%, and the "start" button is pressed. Particle size measurements for the sample of dry submicron PTFE powder dispersed in water are typically taken about 5 times (for example, after 1 minute for about 5-7 times) in order to average out small deviations in the particle size measurements obtained.

Typically, particle size analysis of samples of dry submicron PTFE powder formed according to the present method and dispersed in water show particle size distributions wherein more than about 95% of the PTFE particles are less than one micron in size.

The following examples are intended to illustrate the invention and should not be construed as limiting the invention in any way.

EXAMPLES

Example 1

Initial Comparison of Unirradiated PTFE Reactor Latex Sample and Irradiated PTFE Reactor Latex Sample According to the Present Invention In the present Example, particle size analysis was performed for three samples of reactor latex PTFE: Sample 1.1 was an unirradiated sample of reactor latex PTFE starting material as received from the manufacturer; Sample 1.2 was a sample of the reactor latex PTFE that had undergone irradiation at a dosage of 28 megarads; and Sample 1.3 was a sample of reactor latex PTFE that had undergone irradiation at a dosage of 28 megarads, where the analyzed sample showed a small amount of coagulation.

Figure 2:
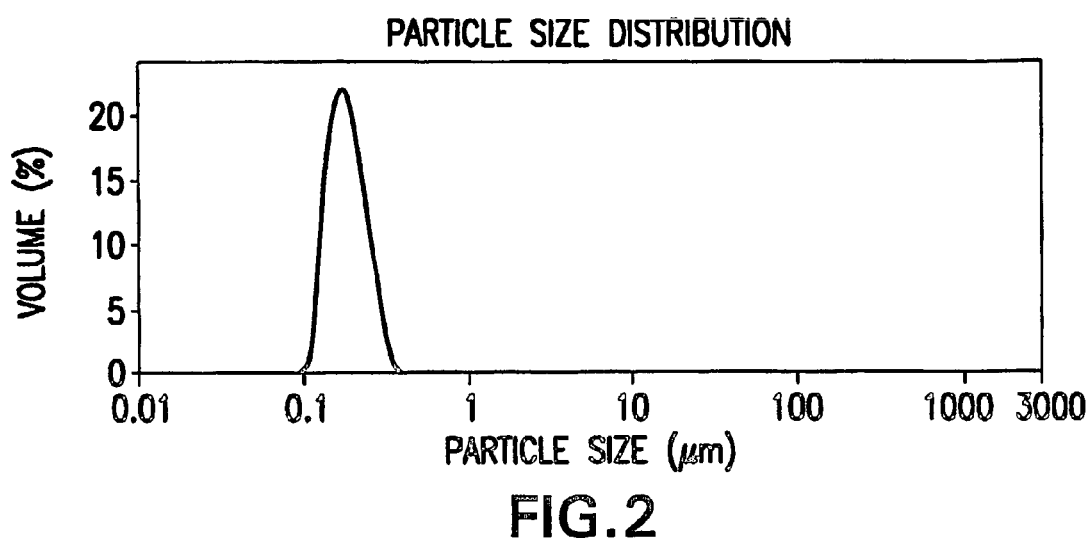
FIG. 2 shows a particle size distribution graph for a control sample of unirradiated reactor latex PTFE material dispersed in IPA.

The particle size analysis of these three samples was performed using the Malvern Mastersizer 2000 described above. Specifically, each of the three samples was added dropwise to the circulating fluid in the Malvem, which comprised IPA with a small amount of surfactant. FIG. 2 shows a graph of the particle size distribution for Sample 1.1, the unirradiated sample of the reactor latex PTFE, and the mean particle size value was found to be 0.201 µm, while 100% of the PTFE particles were shown to be below 1.00 µm in size.

Figure 3:
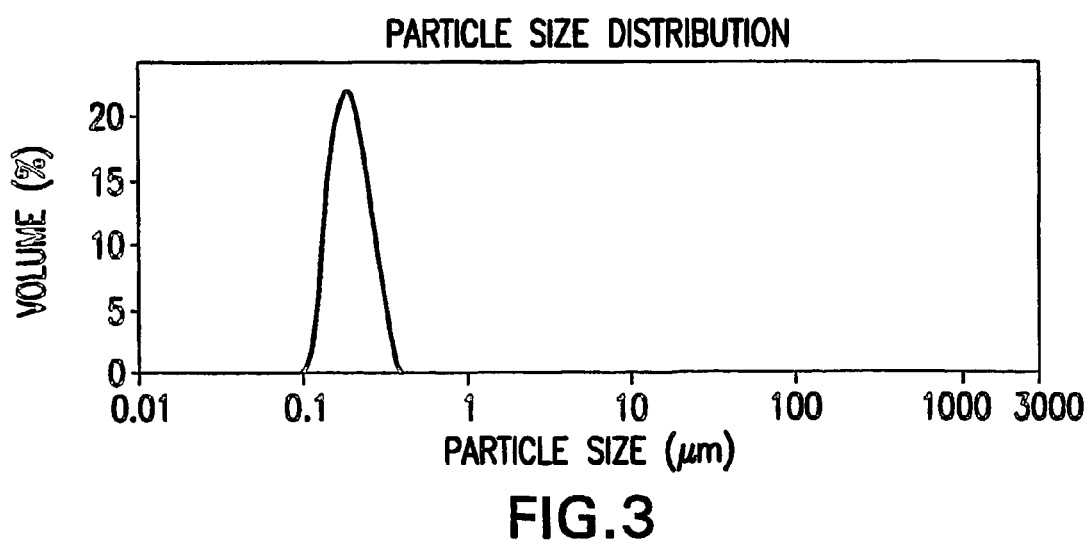
FIG. 3 shows a particle size distribution graph for a sample of irradiated PTFE reactor latex dispersed in IPA.

FIG. 3 shows a graph of the particle size distribution for Sample 1.2, wherein the reactor latex PTFE had been irradiated at 28 megarads. The sample displayed some agglomeration after irradiation and was filtered through a Buchner Funnel, the solids were then collected and dried at 50° C. to obtain a very fine powder. The mean particle size value was shown to be 0.200 µm, while 100.00% of the PTFE particles were below 1.00 µm in size. The powder was then redispersed in IPA and sonicated for 1 minute using a Variable Speed Disperser and the PTFE readily redispersed as submicron particles.

Figure 4:
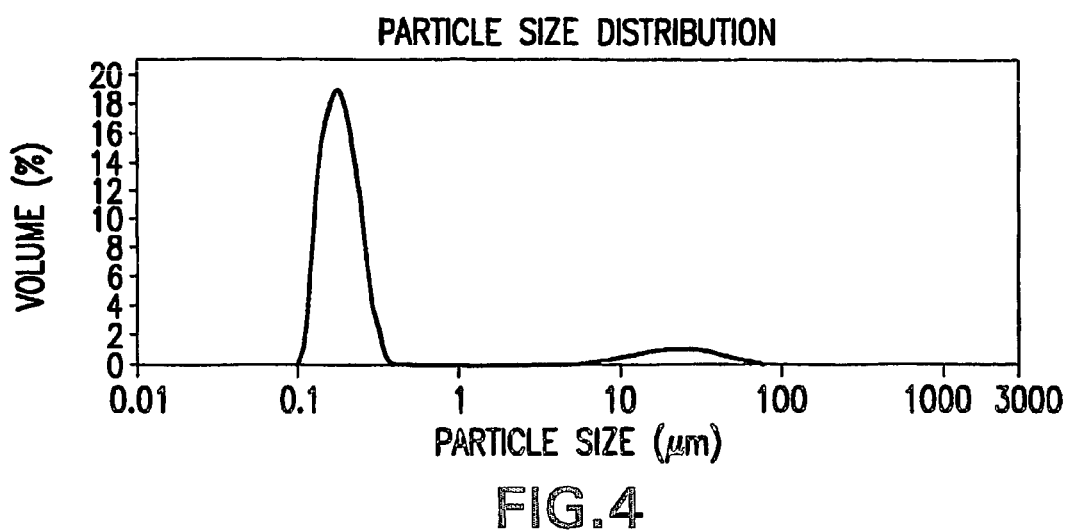
FIG. 4 shows a particle size distribution graph for a sample of irradiated PTFE reactor latex dispersed in IPA.

FIG. 4 shows a graph of the particle size distribution for Sample 1.3, wherein the reactor latex PTFE had been irradiated at 28 megarads. This graph shows that the mean particle size value was 3.272 µm and that 88.00% of the PTFE particles were below 1.00 µm in size. FIG. 4 shows a small peak between about 10 µm and about 100 µm which signifies that a small amount of coagulation of the particles occurred. Sample 1.3 was not filtered to remove the coagulation of particles and the solids were collected and dried at 50° C. The collected powder from Sample 1.3 was then redispersed in IPA and sonicated for 1 minute using a Variable Speed Disperser and the PTFE readily redispersed as submicron particles.

Therefore, the results of Example 1 show that unirradiated reactor latex PTFE has an inherently small particle size but the sample is very unstable. In contrast, irradiated reactor latex PTFE remains stable and may cause a small amount of conglomeration that increases the average particle size distribution. However, the conglomeration in the irradiated reactor latex PTFE readily redisperses to submicron size to form a sample with an overall small particle size distribution.

Example 2

Irradiation of Reactor Latex PTFE at Varying Doses of Irradiation; Qualitative Results In the present Example, six samples of reactor latex PTFE starting material were irradiated at doses of irradiation ranging from 0 megarads (for the control sample) to 55 megarads. The doses of irradiation are listed below in Table 5. Following the irradiation of each sample, about 50 grams of each of the reactor latex PTFE samples were weighed into separate glass beakers. Each of the samples was then placed in an oven to dry at a temperature of about 55° C. The weight of each sample was checked approximately every hour, and when the weight of the sample was found to be stable, i.e. the sample was dry, the sample was then allowed to cool.

Each of the dry powders was then qualitatively observed by placing a small sample of each powder between the user's fingers to determine the level of stickiness of each of the samples. The following results were observed:

TABLE 5

| | Sample No. | | | | | |
|---|---|---|---|---|---|---|
| | 2.1 | 2.2 | 2.3 | 2.4 | 2.5 | 2.6 |
| Dose of Irradiation (megarads) | 0 (Control Sample) | 10 | 15 | 20 | 50 | 55 |
| Level of Stickiness | Very sticky | Showed some stickiness | Less sticky than the sample irradiated at 10 megarads | Non-sticky powder | Non-sticky powder | Non-sticky powder |

Thus, the results in Table 5 above show that irradiation of reactor latex PTFE at doses of about 20 megarads and higher provides a PTFE powder that is non-sticky. Such a low level of stickiness indicates that the powder will have a low tendency to self-agglomerate and will readily disperse in a target application system.

Example 3

Irradiation of Reactor Latex PTFE at Varying Doses of Irradiation; Quantitative Results Following the qualitative analysis reported in Example 2 above, particle size analysis was performed for two of the samples discussed in Example 2. Specifically, the samples selected for particle size analysis were: Sample 2.4, which had been irradiated at 20 megarads; and Sample 2.6, which had been irradiated at 55 megarads.

Each of the samples underwent powdering for one minute using the "Touch-top" coffee mill (commercially available from KRUPS, Art. No. 208o-70 white 120 volt). After powdering, exactly 1.0 gram of each of the two powdered samples were placed in separate 20 mL plastic jars, to which 10 mL of IPA and 10 mL of water were added. Each sample was capped and shaken by hand for about 30 seconds. Subsequently, about 10 drops of STGE surfactant was added. Following the addition of the STGE surfactant, each sample was sonicated for 3 minutes before the particle size was measured.

The particle size analysis was performed using the Malvern Matersizer 2000, described in detail above, and the samples were sonicated during the measurement of the particle size of the PTFE to inhibit weak agglomeration and settling which would change particle size and determine the amount of time necessary for the particles to reach submicron size.

Figure 5:
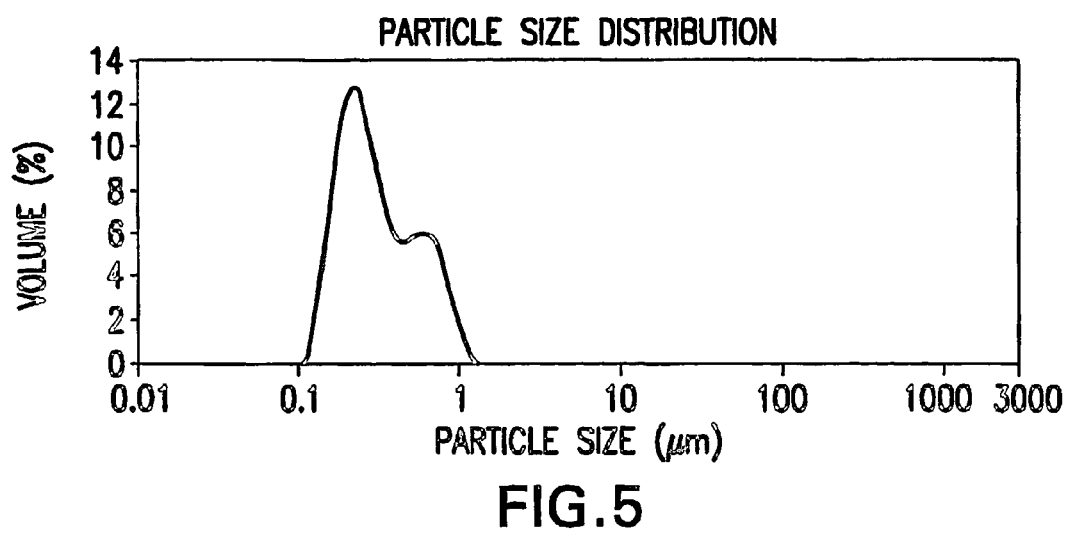
FIG. 5 shows a particle size distribution graph after 20 minutes of sonication for a sample of submicron PTFE powder formed according to the present invention and dispersed in water.
Figure 5A:
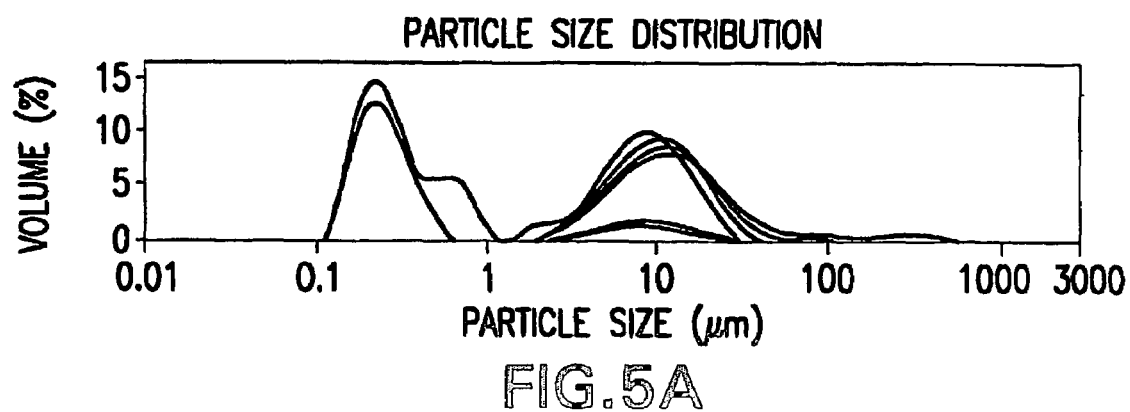
FIG. 5(A) shows cumulative particle size distribution results over the 20 minute sonication period for the sample analyzed in FIG. 5.

For Sample 2.4, which had been irradiated at 20 megarads, the particle size of the PTFE particles therein reached submicron size after 20 minutes of sonication during particle size measurements. Specifically, after 20 minutes of sonication and measuring the particle size, the mean particle size value of the PTFE particles was 0.370 µm, while 98.90% of the PTFE particles were shown to be below 1.00 µm in size. The particle size distribution graph for Sample 2.4 after 20 minutes of sonication and particle size analysis is included as FIG. 5. Additionally, included as FIG. 5(A) is a graph of the cumulative particle size distribution curves over the 20-minute time period during which sonication and particle size measurement occurred. FIG. 5(A) allows the user to see how the particle size distribution changed during the 20-minute period of sonication and particle size measurement.

Figure 6:
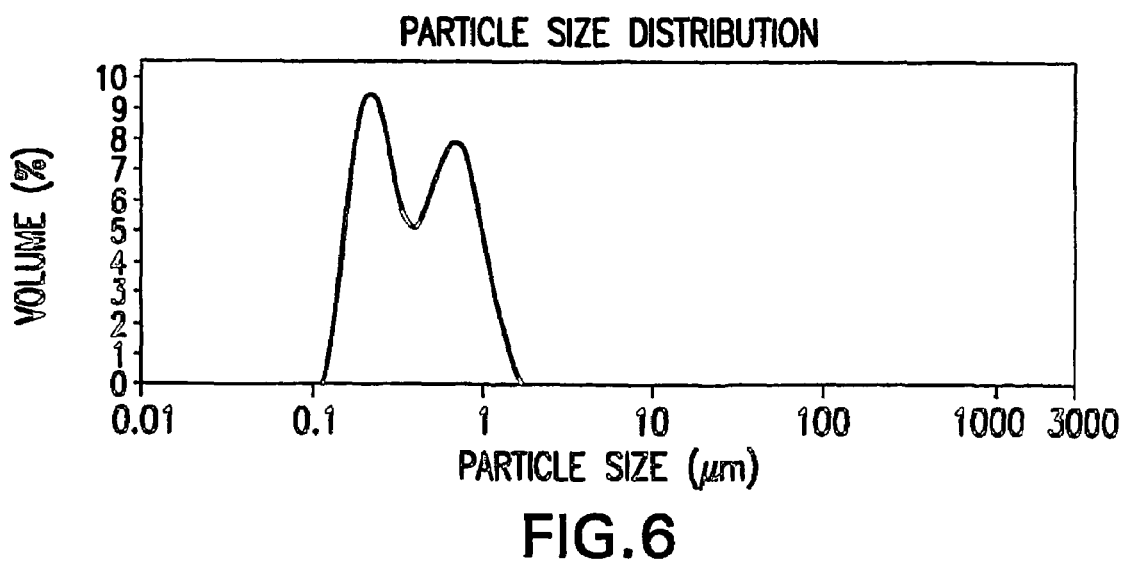
FIG. 6 shows a particle size distribution graph after 3 minutes of sonication for a sample of submicron PTFE powder formed according to the present invention and dispersed in water.
Figure 6A:
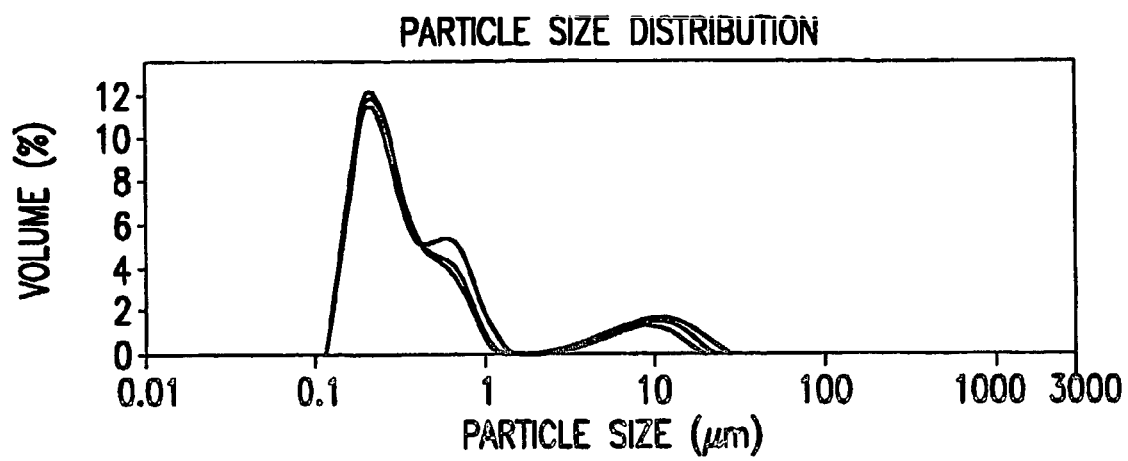
FIG. 6(A) shows cumulative particle size distribution results over the 3 minute sonication period for the sample analyzed in FIG. 6.

For Sample 2.6, which had been irradiated at 55 megarads, the particle size of the PTFE particles therein reached submicron size after only 3 minutes of sonication during particle size measurements. Specifically, after 3 minutes of sonication and measuring particle size, the mean particle size value of the PTFE particles was found to be 0.483 μm, while 92.70% of the PTFE particles were below 1.00 μm in size. The particle size distribution graph for Sample 2.6 after 3 minutes of sonication and particle size analysis is included as FIG. 6. Also included as FIG. 6(A) is a graph of the cumulative particle size distribution curves over the 3-minute time period during which sonication and particle size measurements occurred. FIG. 6(A) allows the user to see how the particle size distribution changed during the 3-minute period of sonication and particle size measurements.

The results of this Example indicate that the dispersibility in water of the resulting dry submicron PTFE powder samples, formed by irradiating samples of reactor latex PTFE, increases as the dose of irradiation increases. Specifically, the enhanced dispersibility of the PTFE particles is easily observed in light of the significantly reduced amount of time (3 minutes) of sonication needed before Sample 2.6 (irradiated at 55 megarads) reached submicron particle size when compared to the 20-minute period of sonication needed before Sample 2.4 (irradiated at 20 megarads) reached submicron particle size.

Example 4

Comparison of Particle Size Measurements for Samples of Submicron PTFE Powder; Reactor Latex Irradiated at Varying Dosages In this Example, 12 different samples of the reactor latex PTFE starting material were first provided. The 12 samples were maintained at one of two pH levels and were subjected to varying doses of electron beam irradiation as described in Table 6 below:

TABLE 6

| Sample No. | Dose of Irradiation (megarads) | pH of Sample |
|---|---|---|
| 4.1 | 5 | as received |
| 4.2 | 5 | 7-8 |
| 4.3 | 15 | as received |
| 4.4 | 15 | 7-8 |
| 4.5 | 25 | as received |
| 4.6 | 25 | 7-8 |
| 4.7 | 35 | as received |
| 4.8 | 35 | 7-8 |
| 4.9 | 45 | as received |
| 4.10 | 45 | 7-8 |
| 4.11 | 55 | as received |
| 4.12 | 55 | 7-8 |

After each of Samples 4.1 to 4.12 had been irradiated at its indicated dose of electron beam irradiation, the samples were dried at 50° C. and the dry submicron PTFE powder was collected. Next the dispersibility of each powder was determined by dispersing each sample in a liquid and obtaining particle size measurements.

During particle size analysis, water was used as the dispersant, and particle size measurements were taken approximately every minute. The samples were sonicated during the entire analysis of particle size and measurements were taken every minute until 100% of the PTFE particles in the tested sample reached submicron size. Therefore, the amount of time for 100% of each sample to reach a PTFE particle size below 1.00 μm was determined.

The results obtained are recorded in Table 7 below:

TABLE 7

| Sample No. | Mean Value Particle Size (μm) | % Particles Less Than 1.00 μm | Sonication Time (minutes) Before Submicron Particle Size Obtained |
|---|---|---|---|
| 4.1 | 0.282 | 100.00 | 24 |
| 4.2 | 0.295 | 100.00 | 27 |
| 4.3 | 0.296 | 100.00 | 20 |
| 4.4 | 0.267 | 100.00 | 7 |
| 4.5 | 0.294 | 100.00 | 7 |
| 4.6 | 0.267 | 100.00 | 18 |
| 4.7 | 0.282 | 100.00 | 14 |
| 4.8 | 0.287 | 100.00 | 11 |
| 4.9 | 0.292 | 100.00 | 10 |
| 4.10 | 0.285 | 100.00 | 10 |
| 4.11 | 0.237 | 100.00 | Less than one minute |
| 4.12* | 0.275 | 100.00 | 15 |

*Rerun of this sample yielded a sonification time of 4 minutes

Figure 7:
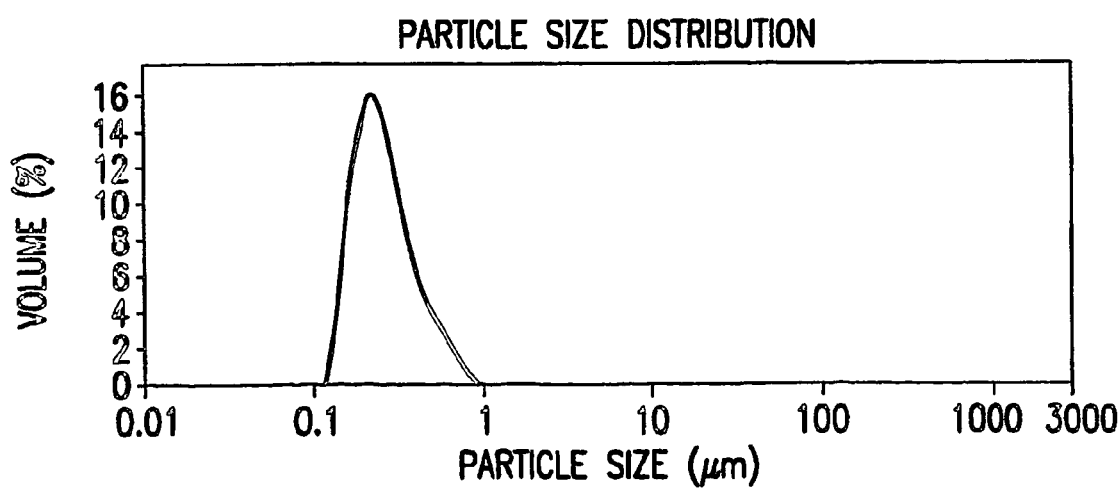
FIG. 7 shows a particle size distribution graph for a sample of submicron PTFE powder, wherein butyl carbitol was used as the solvent for grinding and wherein the submicron PTFE powder is dispersed in IPA; particle size distribution is shown to be 100.00% below 1.00 µm.
Figure 8:
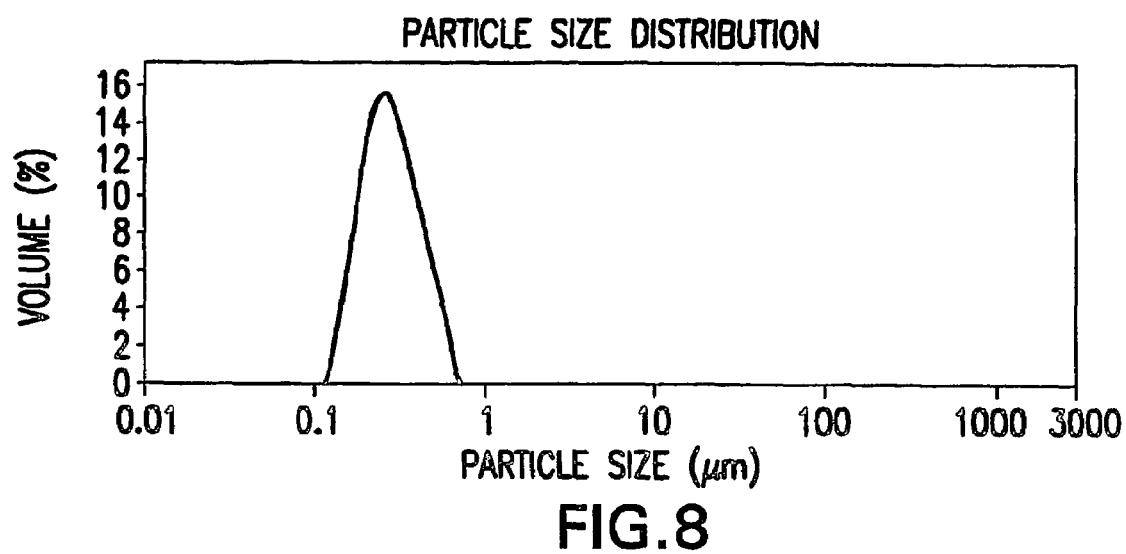
FIGS. 8-13 show particle size distribution graphs for samples of submicron PTFE powder, wherein IPA was used as the solvent for grinding, wherein the samples of submicron PTFE powder are dispersed in mineral oil, and wherein 6 different recovery methods were employed for comparison.
Figure 9:
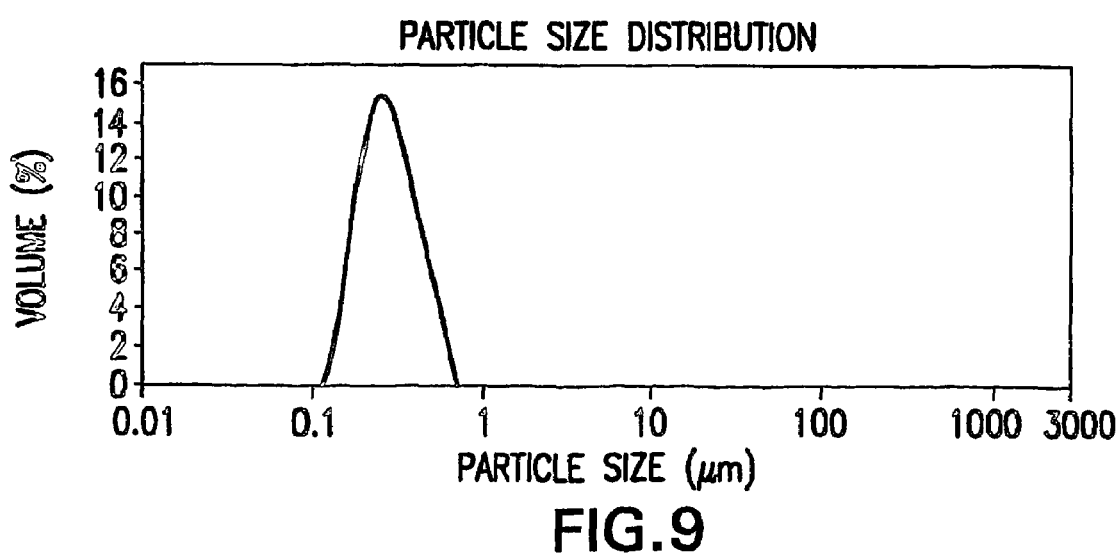
Figure 10:
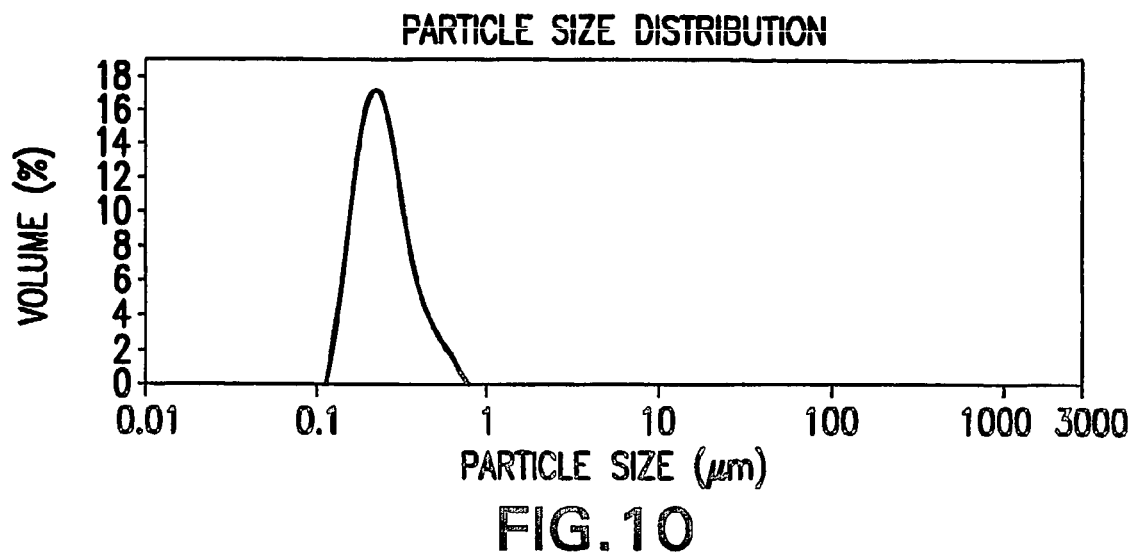
Figure 11:
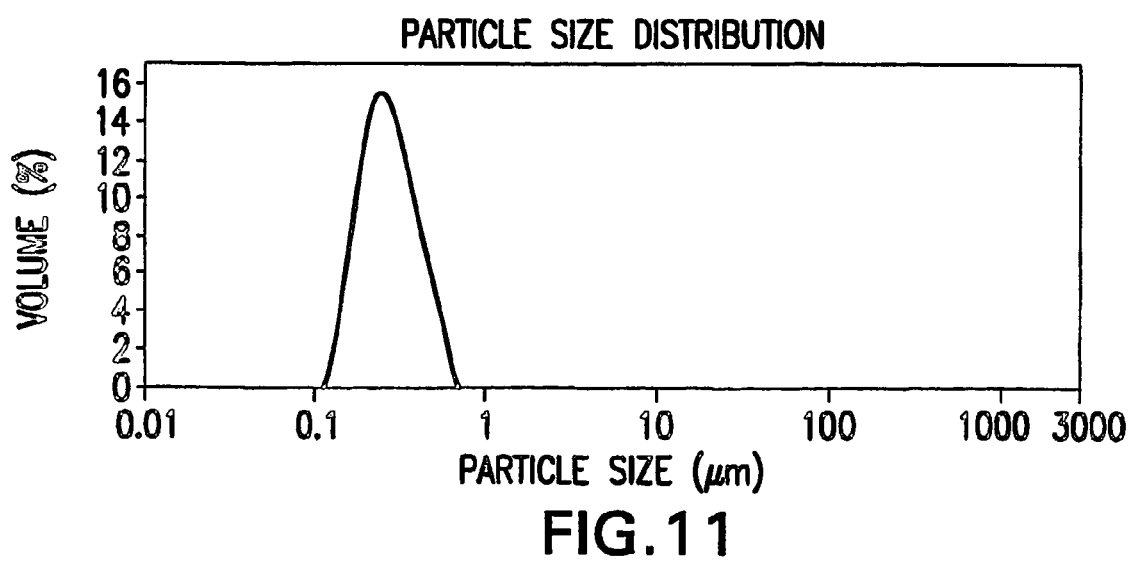
Figure 12:
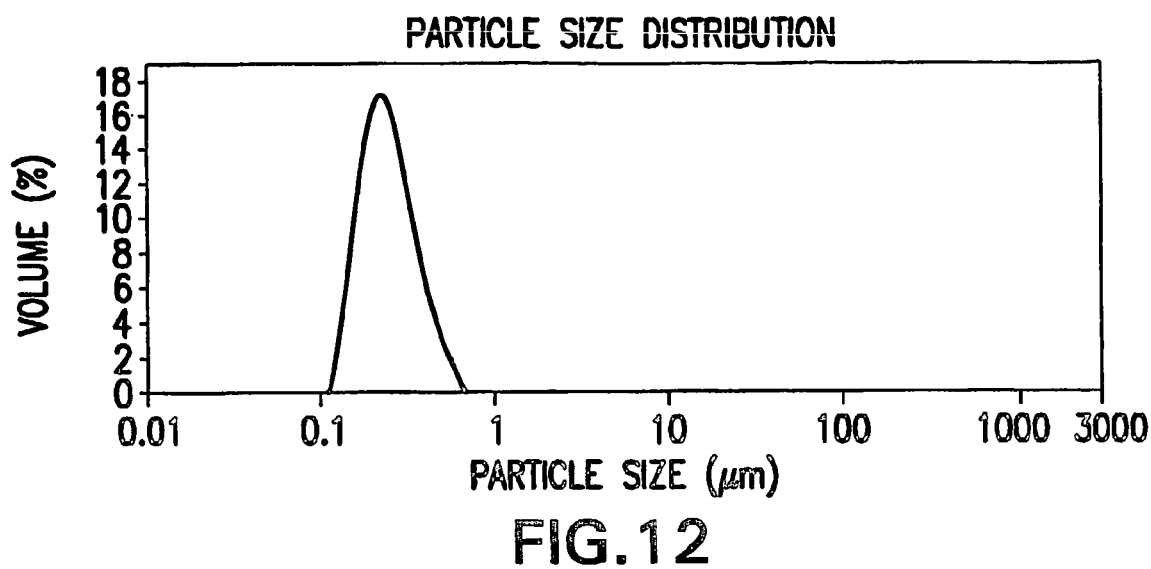
Figure 13:
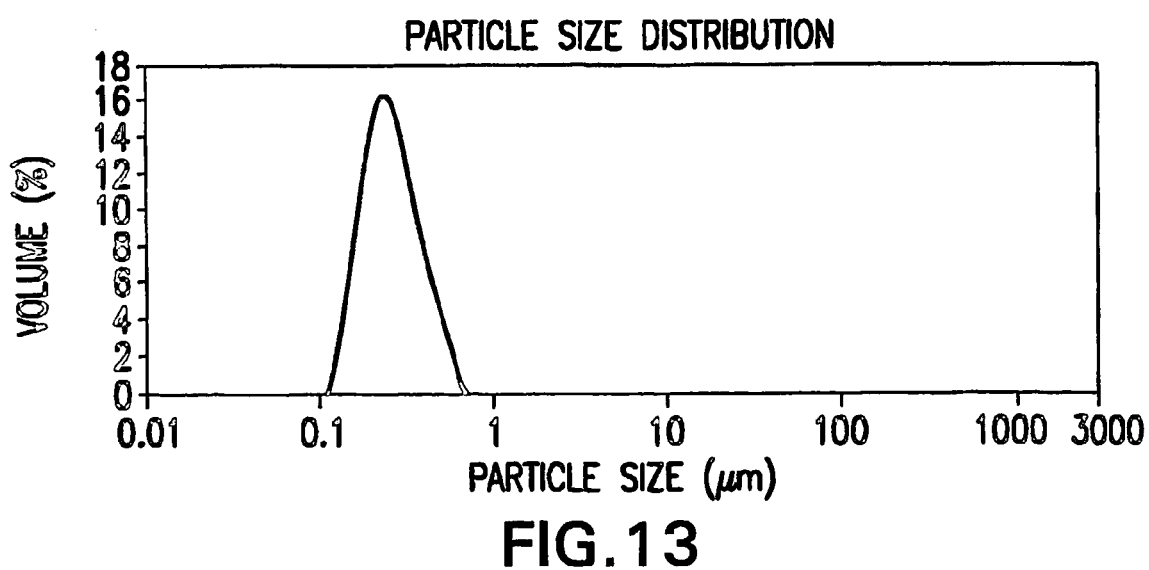
Figure 14:
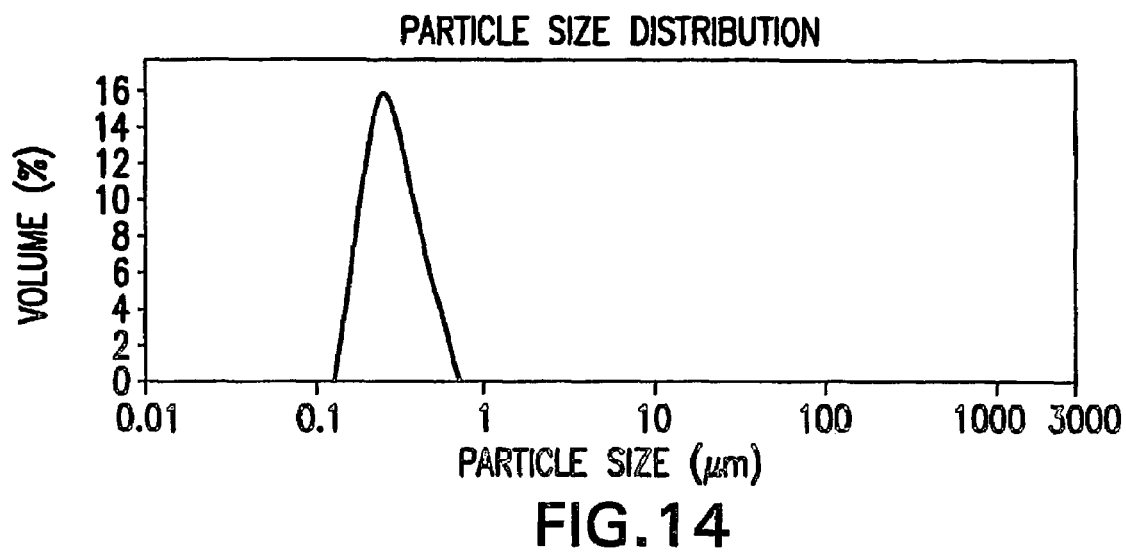
FIG. 14 shows a particle size distribution graph for a sample of irradiated PTFE starting material that was mixed in a ball mill with IPA as the solvent.
Figure 15:
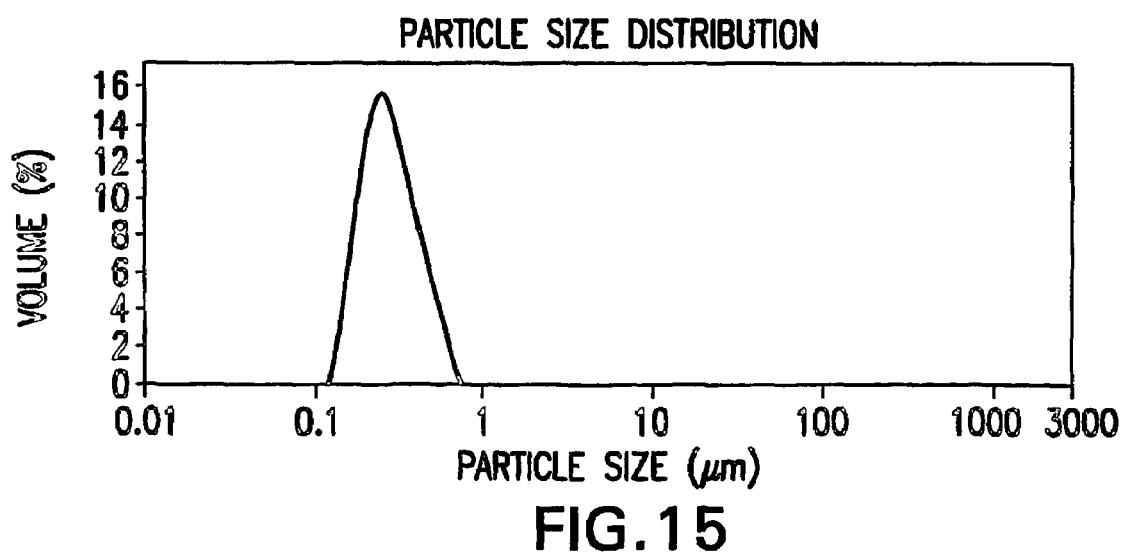
FIG. 15 shows a particle size distribution graph for a sample of non-irradiated PTFE starting material that was mixed in a ball mill with IPA as the solvent.
Figure 16:
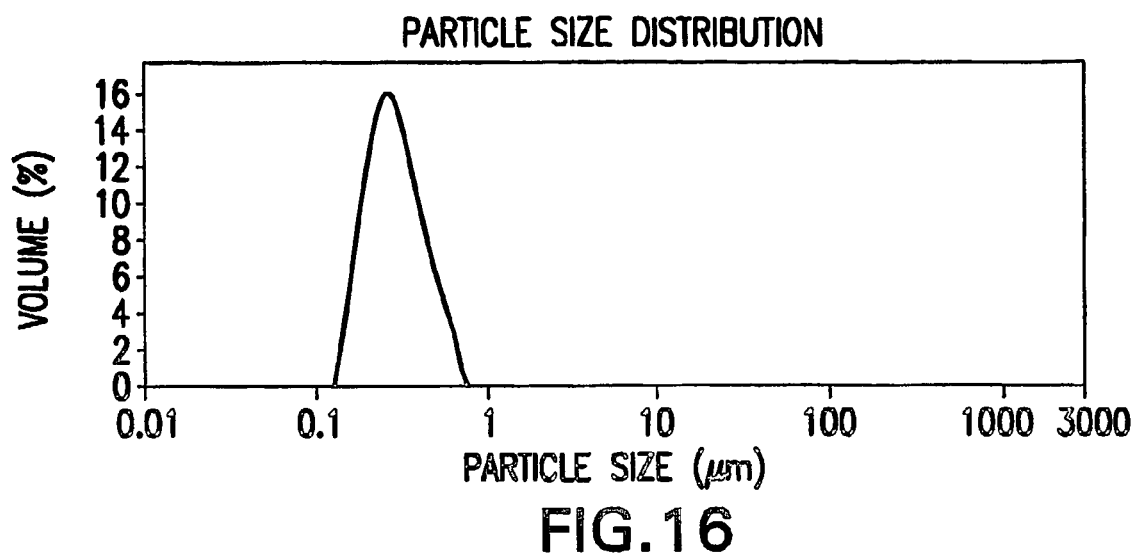
FIG. 16 shows a particle size distribution graph (generated using the Microtrac particle size analyzer) for a sample from an organic dispersion of PTFE particles formed according to the present invention; particle size distribution is shown to be more than 90% below 0.81 µm.
Figure 17:
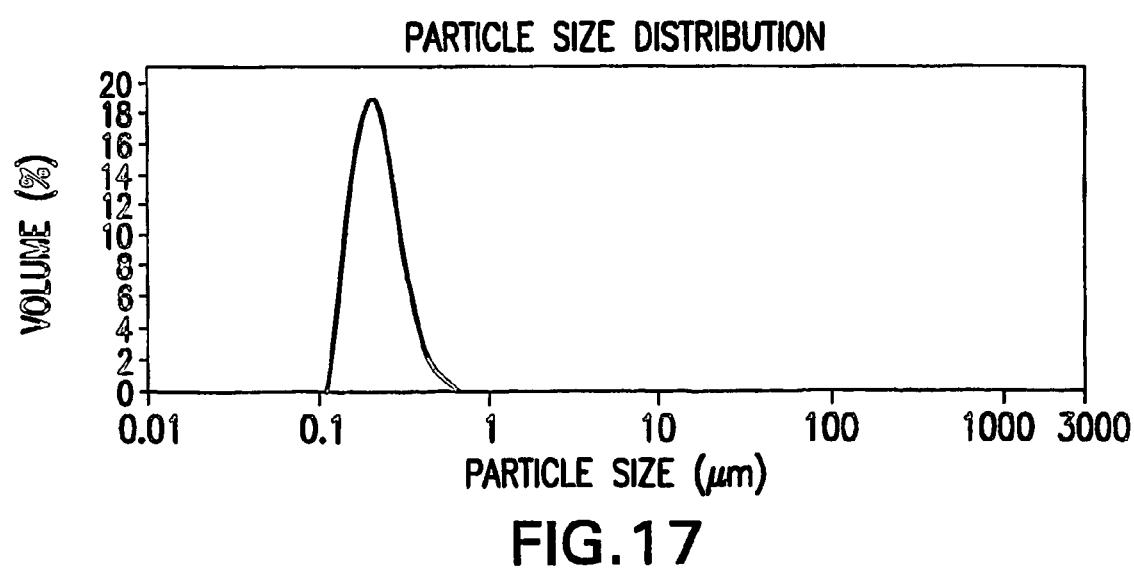
FIG. 17 shows a particle size distribution graph for a sample from a large-scale aqueous dispersion of PTFE particles formed according to the present invention; particle size distribution is shown to be 100.00% below 1.00 µm.
Figure 18:
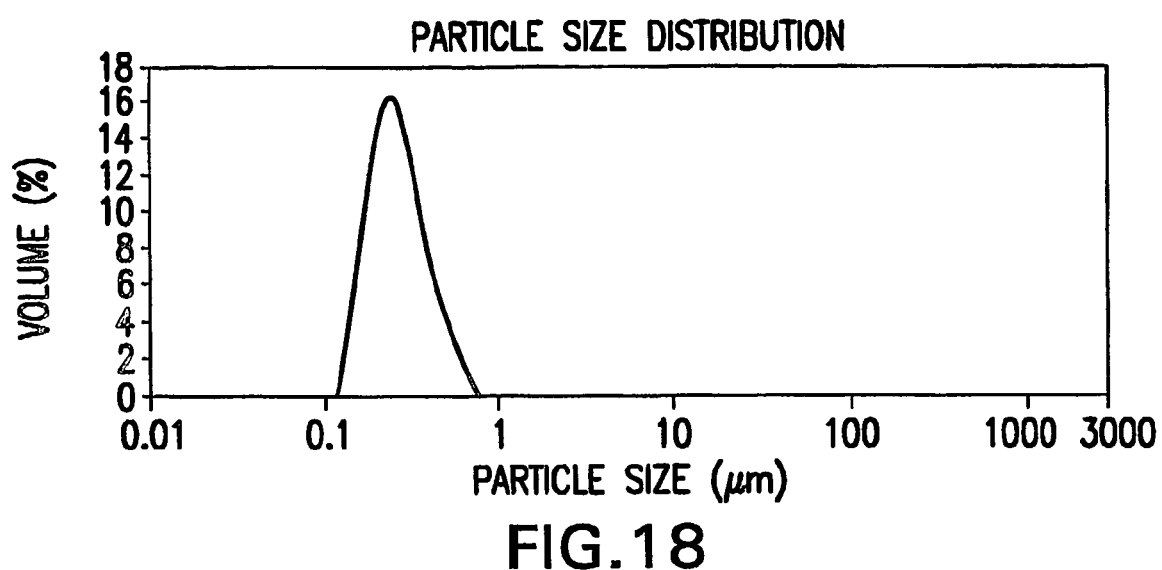
FIG. 18 shows a particle size distribution graph for a sample of submicron PTFE powder formed according to the present invention, wherein IPA was used as the solvent for grinding and wherein the submicron PTFE powder is dispersed in a mixture of IPA and water; particle size distribution is shown to be 80.51% below 1.00 µm.

Particle size distribution graphs are included for each of the samples after 100% of the PTFE particles in each sample reached submicron in size. Specifically, the particle size distribution graphs include: FIG. 7 for Sample 4.1 after 24 minutes of sonication/particle size analysis; FIG. 8 for Sample 4.2 after 27 minutes of sonication/particle size analysis; FIG. 9 for Sample 4.3 after 20 minutes of sonication/particle size analysis; FIG. 10 for Sample 4.4 after 7 minutes of sonication/particle size analysis; FIG. 11 for Sample 4.5 after 7 minutes of sonication/particle size analysis; FIG. 12 for Sample 4.6 after 18 minutes of sonication/particle size analysis; FIG. 13 for Sample 4.7 after 14 minutes of sonication/particle size analysis; FIG. 14 for Sample 4.8 after 11 minutes of sonication/particle size analysis; FIG. 15 for Sample 4.9 after 10 minutes of sonication/particle size analysis; FIG. 16 for Sample 4.10 after 10 minutes of sonication/particle size analysis; FIG. 17 for Sample 4.11 after less than one minute of sonication/particle size analysis; and FIG. 18 for Sample 4.12 after 15 minutes of sonication/particle size analysis.

Figure 19:
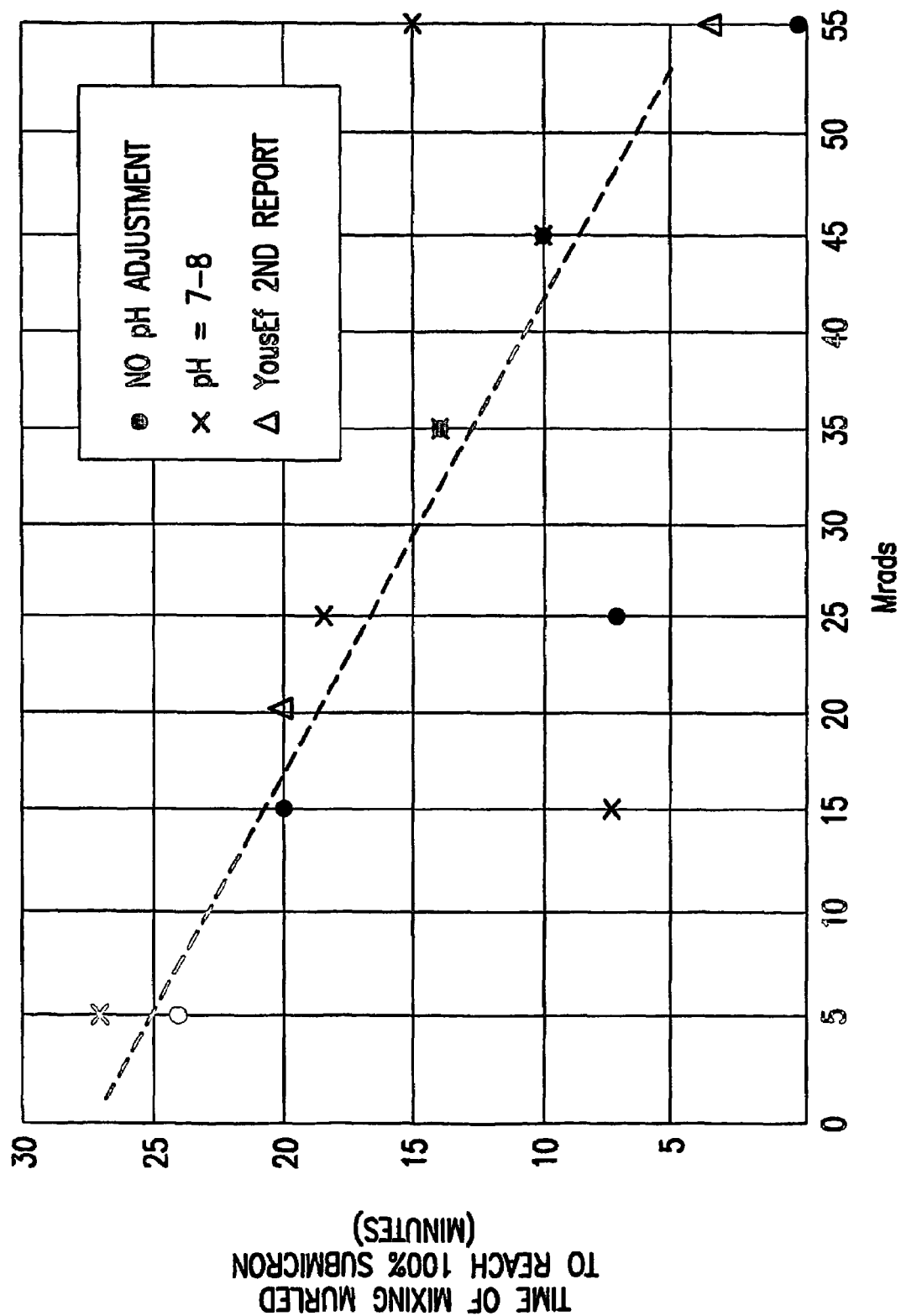
FIG. 19 shows a particle size distribution graph for a sample of PTFE starting material that was irradiated at 28 megarads, did not undergo grinding, and was dispersed in a mixture of IPA and water; particle size distribution is shown to be 4.27% below 1.00 µm.

The results set forth in Table 7 above show that higher levels of irradiation decreased the sonication time necessary for 100% of the PTFE particles of each sample to disperse in water so that 100% of the PTFE particles were submicron in size. The results in Table 7 were used to create the graph included as FIG. 19. Specifically, FIG. 19 shows a plot of the time (in minutes) of sonication necessary (while particle size analysis was taking place) for the PTFE particles in the PTFE powder samples (Samples 4.1 to 4.12) to reach 100% submicron size versus the dose of electron beam irradiation (in megarads) that the samples were subjected. The circular points on the graph represent Samples 4.1, 4.3, 4.5, 4.7, 4.9, and 4.11, all of which did not undergo pH adjustment. The points on the graph labeled with a "X" represent Samples 4.2, 4.4, 4.6, 4.8, 4.10, and 4.12, all of which had been adjusted to a pH between about 7-8. A best-fit line and the x-intercept were found for the graph of FIG. 19, which allowed the determination that at a dose of about 65 megarads, no sonication would be necessary to disperse the dry submicron PTFE powder in water so that 100.00% of the PTFE particles are below 1.00 μm in size.

For 4 of the 12 above-described samples, more detailed particle size analysis was performed during the time period of sonication necessary for that sample to reach 100% submicron particle size. Specifically, for these 4 selected samples, particle size measurements were taken and plotted while the sample was continuously sonicated to determine the sonication time required for the PTFE particles in each of the PTFE powder samples to disperse to submicron size.

Results were first obtained for Sample 4.1 (the sample of PTFE powder where the PTFE reactor latex starting material had been irradiated at 5 megarads). The sonication and particle size measurements were allowed to persist for 32 minutes, and the data obtained was recorded in Table 8 below:

TABLE 8

Particle Size Distribution Data for PTFE Powder Sample 4.1
(Reactor Latex Irradiated at 5 Megarads)

Figure 20A:
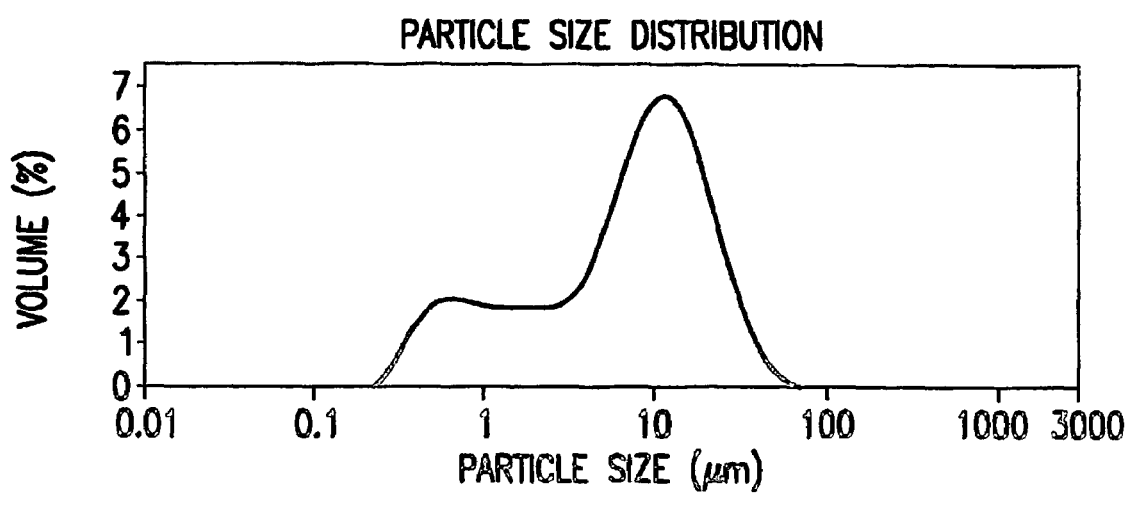
FIG. 20 shows a graph of particle size distribution data of PTFE powder from reactor latex PTFE irradiated at 5 Megarads and sonicated for (a) 0 minutes; (b) 2 minutes; (c) 3 minutes; (d) 4 minutes; (e) 5 minutes; (f) 6 minutes; (g) 7 minutes; (h) 8 minutes; (i) 10 minutes; (j) 12 minutes; (k) 13 minutes; (l) 16 minutes; (m) 19 minutes; (n) 20 minutes; (o) 21 minutes; (p) 22 minutes; (q) 24 minutes; (r) 25 minutes; (s) 26 minutes; (t) 30 minutes; and (u) 32 minutes.
Figure 20B:
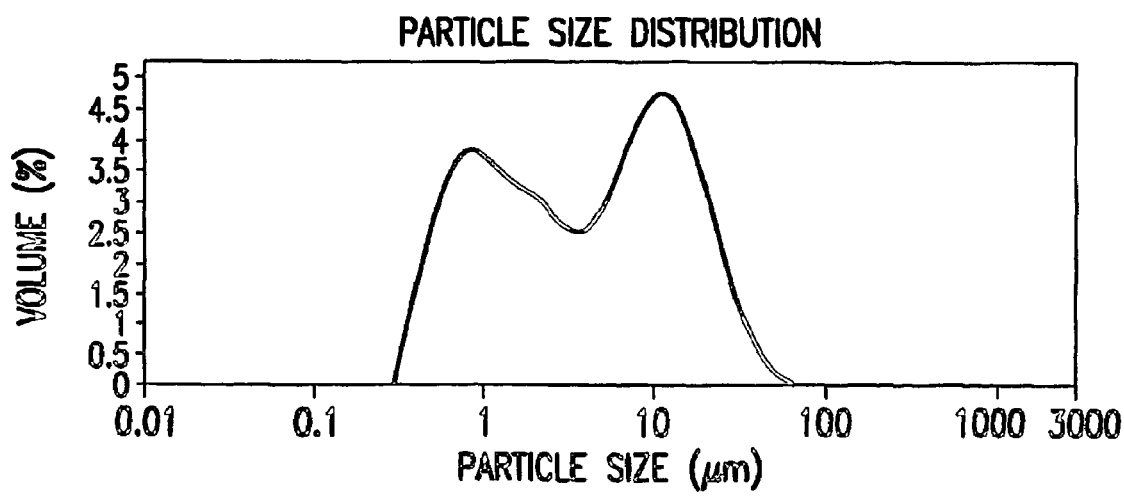
Figure 20C:
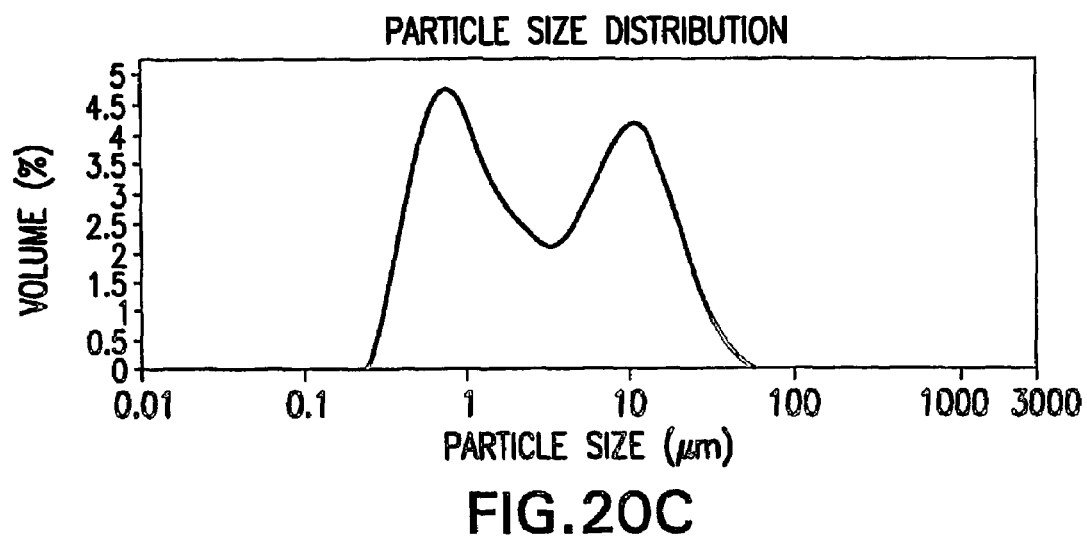
Figure 20D:
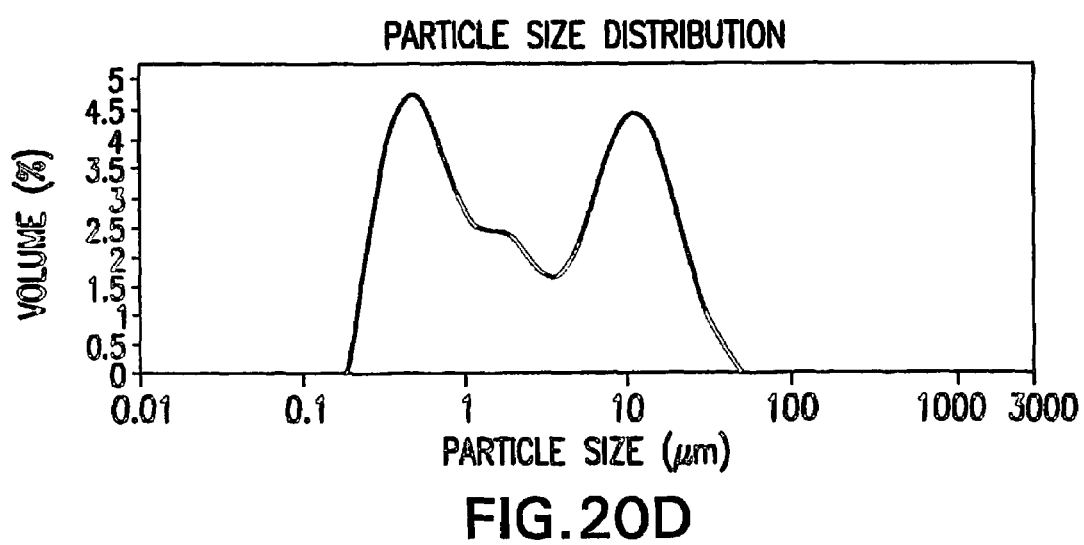
Figure 20E:
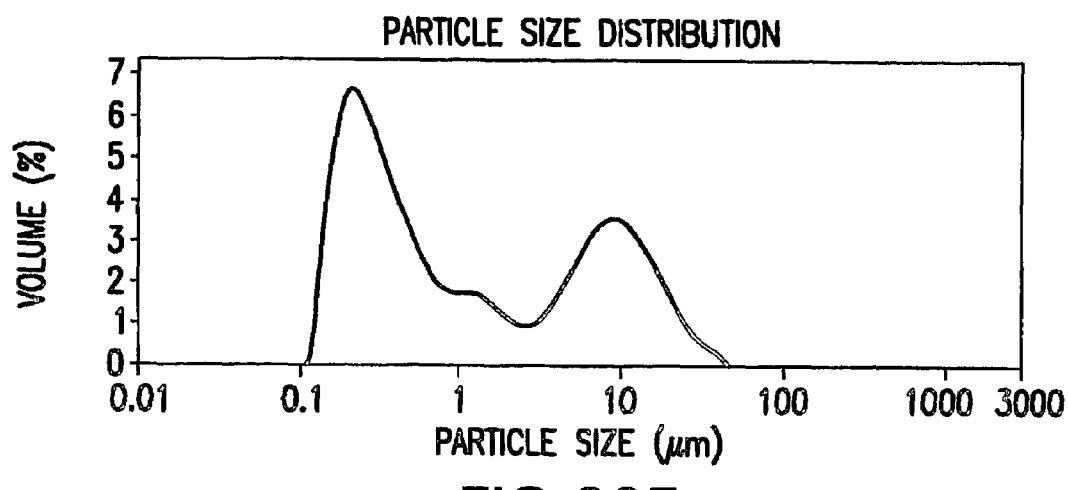
Figure 20F:
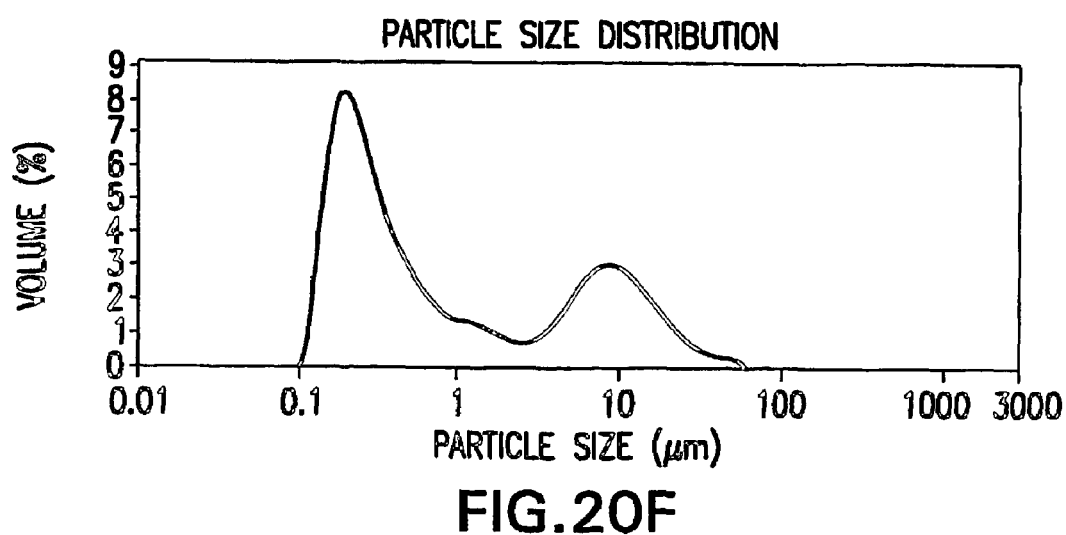
Figure 20G:
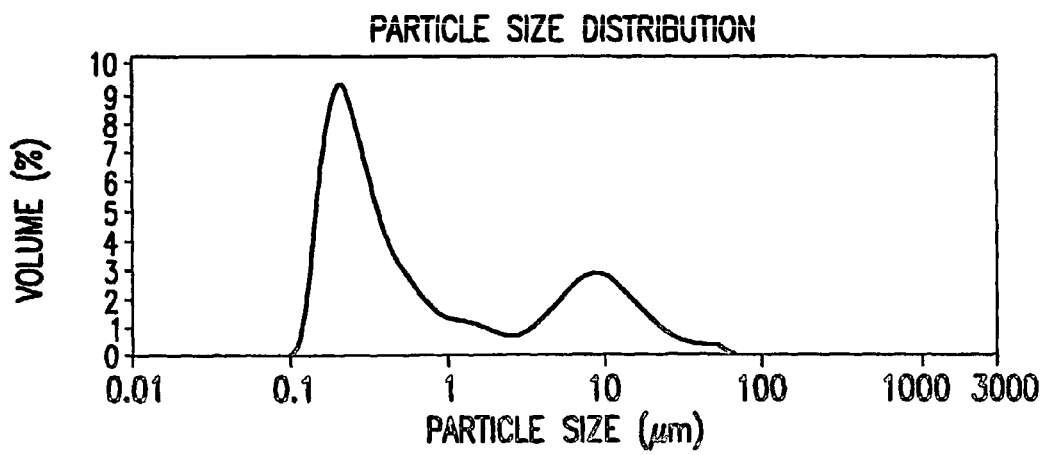
Figure 20H:
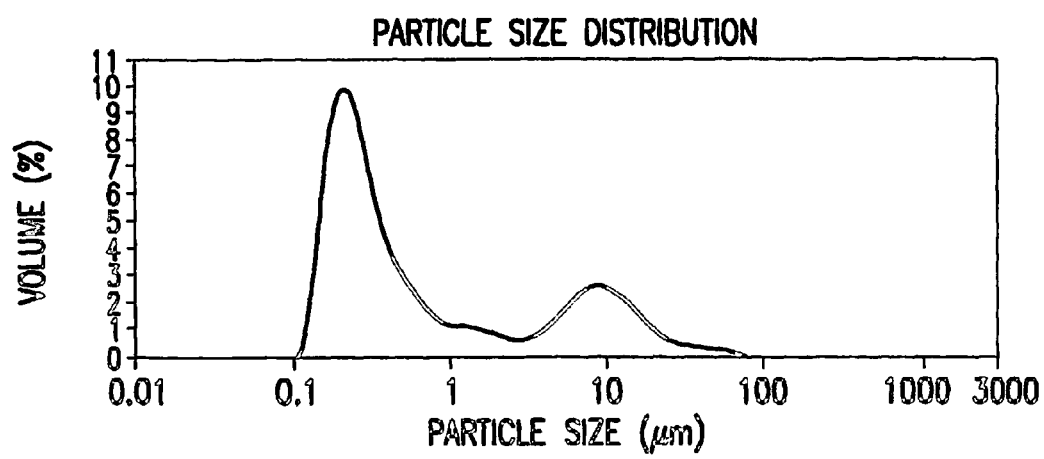
Figure 20I:
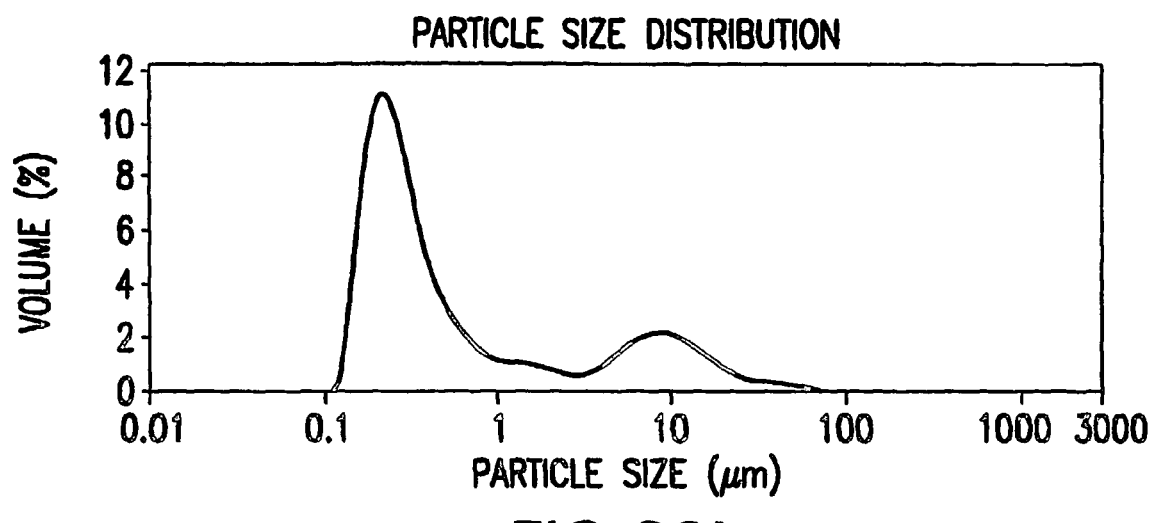
Figure 20J:
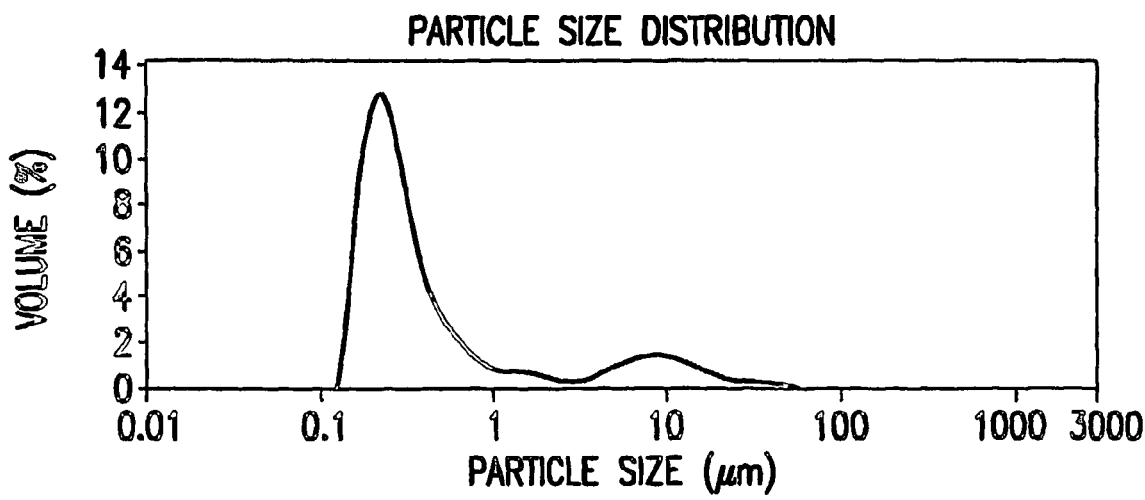
Figure 20K:
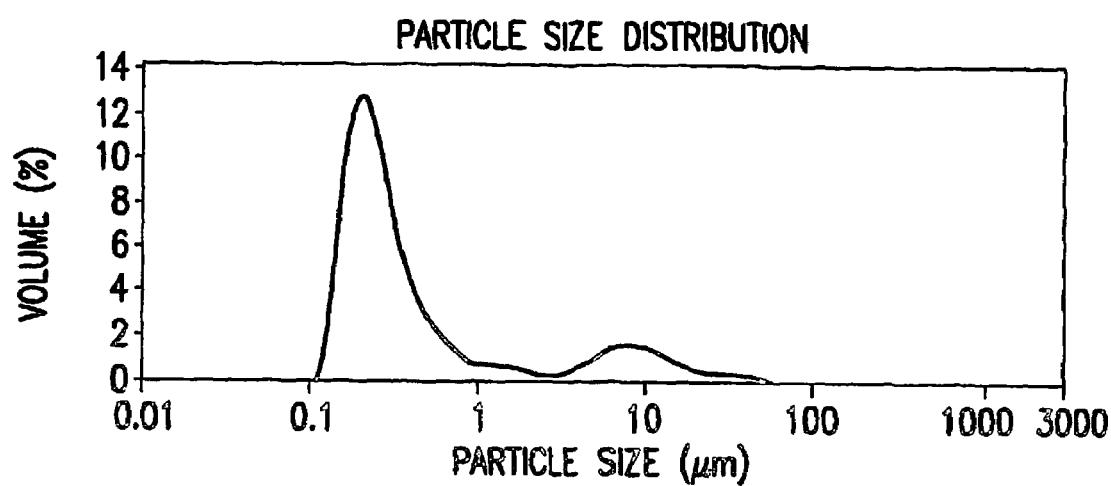
Figure 20L:
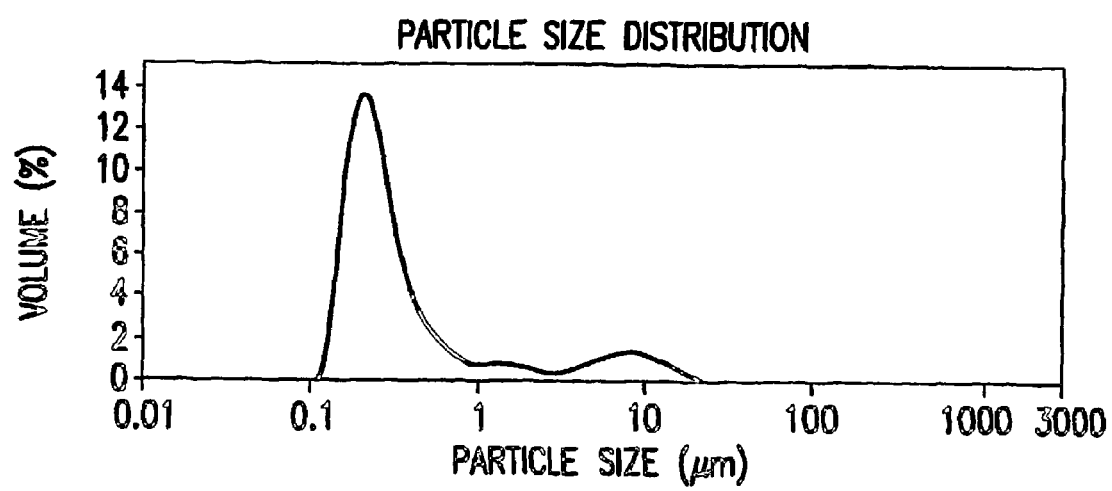
Figure 20M:
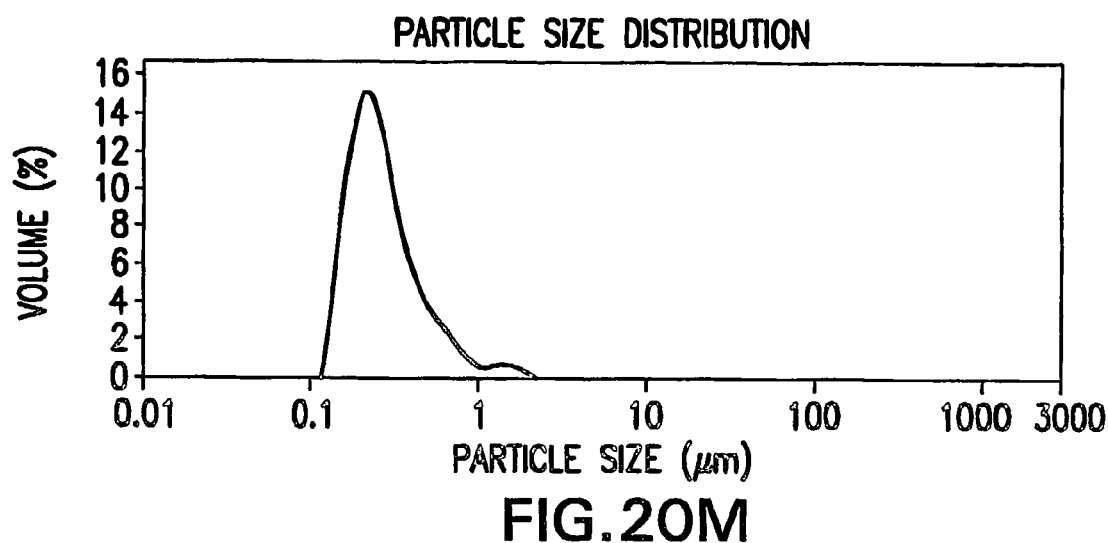
Figure 20N:
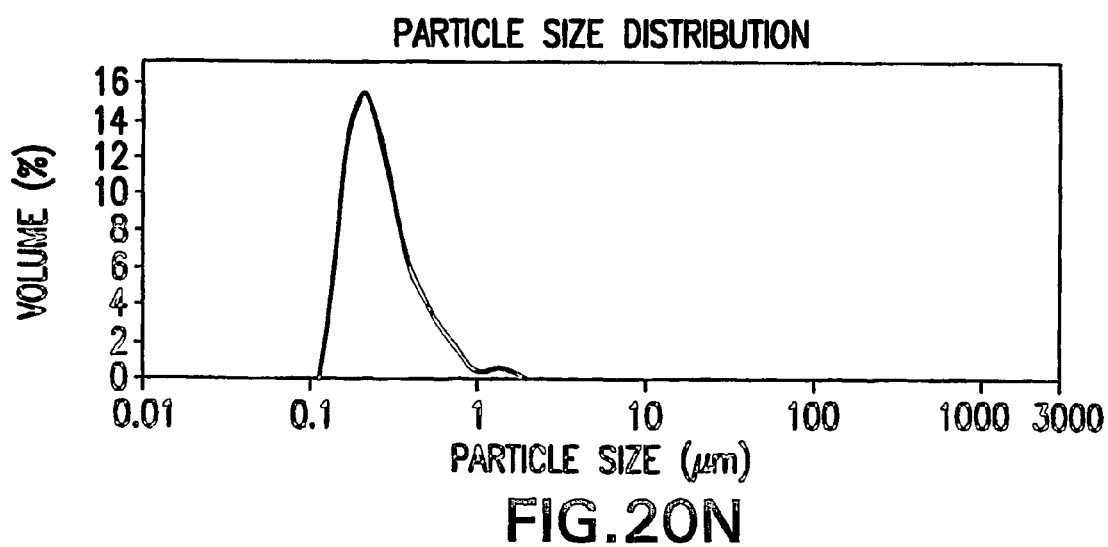
Figure 20O:
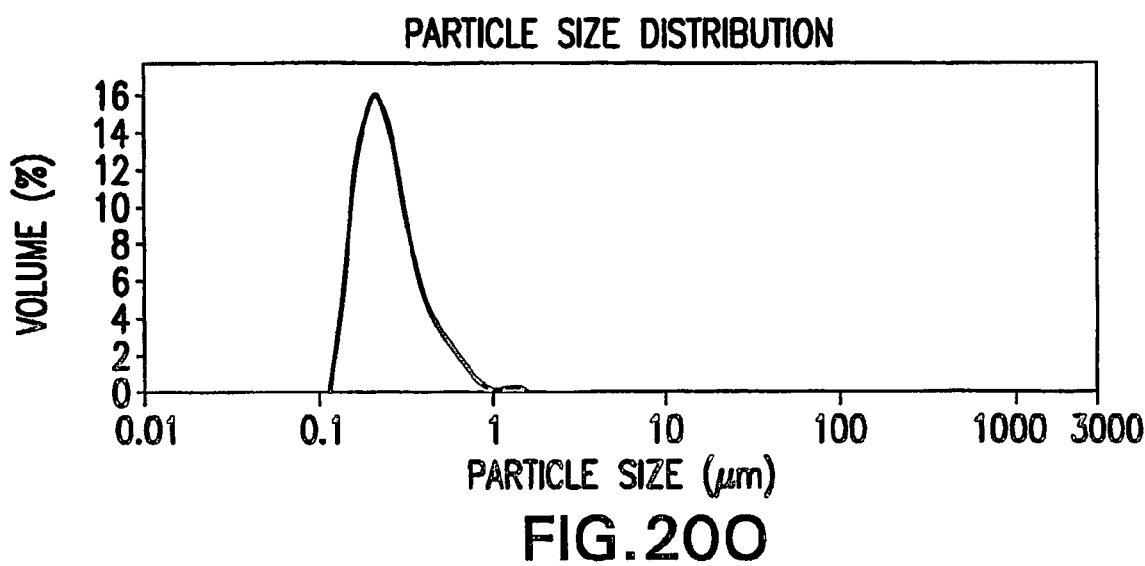
Figure 20P:
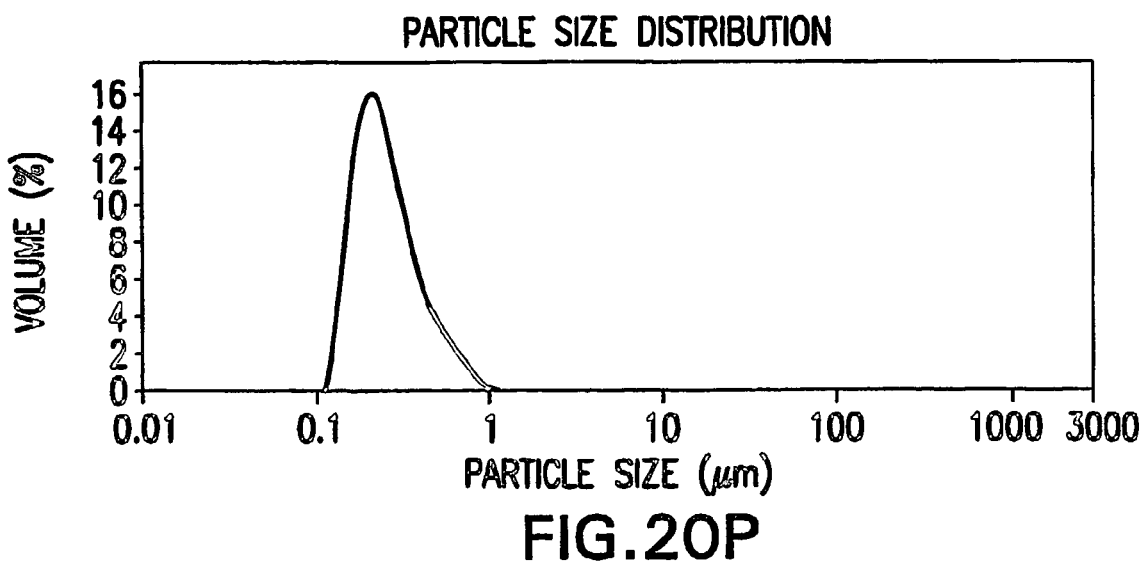
Figure 20Q:
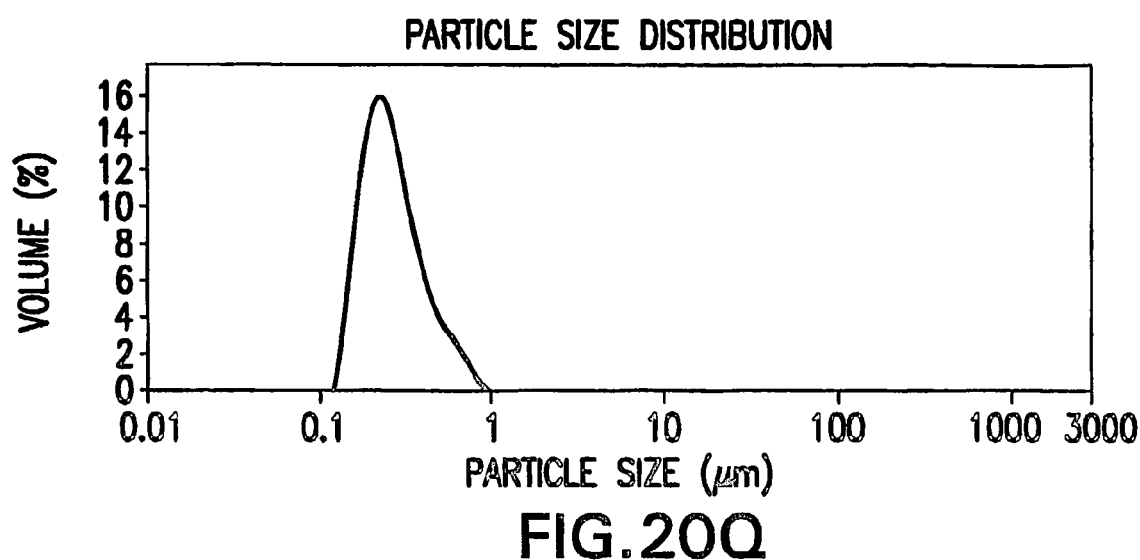
Figure 20R:
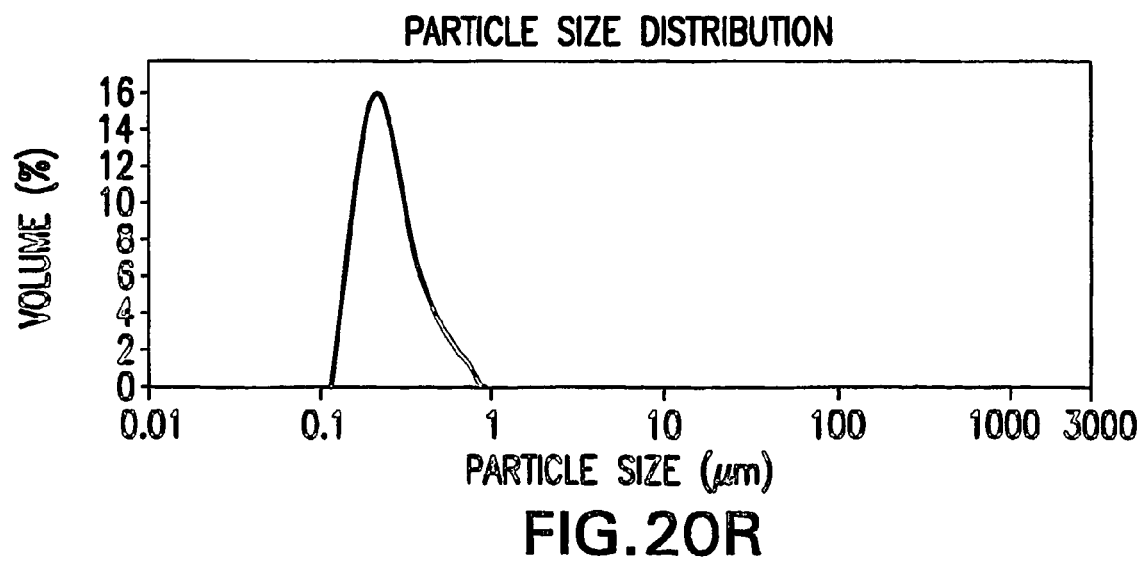
Figure 20S:
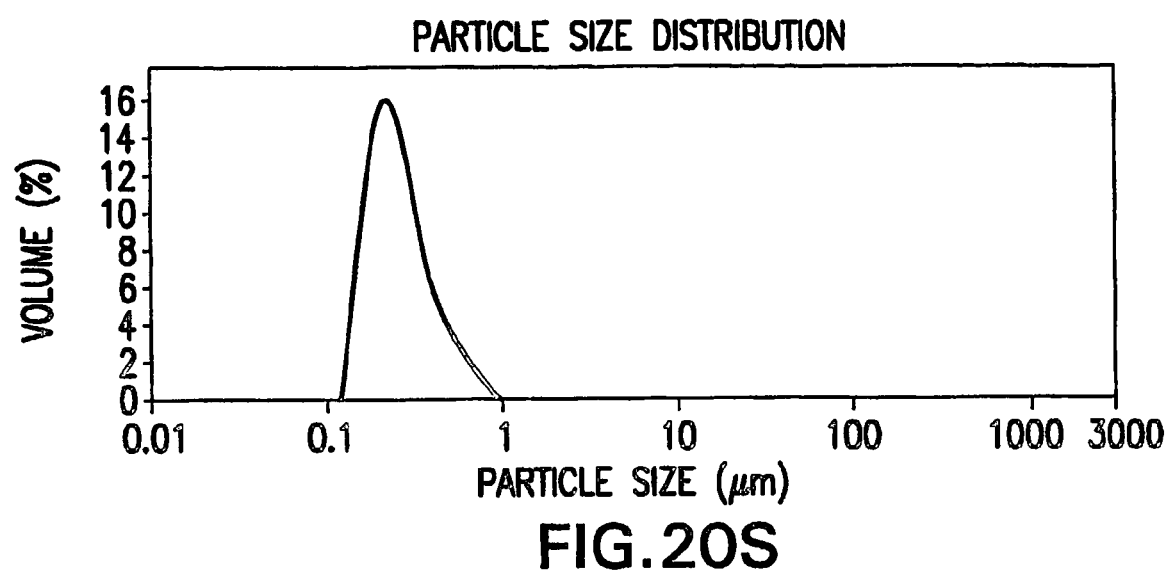
Figure 20T:
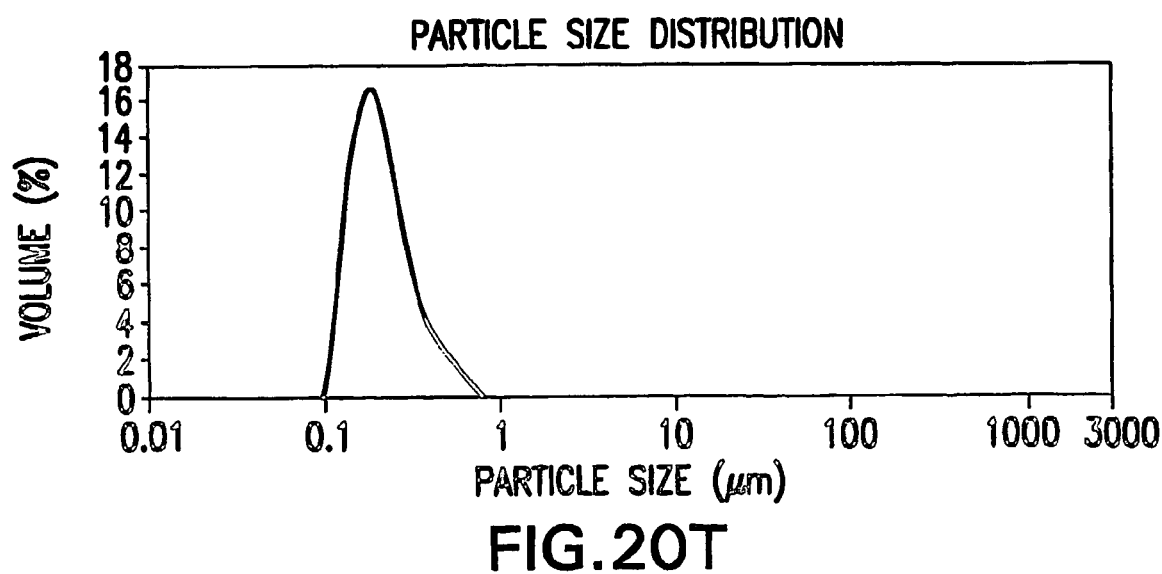
Figure 20U:
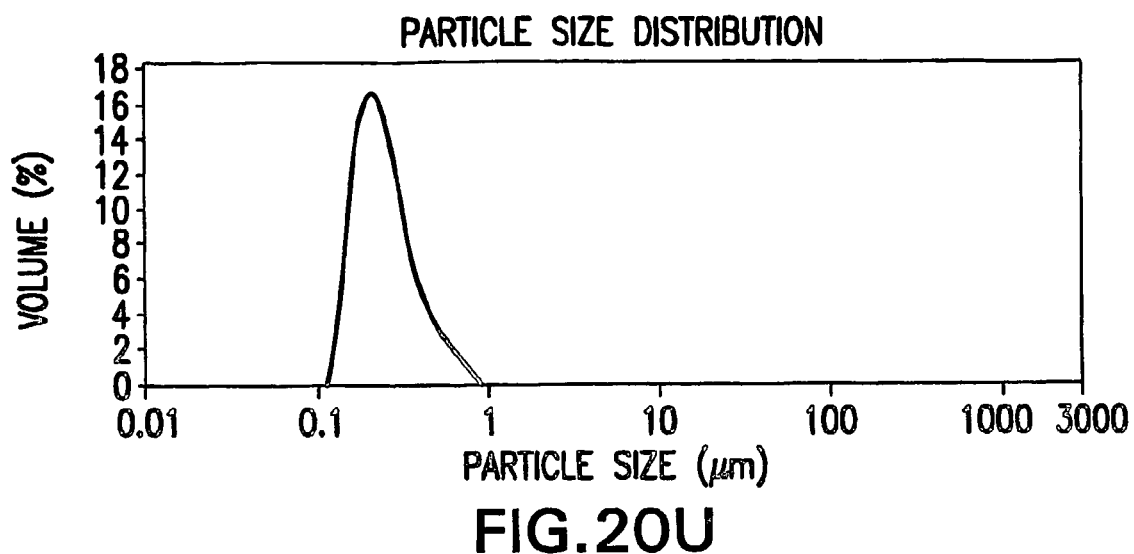

| Time of Sonication/Particle Size Measurement (Minutes) | Mean Value Particle Size (μm) | Percentage of PTFE Particles Below 1.00 μm in Size (%) | FIGURE Number (Showing Particle Size Distribution Graph) |
|---|---|---|---|
| 0 | 11.353 | 11.19 | FIG. 20(A) |
| 2 | 7.479 | 21.58 | FIG. 20(B) |
| 3 | 6.317 | 29.97 | FIG. 20(C) |
| 4 | 5.979 | 37.86 | FIG. 20(D) |
| 5 | 4.717 | 53.45 | FIG. 20(E) |
| 6 | 4.251 | 60.81 | FIG. 20(F) |
| 7 | 3.875 | 64.90 | FIG. 20(G) |
| 8 | 3.534 | 67.26 | FIG. 20(H) |
| 10 | 2.968 | 71.61 | FIG. 20(I) |
| 12 | 2.115 | 80.19 | FIG. 20(J) |
| 13 | 2.114 | 80.59 | FIG. 20(K) |
| 16 | 1.319 | 83.54 | FIG. 20(L) |
| 19 | 0.329 | 96.86 | FIG. 20(M) |
| 20 | 0.313 | 98.01 | FIG. 20(N) |
| 21 | 0.289 | 99.24 | FIG. 20(O) |
| 22 | 0.283 | 99.99 | FIG. 20(P) |
| 24 | 0.282 | 100.00 | FIG. 20(Q) |
| 25 | 0.281 | 100.00 | FIG. 20(R) |
| 26 | 0.281 | 100.00 | FIG. 20(S) |
| 30 | 0.271 | 100.00 | FIG. 20(T) |
| 32 | 0.271 | 100.00 | FIG. 20(U) |

Figure 21:
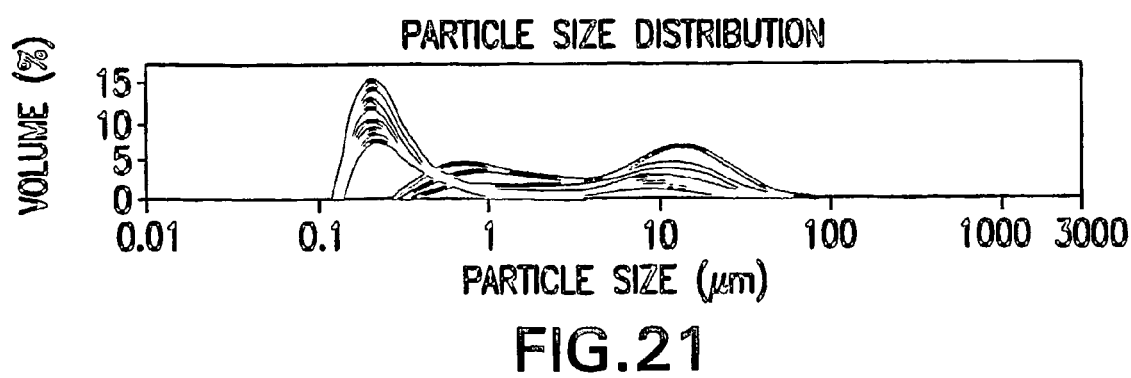
FIG. 21 shows a graph of the particle size distribution curves of FIG. 20 superimposed to show how the particle size distribution changed during the 24-minute period of sonication and particle size measurement.

Note that FIG. 20(Q), the particle size distribution graph obtained after 24 minutes of sonication, represents the point at which 100% of the PTFE particles in Sample 4.1 were below 1.00 μm in size. Thus, a particle size distribution graph showing all of the distribution curves for that 24-minute time period was obtained and is included FIG. 21. The cumulative results in FIG. 21 allow the user to see how distribution changed during the 24-minute period of sonication and surement for Sample 4.1.

Figure 22:
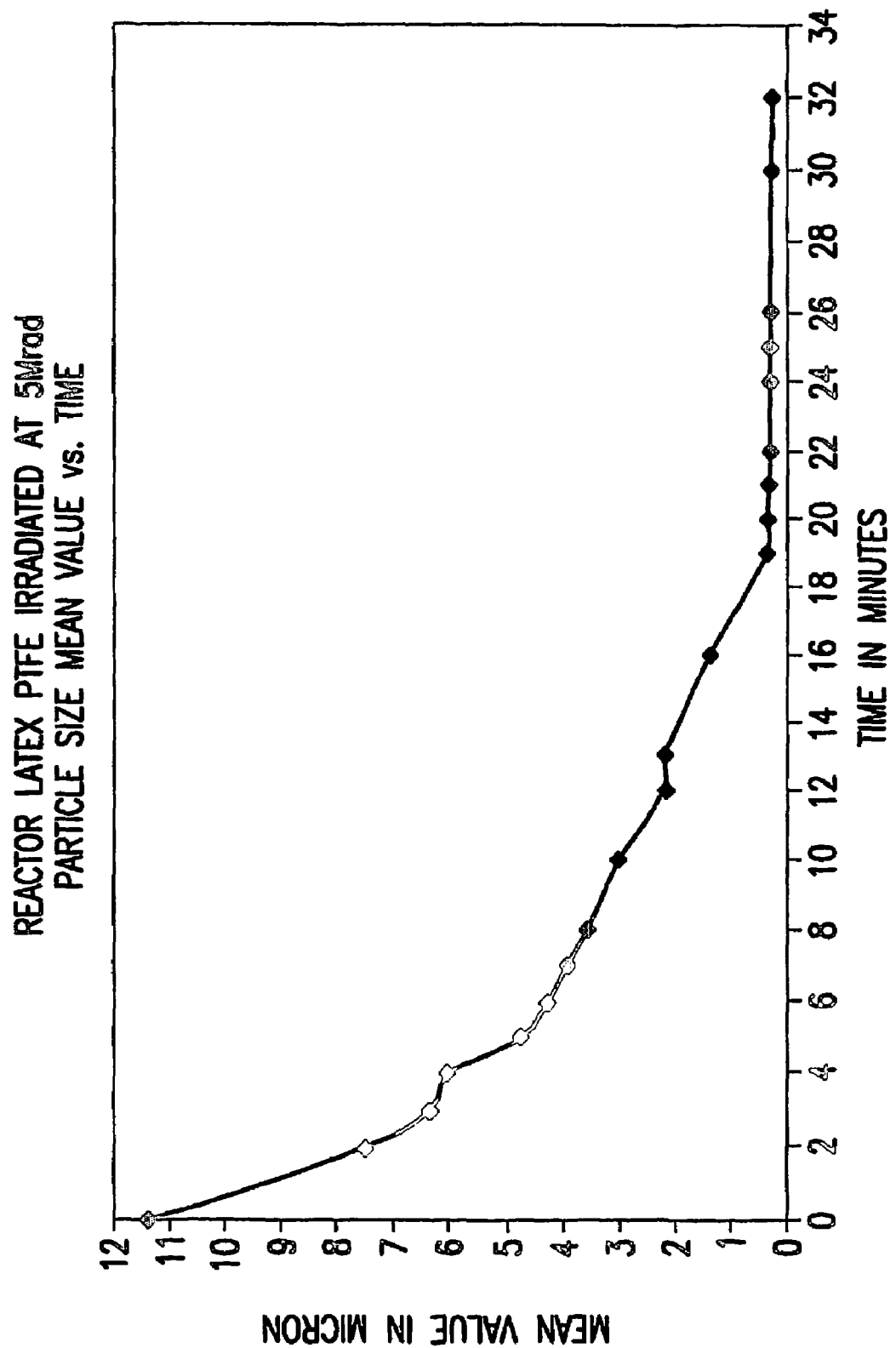
FIG. 22 shows a graph of the mean PTFE particle size of samples irradiated at 5 Megarads vs. time of sonication.
Figure 23:
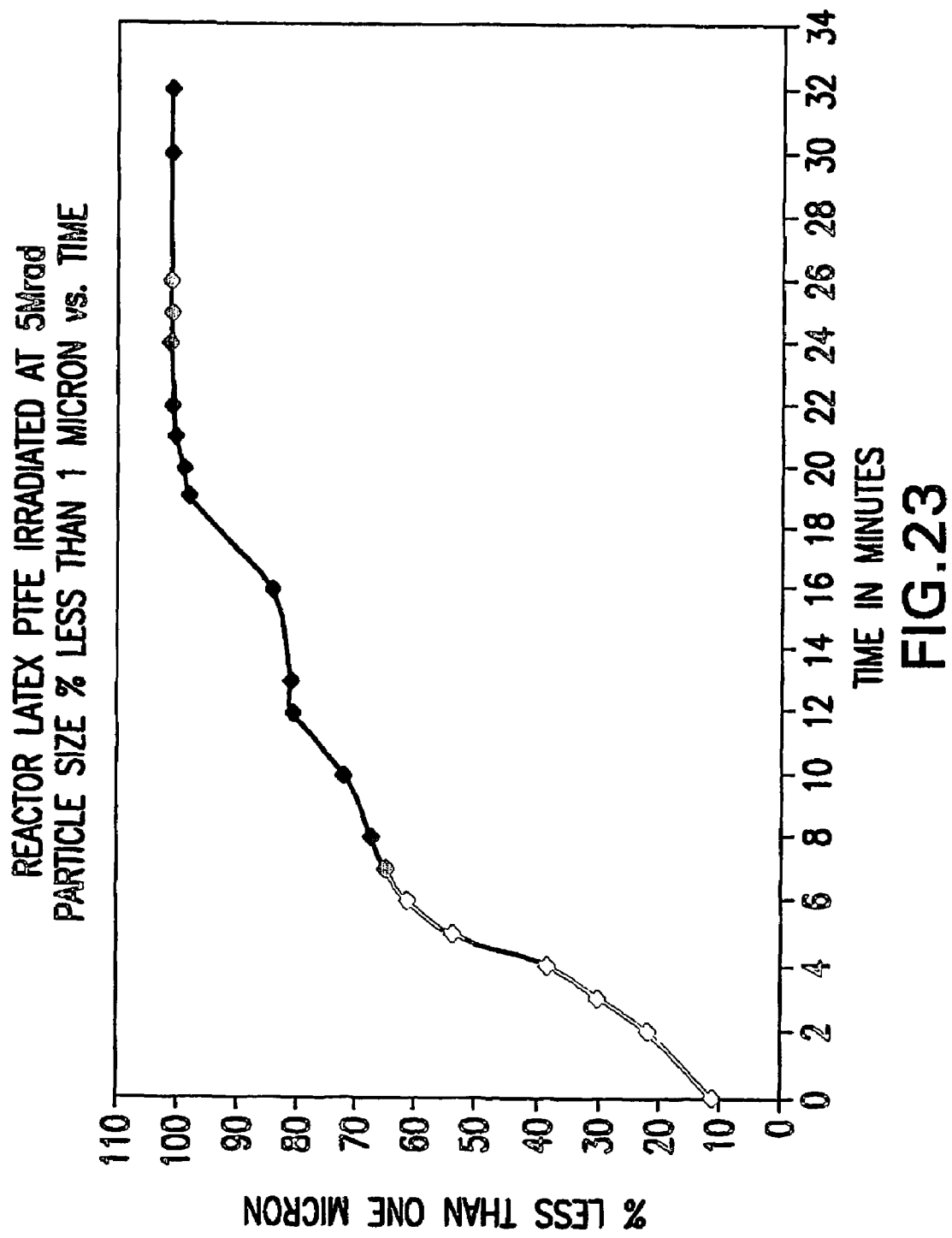
FIG. 23 shows a graph of the percentage of PTFE particles irradiated at 5 Megarads with a particle size less than 1.00 µm in size vs. time of sonication.

From the results recorded in Table 8 above, a plot was made of the particle size mean value of Sample 4.1 over time and is included as FIG. 22. As time increased to about 19 or more minutes, the PTFE particles in the sample were shown to be well dispersed to submicron size in that the mean particle size value was submicrom after about 19 minutes. Similarly, a plot was made showing how the percentage of the PTFE particles that were less than 1.00 μm in size increased over time. The plot is included as FIG. 23, and after about 19 minutes of sonication and particle size analysis, it is evident that close to 100% of the PTFE particles were less than 1.00 μm in size and thus were dispersed to submicron size.

Detailed particle size data was also obtained for Sample 4.5 (the sample of PTFE powder where the PTFE reactor latex starting material had been irradiated at 25 megarads). The sonication and particle size measurements were allowed to persist for 22 minutes, and the data obtained was recorded in Table 9 bellow:

TABLE 9

Particle Size Distribution Data for PTFE Powder Sample 4.5
(Reactor Latex Irradiated at 25 Megarads)

Figure 24A:
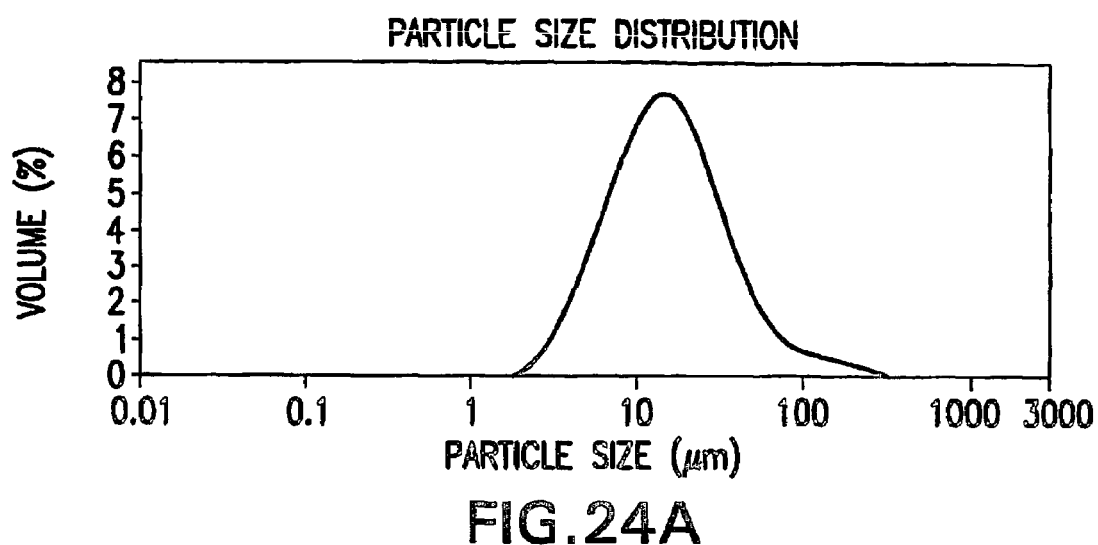
FIG. 24 shows a graph of particle size distribution data of PTFE powder from reactor latex PTFE irradiated at 25 Megarads and sonicated for (a) 0 minutes; (b) 1 minutes; (c) 2 minutes; (d) 3 minutes; (e) 5 minutes; (f) 7 minutes; (g) 8 minutes; (h) 10 minutes; (i) 12 minutes; (j) 13 minutes; (k) 15 minutes; (l) 17 minutes; (m) 18 minutes; (n) 19 minutes; (o) 20 minutes; (p) 22 minutes.
Figure 24B:
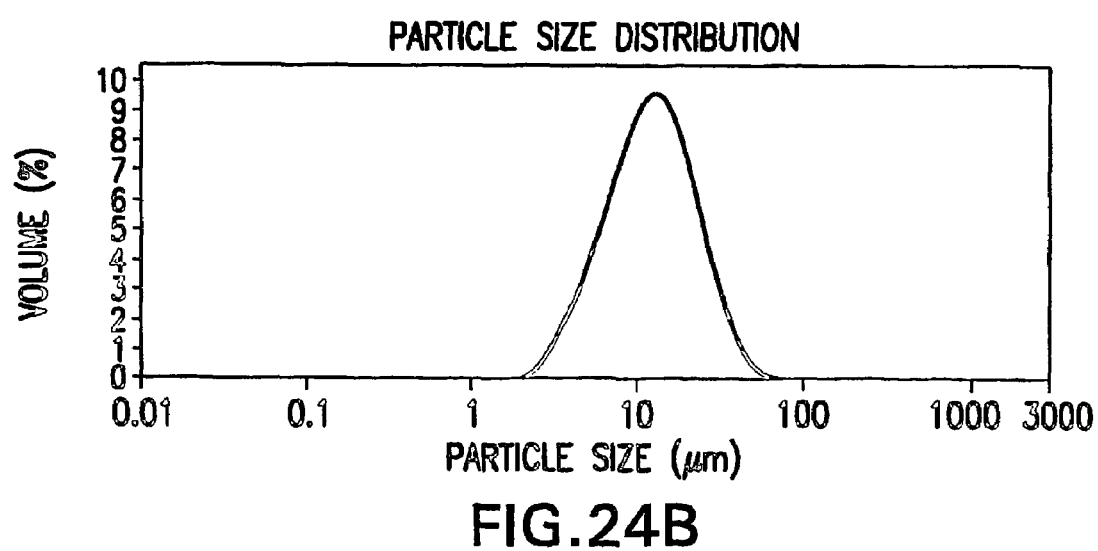
Figure 24C:
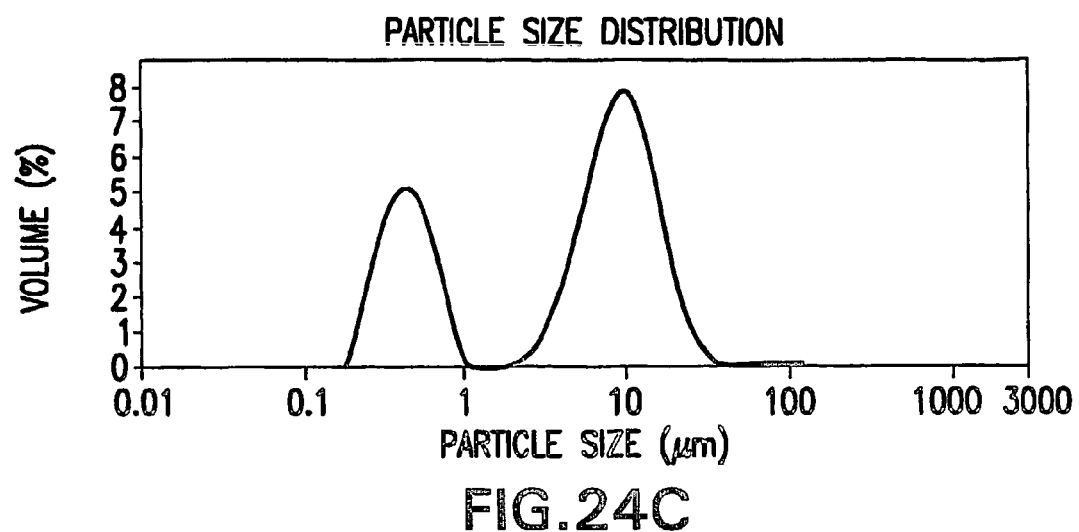
Figure 24D:
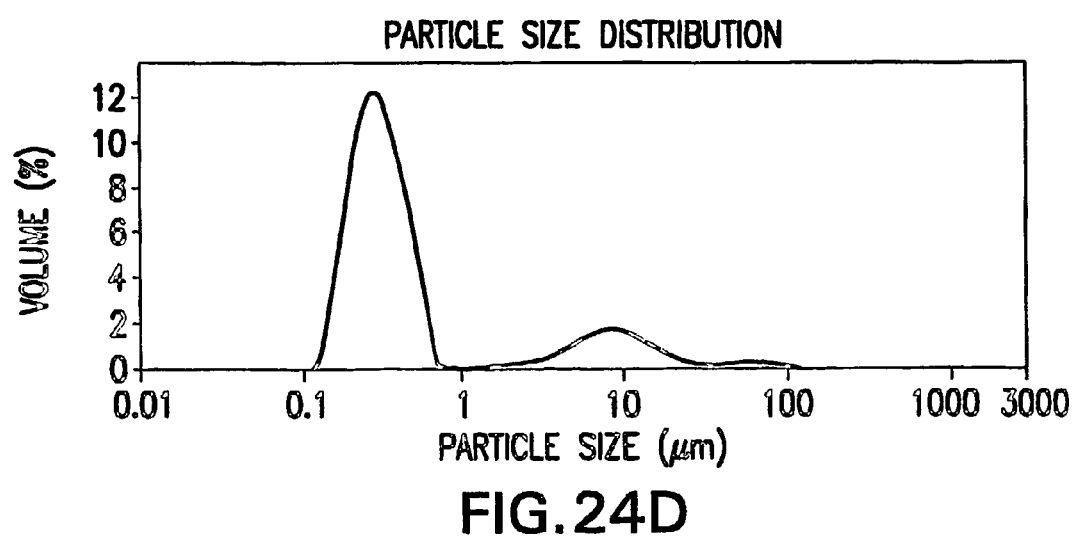
Figure 24E:
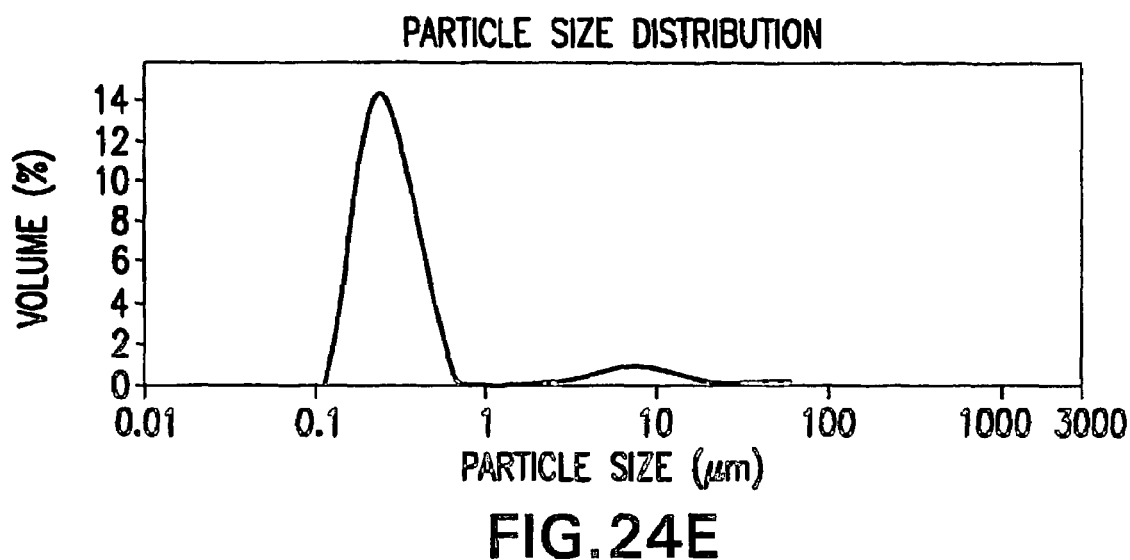
Figure 24F:
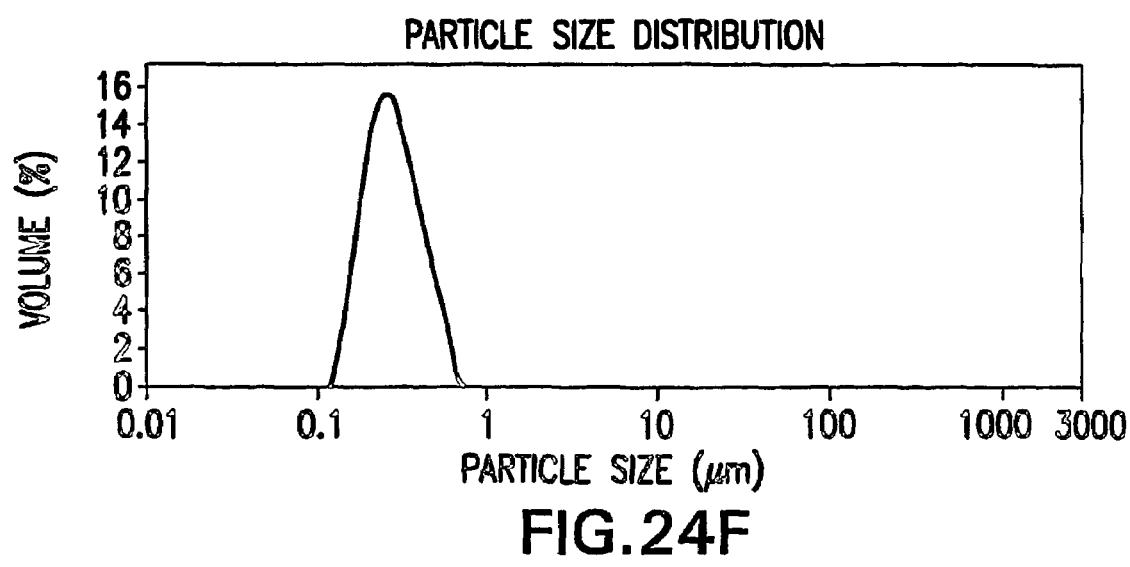
Figure 24G:
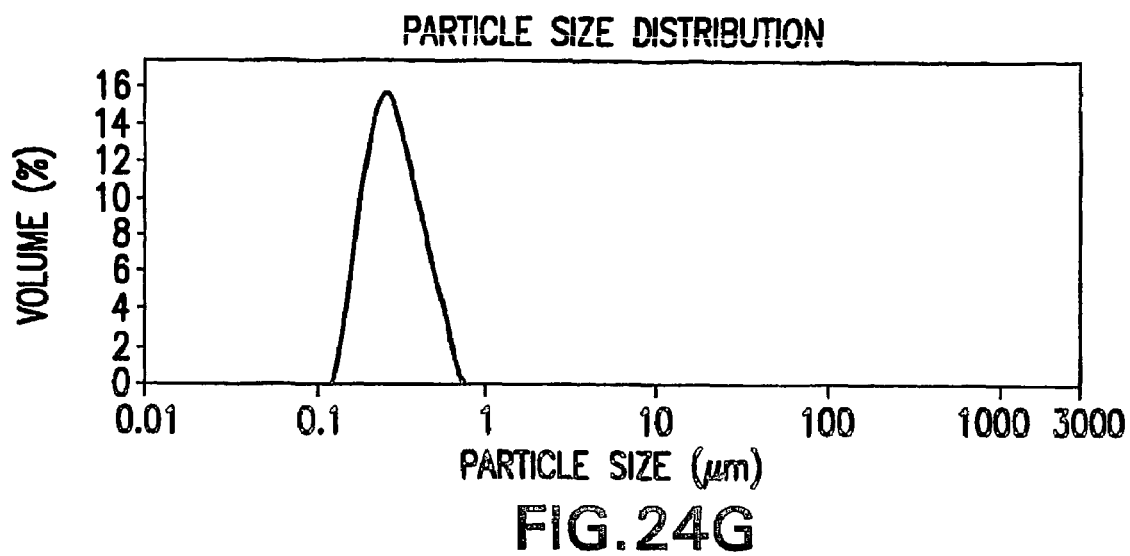
Figure 24H:
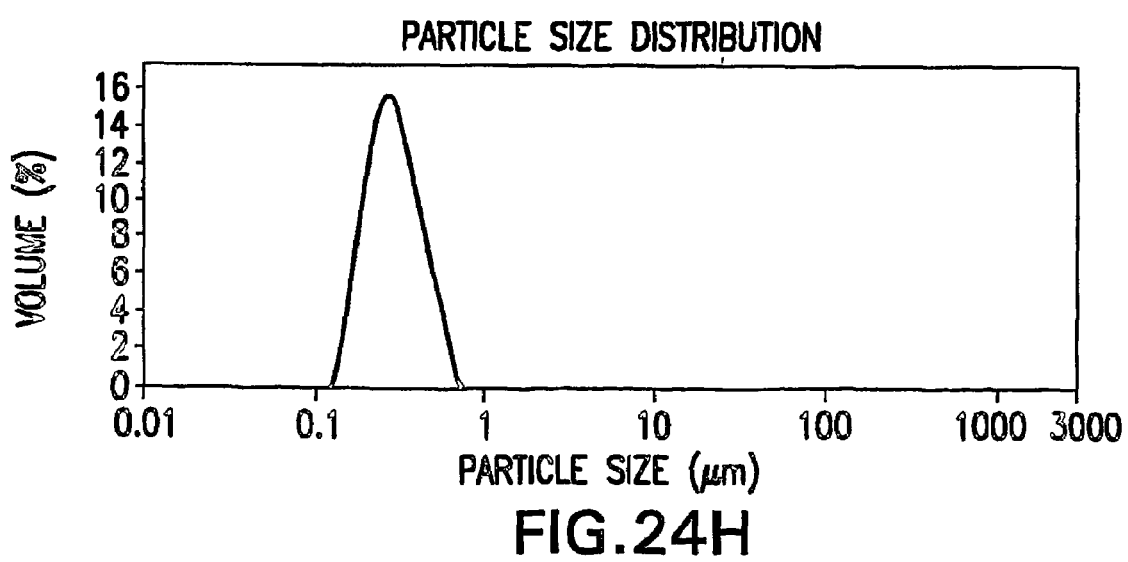
Figure 24I:
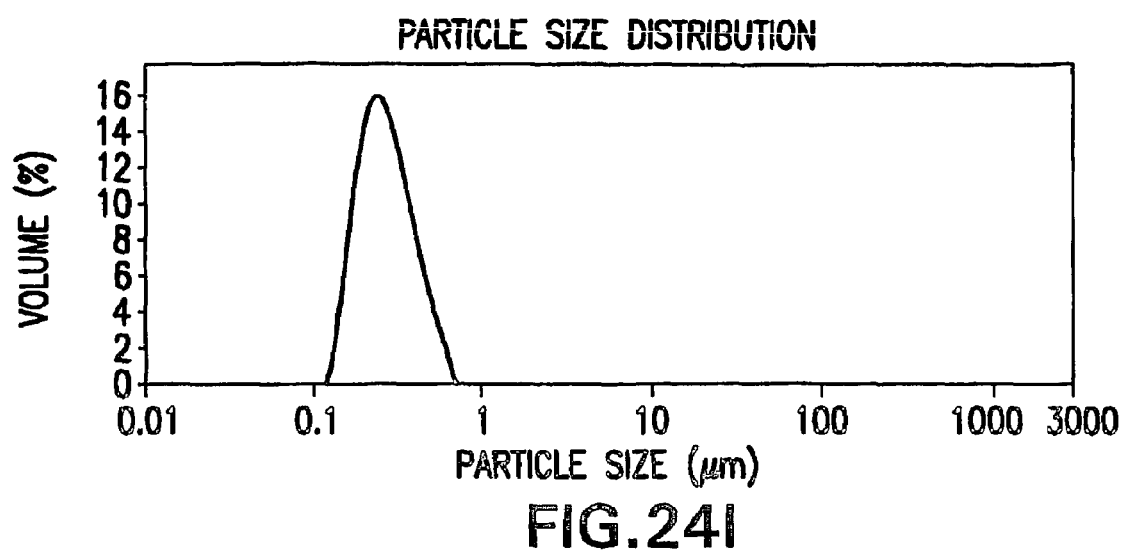
Figure 24J:
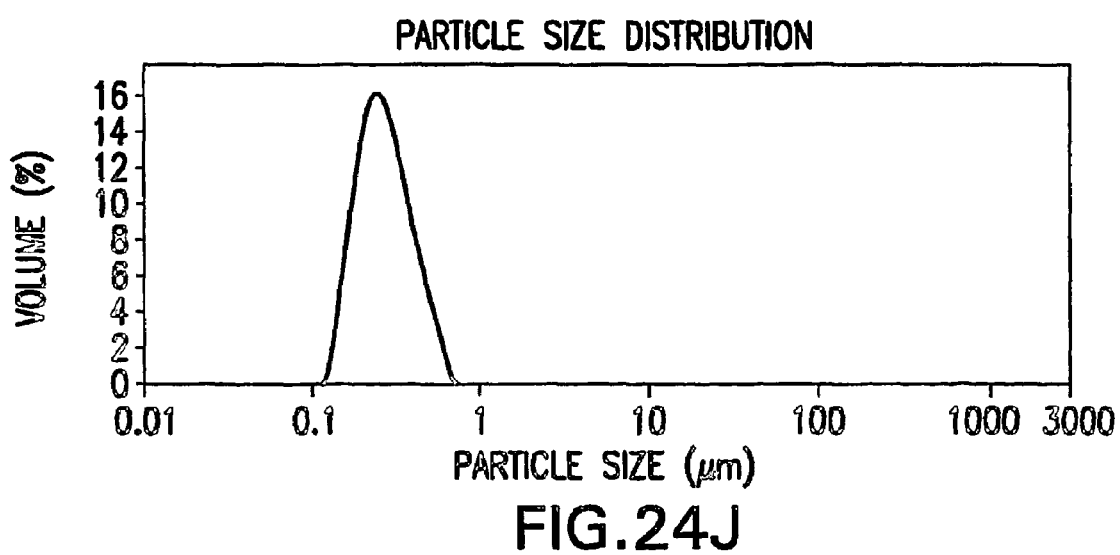
Figure 24K:
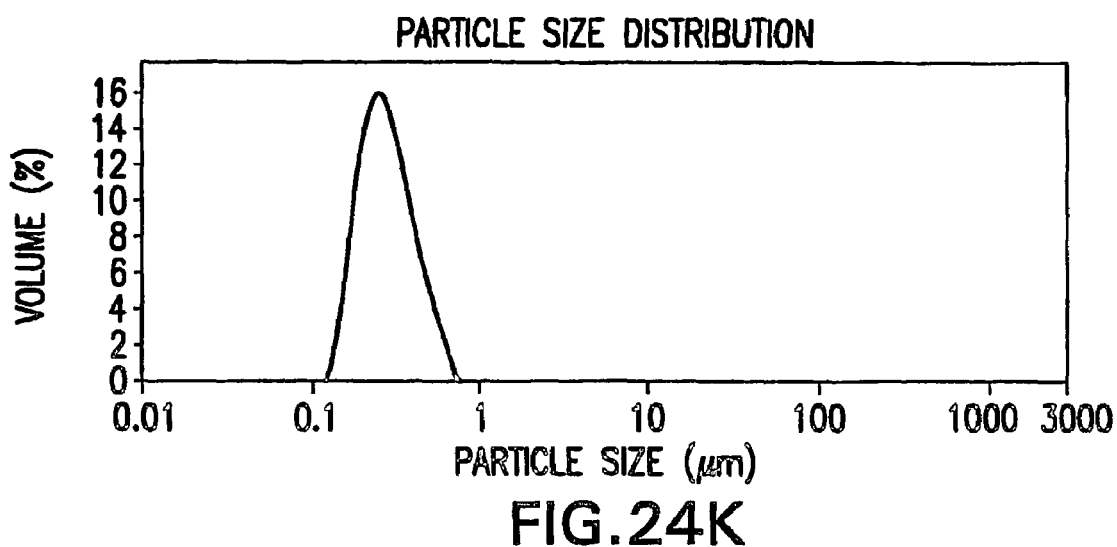
Figure 24L:
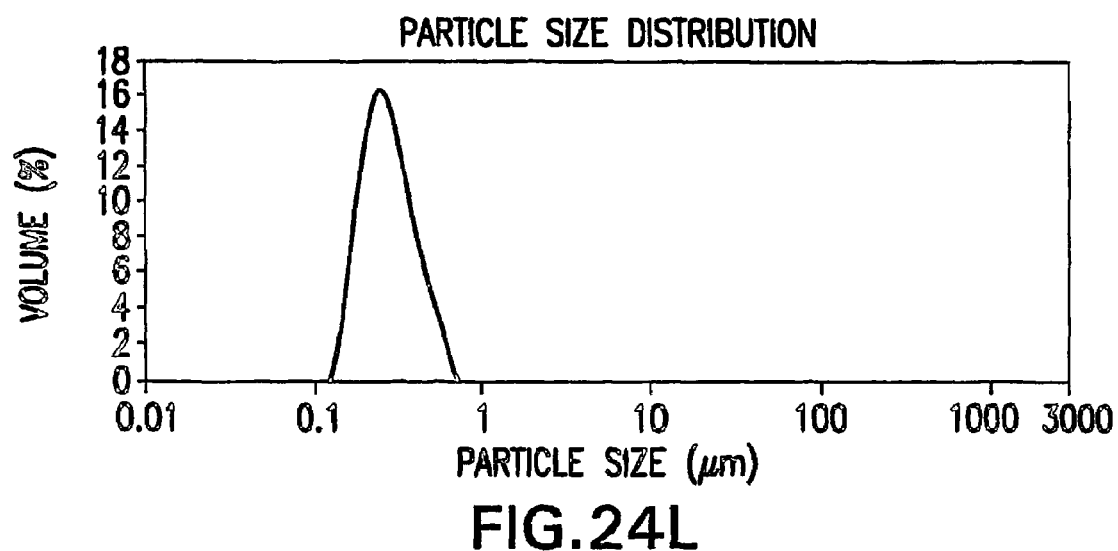
Figure 24M:
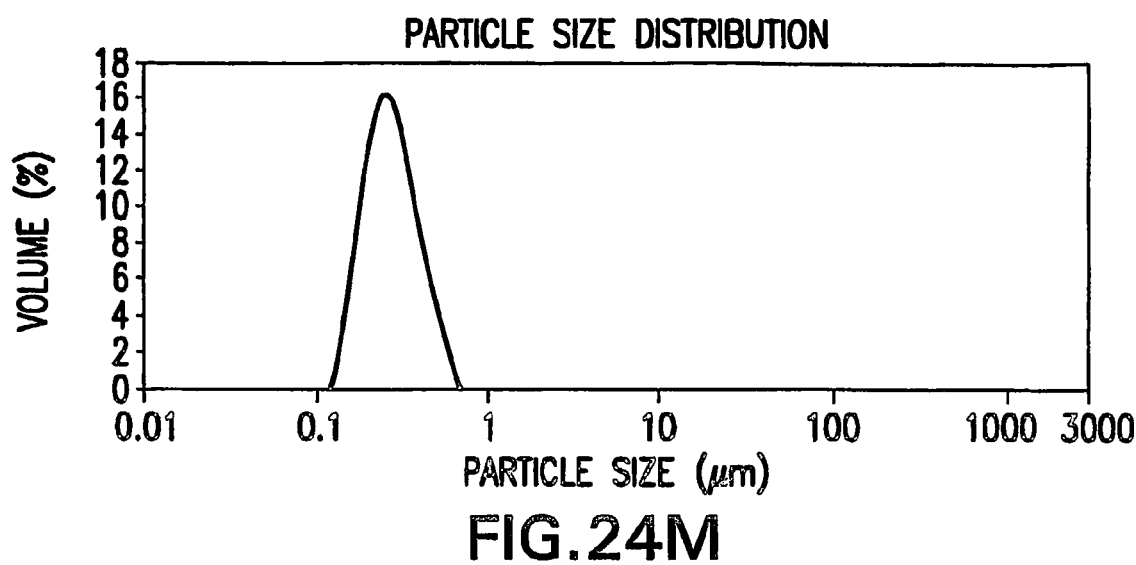
Figure 24N:
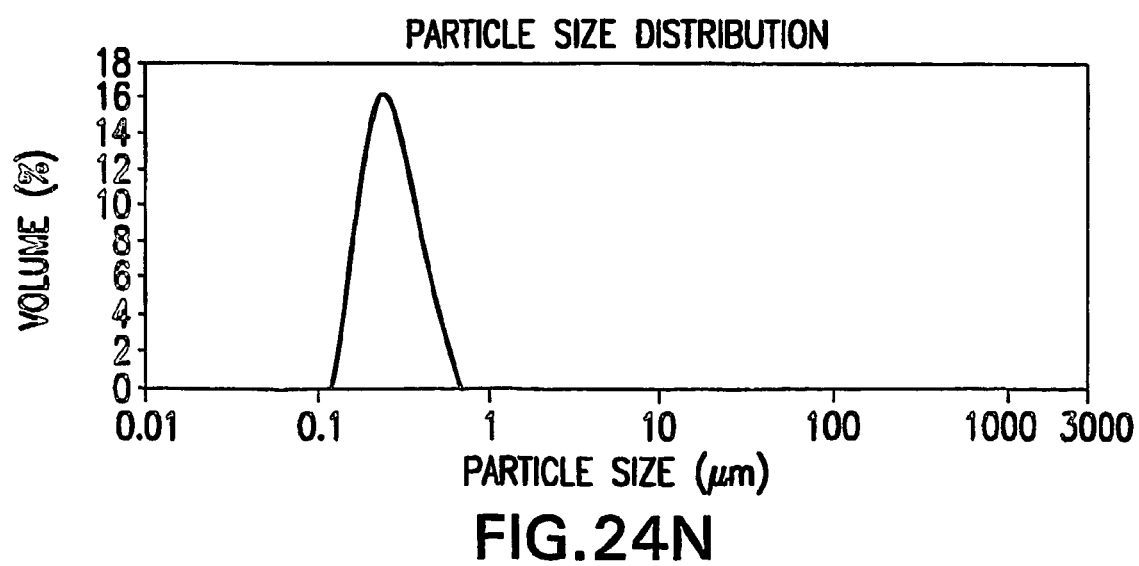
Figure 24O:
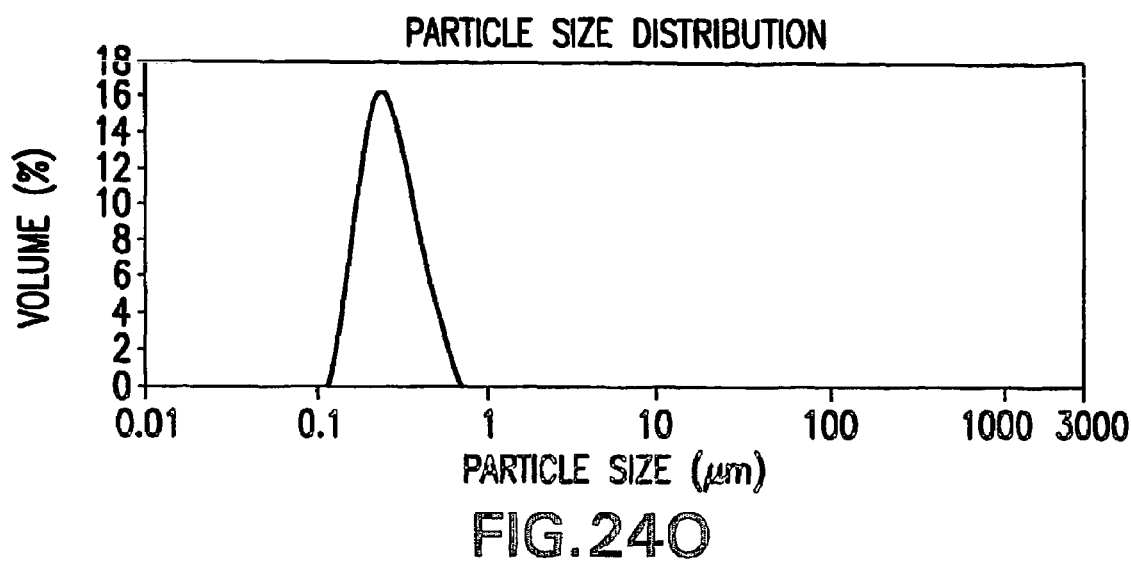
Figure 24P:
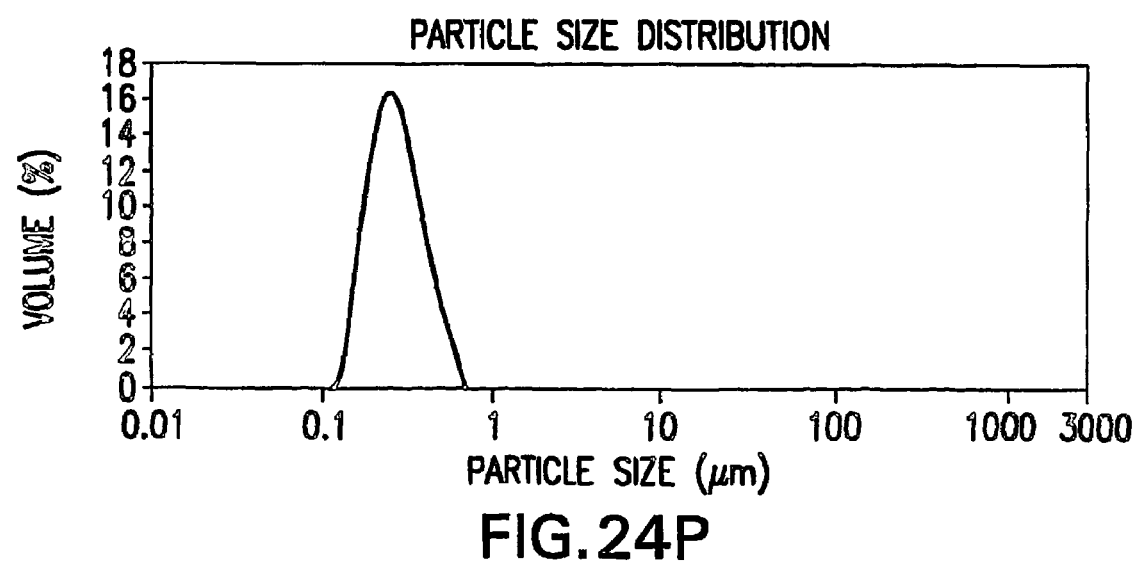

| Time of Sonication/Particle Size Measurement (Minutes) | Mean Value Particle Size (μm) | Percentage of PTFE Particles Below 1.00 μm in Size (%) | FIGURE Number (Showing Particle Size Distribution Graph) |
|---|---|---|---|
| 0 | 24.917 | 0.00 | FIG. 24(A) |
| 1 | 14.234 | 0.00 | FIG. 24(B) |
| 2 | 8.227 | 34.33 | FIG. 24(C) |
| 3 | 2.595 | 82.58 | FIG. 24(D) |
| 5 | 1.374 | 90.02 | FIG. 24(E) |
| 7 | 0.294 | 100.00 | FIG. 24(F) |
| 8 | 0.292 | 100.00 | FIG. 24(G) |
| 10 | 0.292 | 100.00 | FIG. 24(H) |
| 12 | 0.281 | 100.00 | FIG. 24(I) |
| 13 | 0.280 | 100.00 | FIG. 24(J) |
| 15 | 0.280 | 100.00 | FIG. 24(K) |
| 17 | 0.280 | 100.00 | FIG. 24(L) |
| 18 | 0.279 | 100.00 | FIG. 24(M) |
| 19 | 0.279 | 100.00 | FIG. 24(N) |
| 20 | 0.279 | 100.00 | FIG. 24(O) |
| 22 | 0.278 | 100.00 | FIG. 24(P) |

Figure 25:
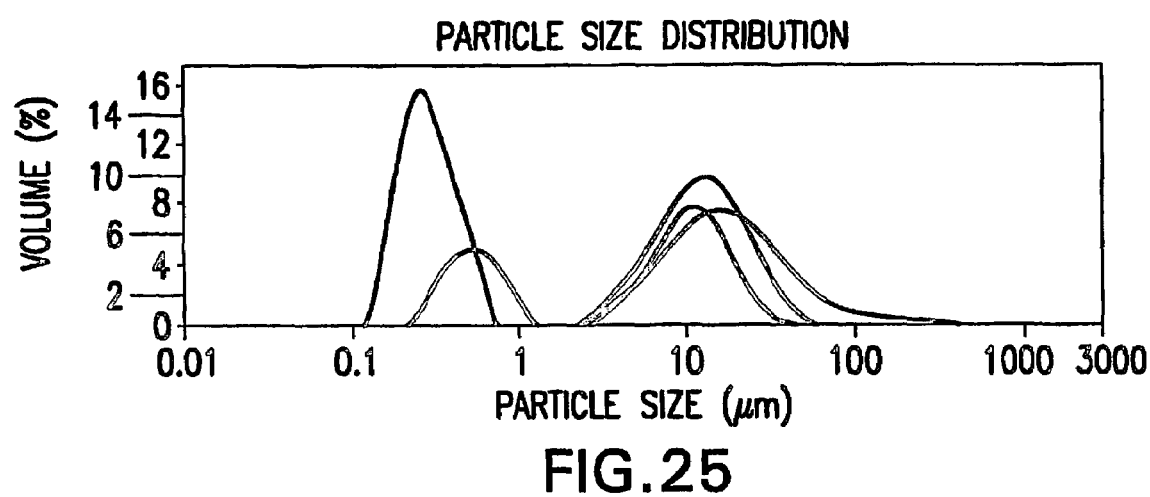
FIG. 25 shows a graph of the particle size distribution curves of FIG. 24 superimposed to show how the particle size distribution changed during the 7-minute period of sonication and particle size measurement.

Note that FIG. 24(F), the particle size distribution graph obtained after 7 minutes of sonication, represents the point at which 100% of the PTFE particles in Sample 4.5 were below 1.00 μm in size. Thus, a particle size distribution graph showing all of the distribution curves for that 7-minute time period was obtained and is included as FIG. 25. The cumulative results in FIG. 25 allow the user to observe how the particle size distribution of the PTFE particles changed during the 7-minute period of sonication and particle size measurement for Sample 4.5.

Figure 26:
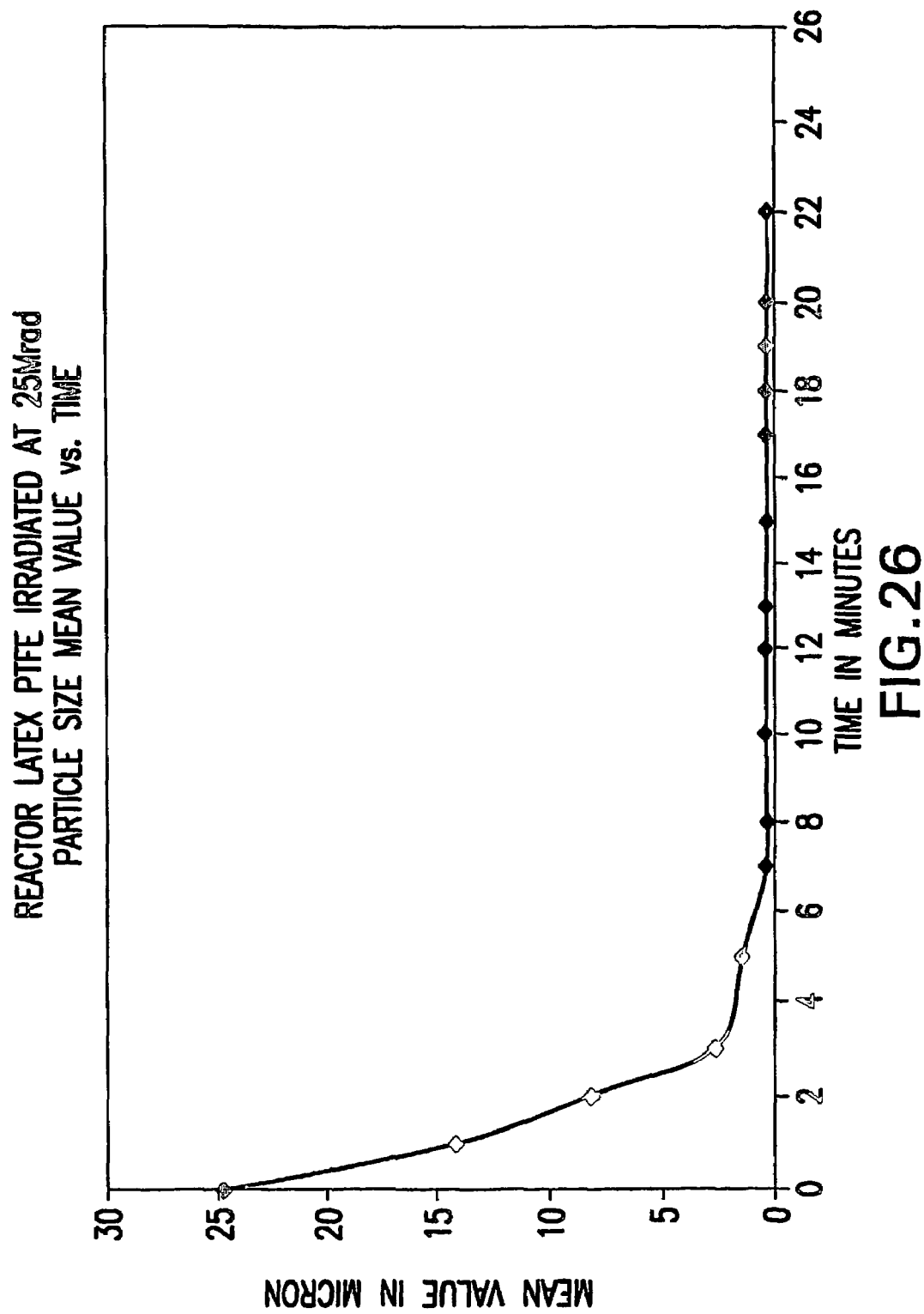
FIG. 26 shows a graph of the mean PTFE particle size of samples irradiated at 25 Megarads vs. time of sonication.
Figure 27:
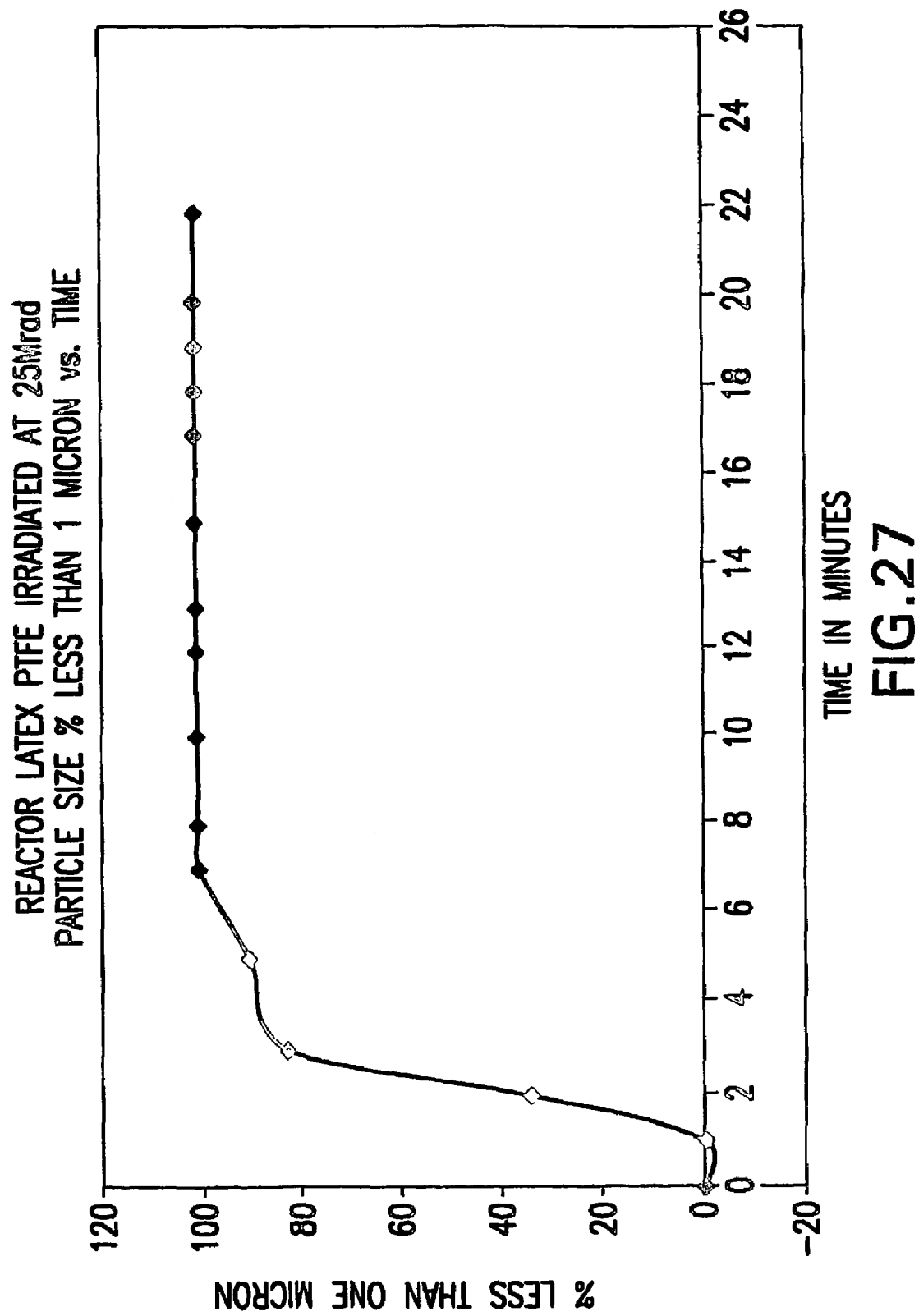
FIG. 27 shows a graph of the percentage of PTFE particles irradiated at 25 Megarads with a particle size less than 1.00 µm in size vs. time of sonication.

From the results recorded in Table 9 above, a plot was made of the particle size mean value of Sample 4.5 over time, and the plot is included as FIG. 26. As time increased to about 7 or more minutes, the PTFE particles in the sample were shown to be well dispersed to submicron size in that the mean particle size value was submicron after about 7 minutes. Similarly, a plot was made showing how the percentage of the PTFE particles that were less than 1.00 μm in size increased over time. The plot is included as FIG. 27, and after about 7 minutes of sonication and particle size analysis, it is evident that close to 100% of the PTFE particles were less than 1.00 μm in size and thus were dispersed to submicron size.

Additionally, detailed particle size data was obtained for Sample 4.6, the sample of PTFE powder wherein the PTFE reactor latex starting material had been irradiated at 25 megarads and had also undergone pH adjustment to have a neutral pH of about 7 to 8. The sonication and particle size measurements persisted for 24 minutes, and the data obtained was recorded in Table 10 below:

TABLE 10

Particle Size Distribution Data for PTFE Powder Sample 4.6
(Reactor Latex Irradiated at 25 Megarads and pH-Adjusted to pH = 7-8)

Figure 28A:
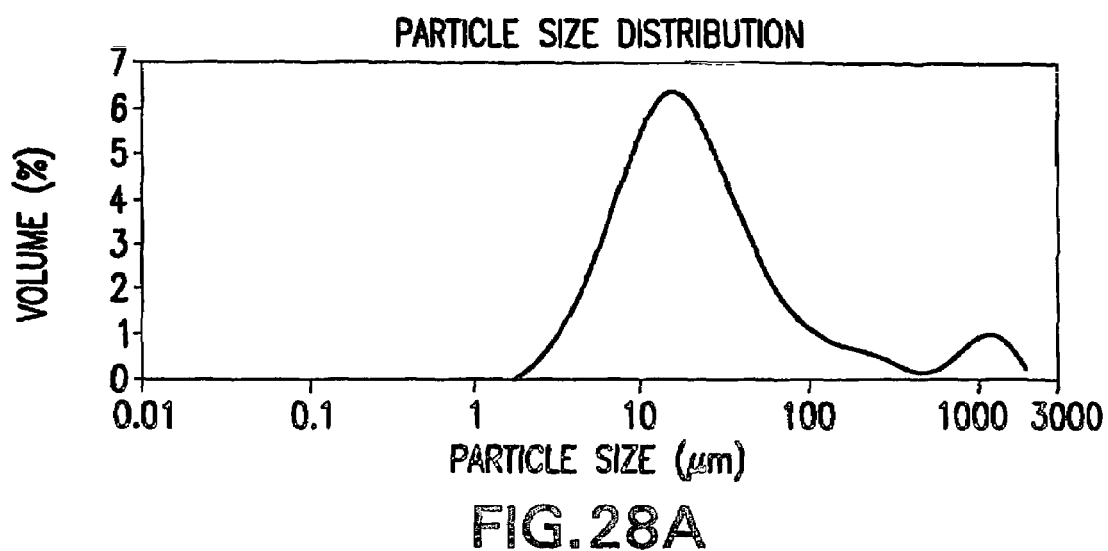
FIG. 28 shows a graph of particle size distribution data of PTFE powder from reactor latex PTFE irradiated at 25 Megarads, adjusted to a pH between 7 and 8 and sonicated for (a) 0 minutes; (b) 0.5 minutes; (c) 1.5 minutes; (d) 2 minutes; (e) 3 minutes; (f) 4 minutes; (g) 7 minutes; (h) 12 minutes; (i) 14 minutes; (j) 18 minutes; (k) 21 minutes; (l) 23 minutes; (m) 24 minutes.
Figure 28B:
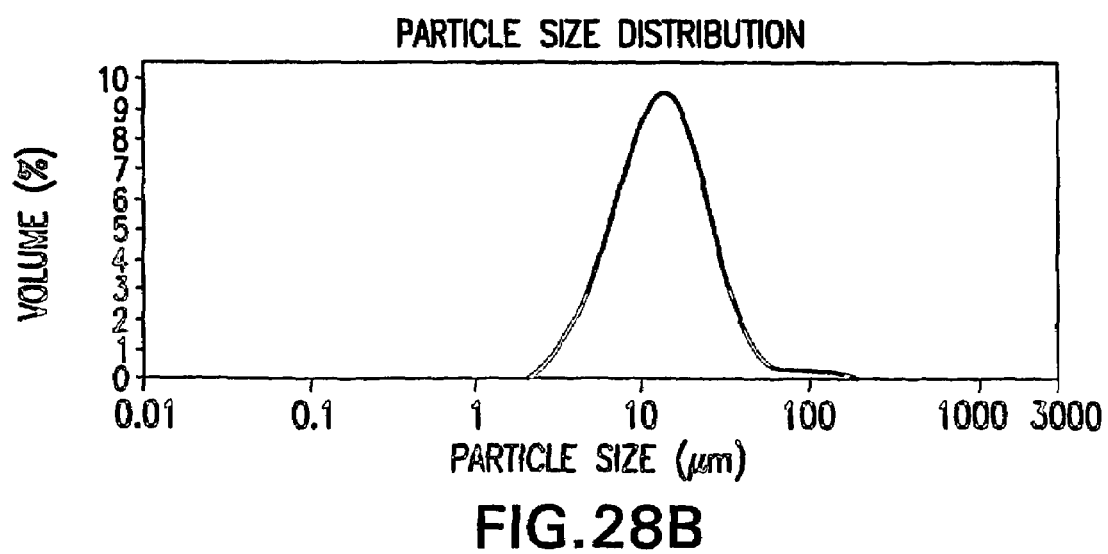

| Time of Sonication/Particle Size Measurement (Minutes) | Mean Value Particle Size (μm) | Percentage of PTFE Particles Below 1.00 μm in Size (%) | FIGURE Number (Showing Particle Size Distribution Graph) |
|---|---|---|---|
| 0 | 101.904 | 0.00 | FIG. 28(A) |
| 0.5 | 17.081 | 0.00 | FIG. 28(B) |

TABLE 10-continued

Particle Size Distribution Data for PTFE Powder Sample 4.6
(Reactor Latex Irradiated at 25 Megarads and pH-Adjusted to pH = 7-8)

Figure 28C:
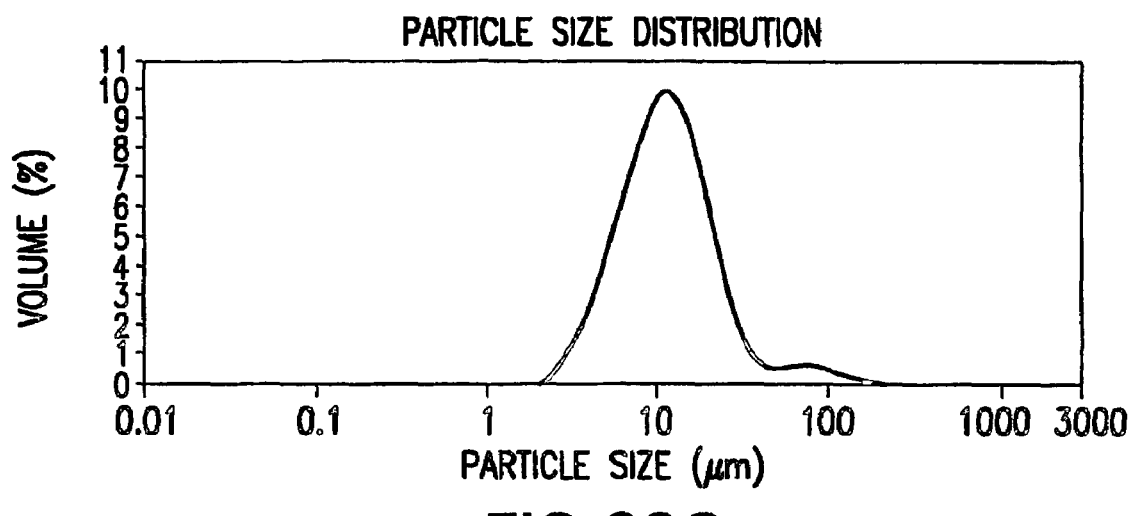
Figure 28D:
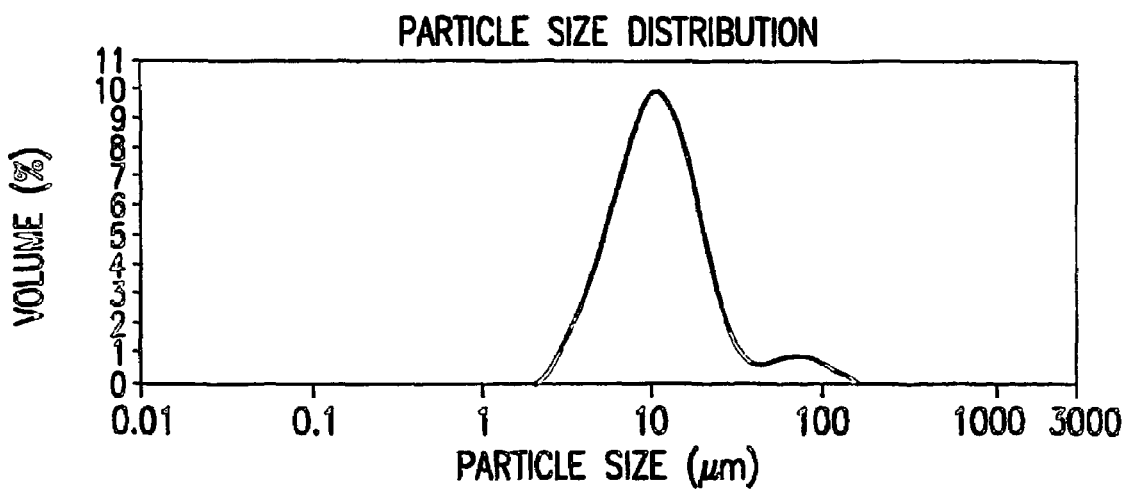
Figure 28E:
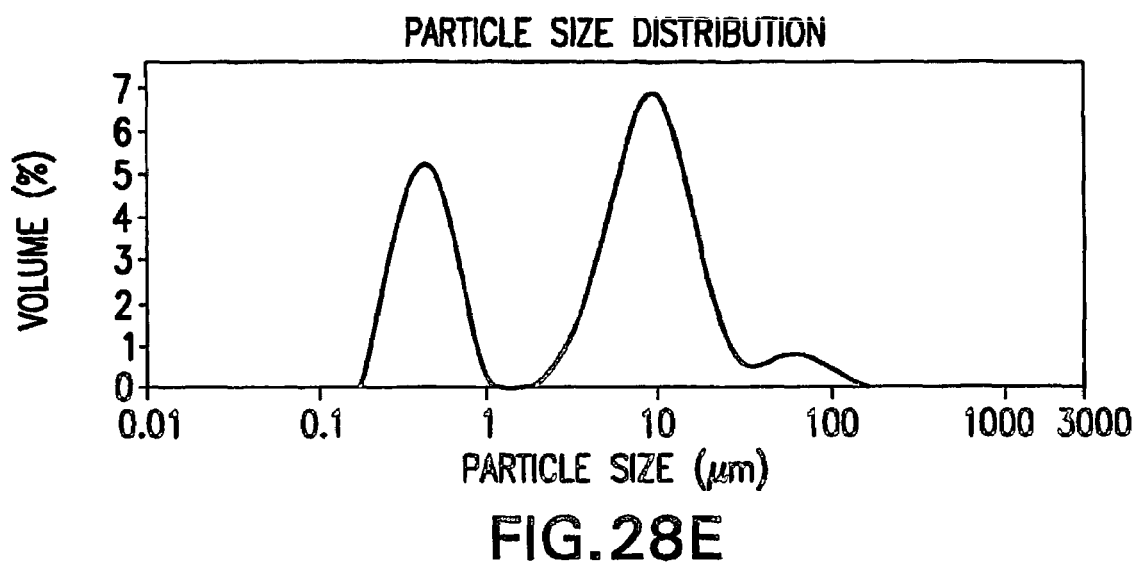
Figure 28F:
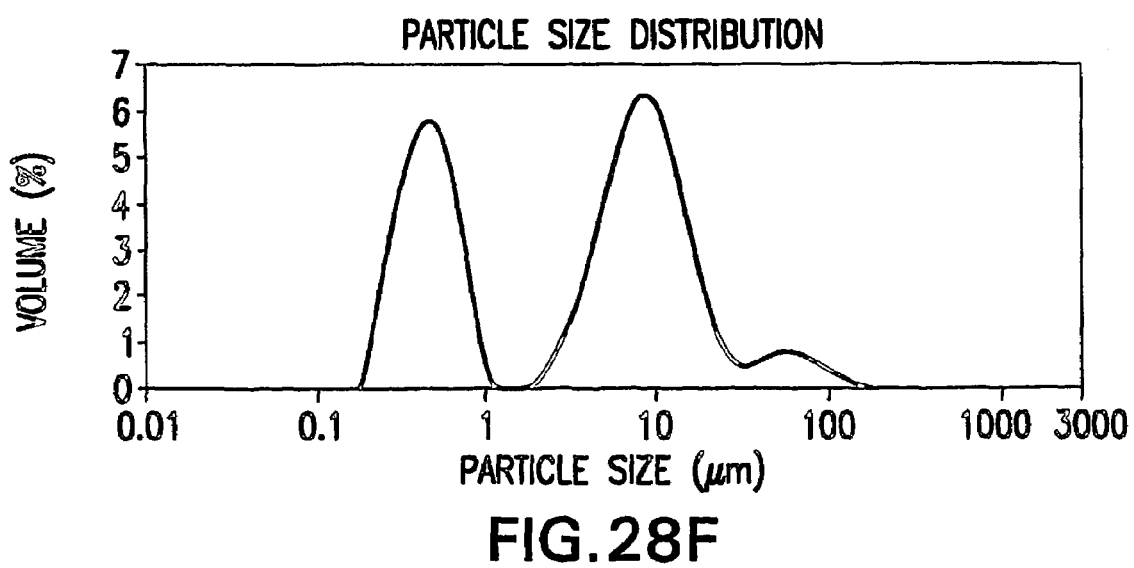
Figure 28G:
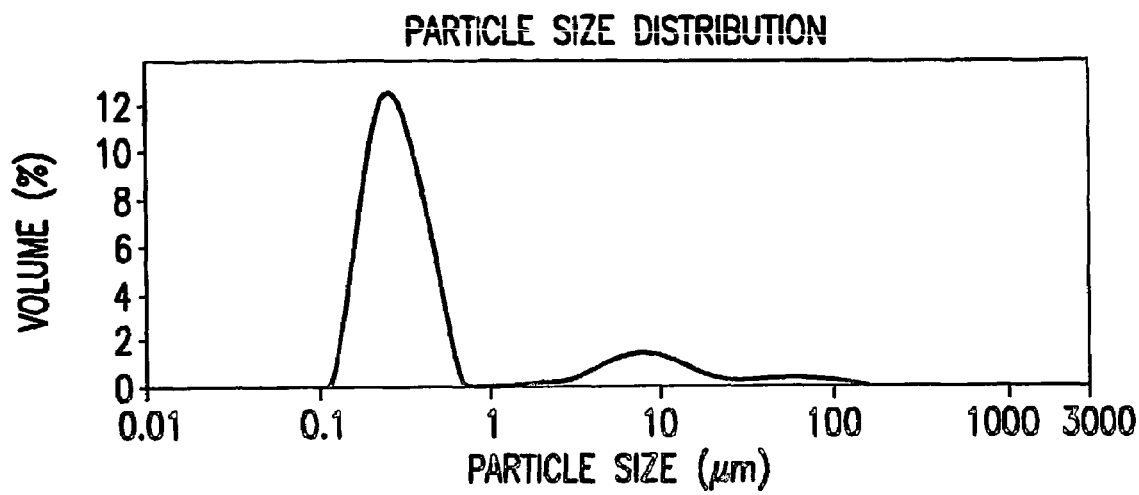
Figure 28H:
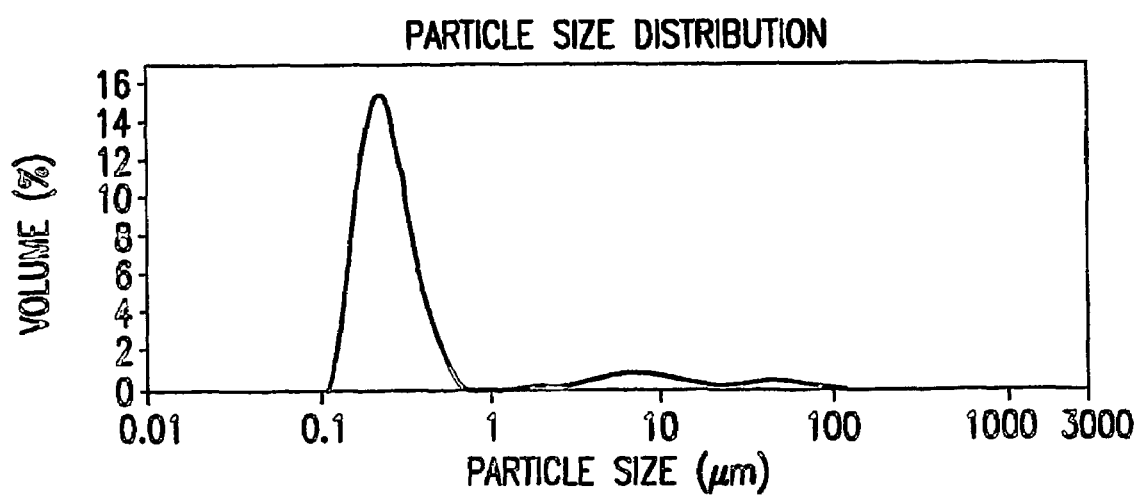
Figure 28I:
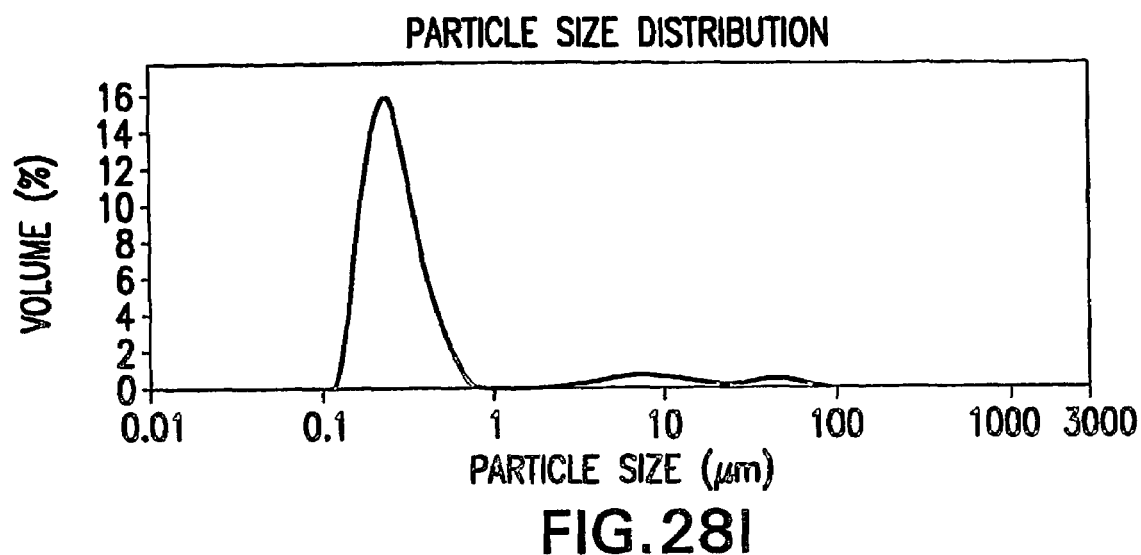
Figure 28J:
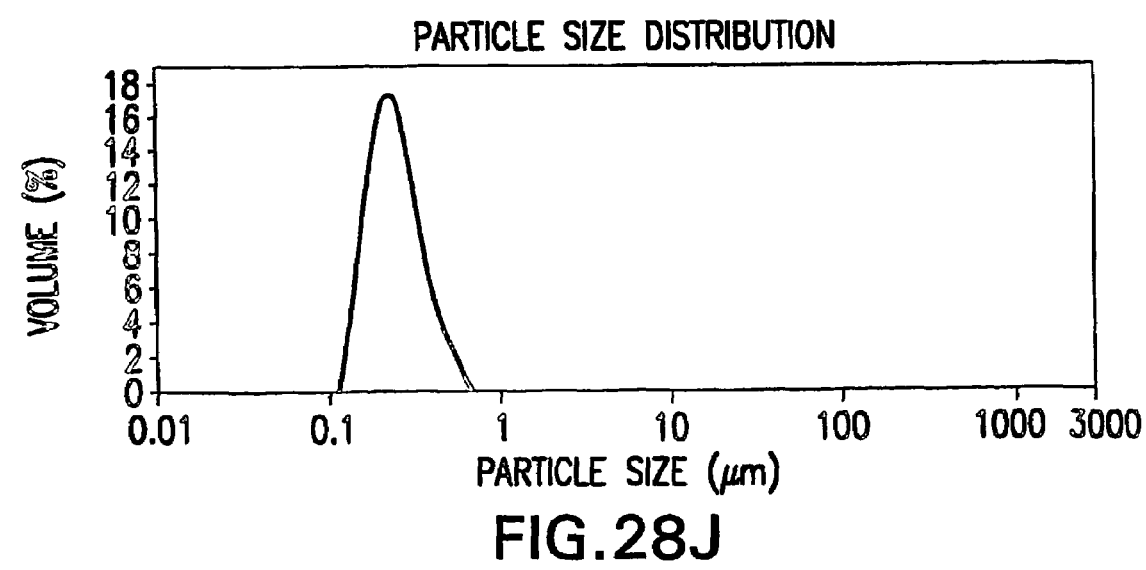
Figure 28K:
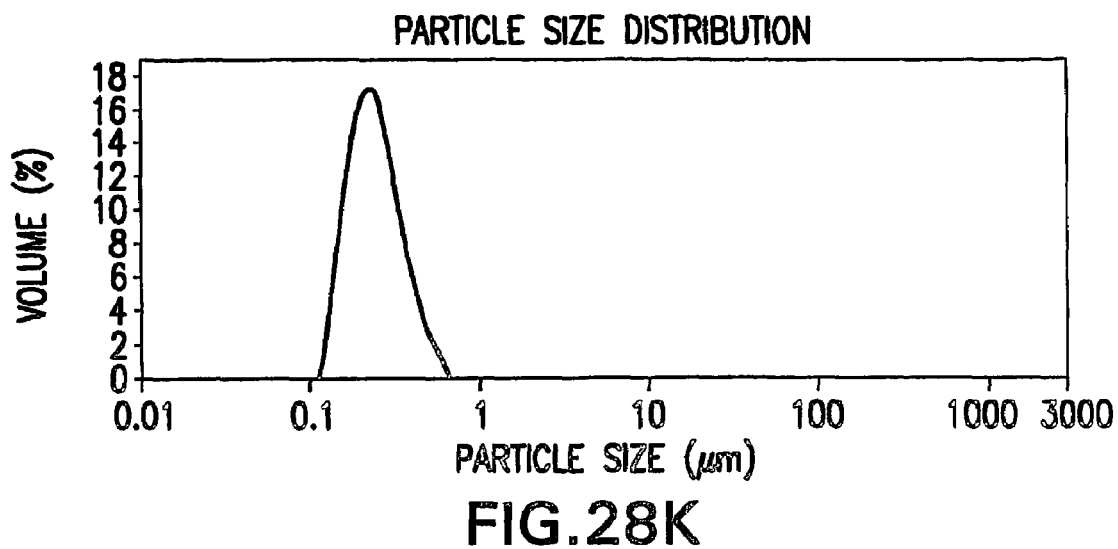
Figure 28L:
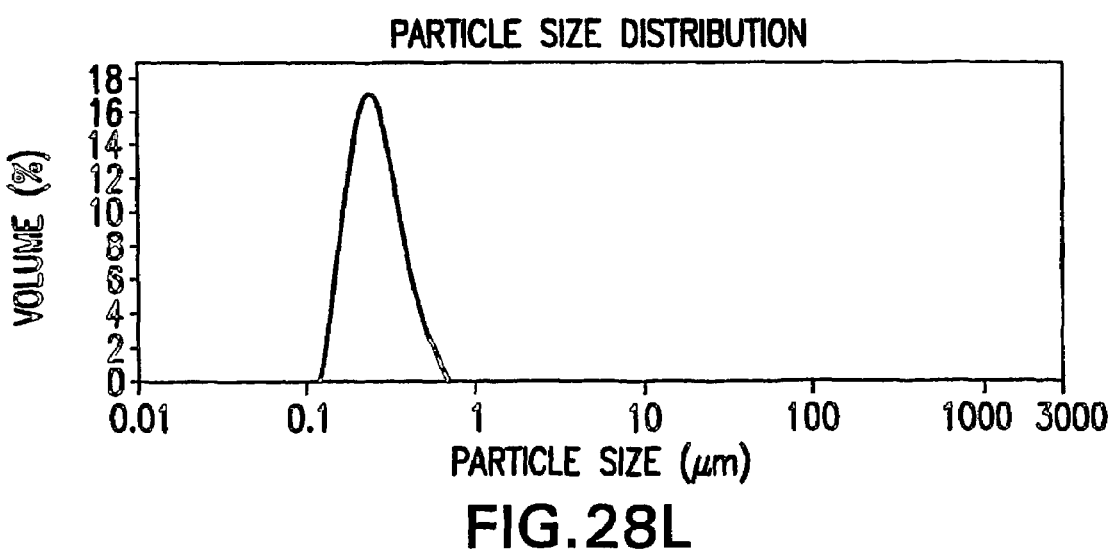
Figure 28M:
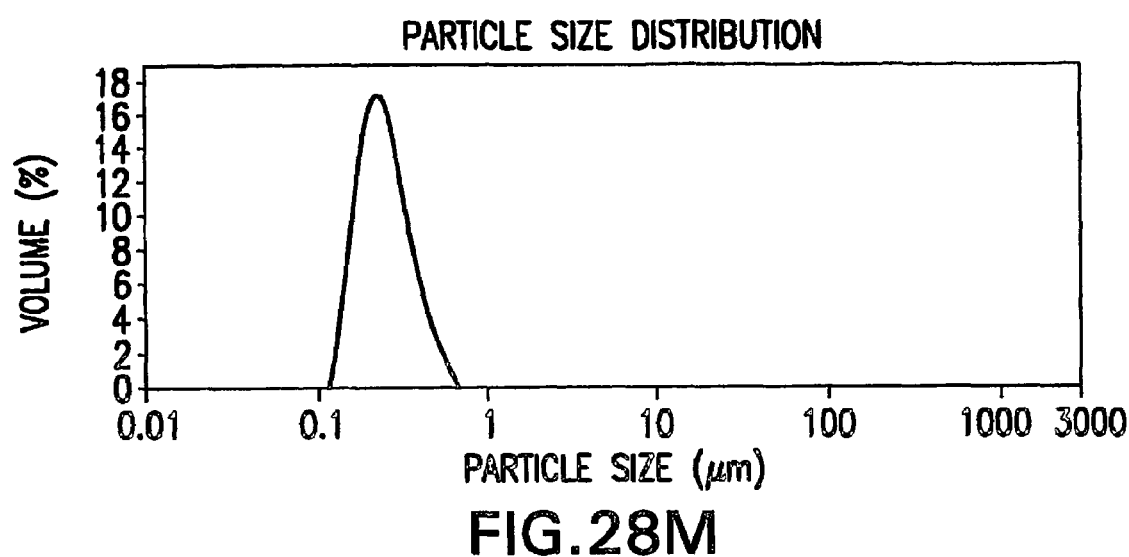

| Time of Sonication/Particle Size Measurement (Minutes) | Mean Value Particle Size (μm) | Percentage of PTFE Particles Below 1.00 μm in Size (%) | FIGURE Number (Showing Particle Size Distribution Graph) |
| --- | --- | --- | --- |
| 1.5 | 15.785 | 0.00 | FIG. 28(C) |
| 2 | 15.695 | 0.00 | FIG. 28(D) |
| 3 | 10.294 | 35.16 | FIG. 28(E) |
| 4 | 9.569 | 38.66 | FIG. 28(F) |
| 7 | 3.396 | 82.62 | FIG. 28(G) |
| 12 | 2.191 | 89.18 | FIG. 28(H) |
| 14 | 1.909 | 90.51 | FIG. 28(I) |
| 18 | 0.267 | 100.00 | FIG. 28(J) |
| 21 | 0.267 | 100.00 | FIG. 28(K) |
| 23 | 0.266 | 100.00 | FIG. 28(L) |
| 24 | 0.258 | 100.00 | FIG. 28(M) |

Figure 29:
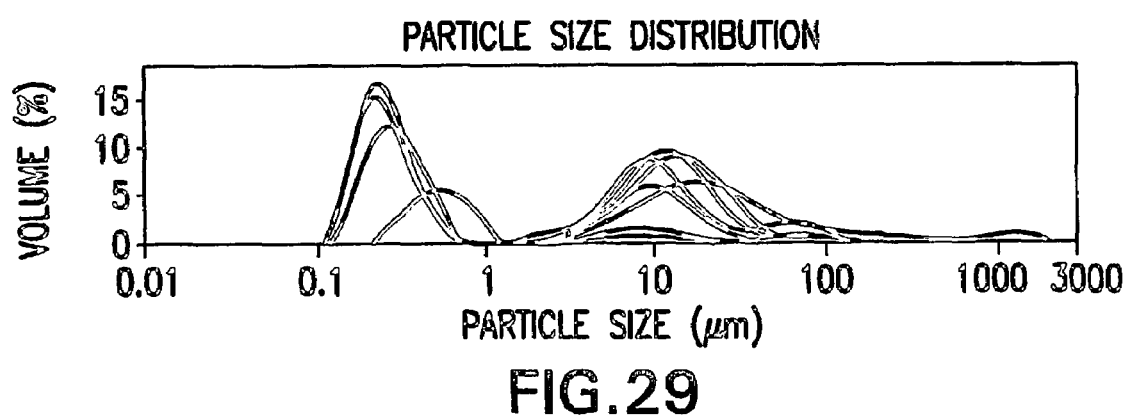
FIG. 29 shows a graph of the particle size distribution curves of FIG. 28 superimposed to show how the particle size distribution changed during the 18-minute period of sonication and particle size measurement.

Note that FIG. 28(J), the particle size distribution graph obtained after 18 minutes of sonication, represents the point at which 100% of the PTFE particles in Sample 4.6 were below 1.00 μm in size. Thus, a particle size distribution graph showing all of the distribution curves for that 18-minute period was obtained and is included as FIG. 29. The cumulative results in FIG. 29 allow the user to see how the particle size distribution changed during the 18-minute period of sonication and particle size analysis for Sample 4.6

Figure 30:
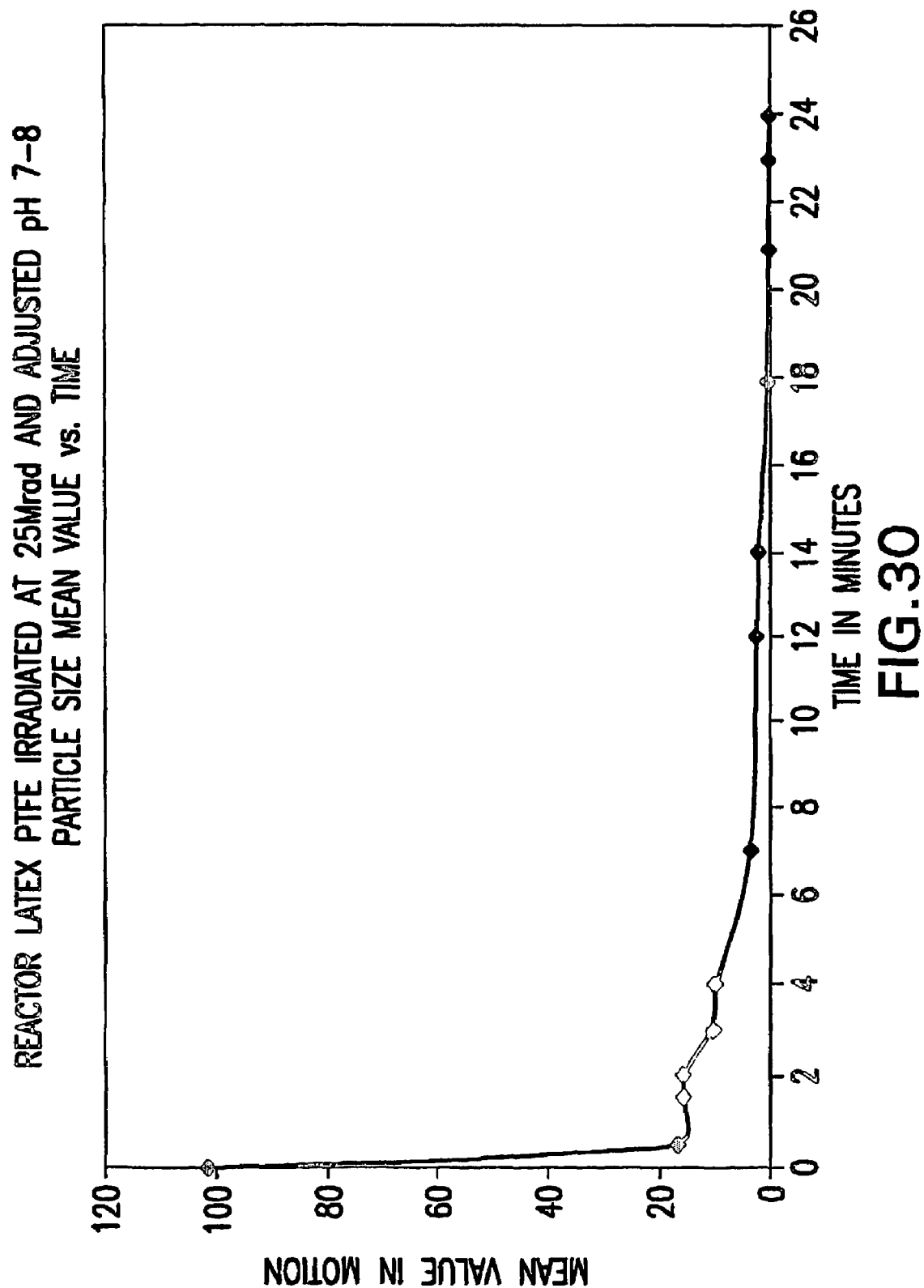
FIG. 30 shows a graph of the mean PTFE particle size of reactor latex PTFE samples irradiated at 25 Megarads and adjusted to a pH between 7 and 8 vs. time of sonication.
Figure 31:
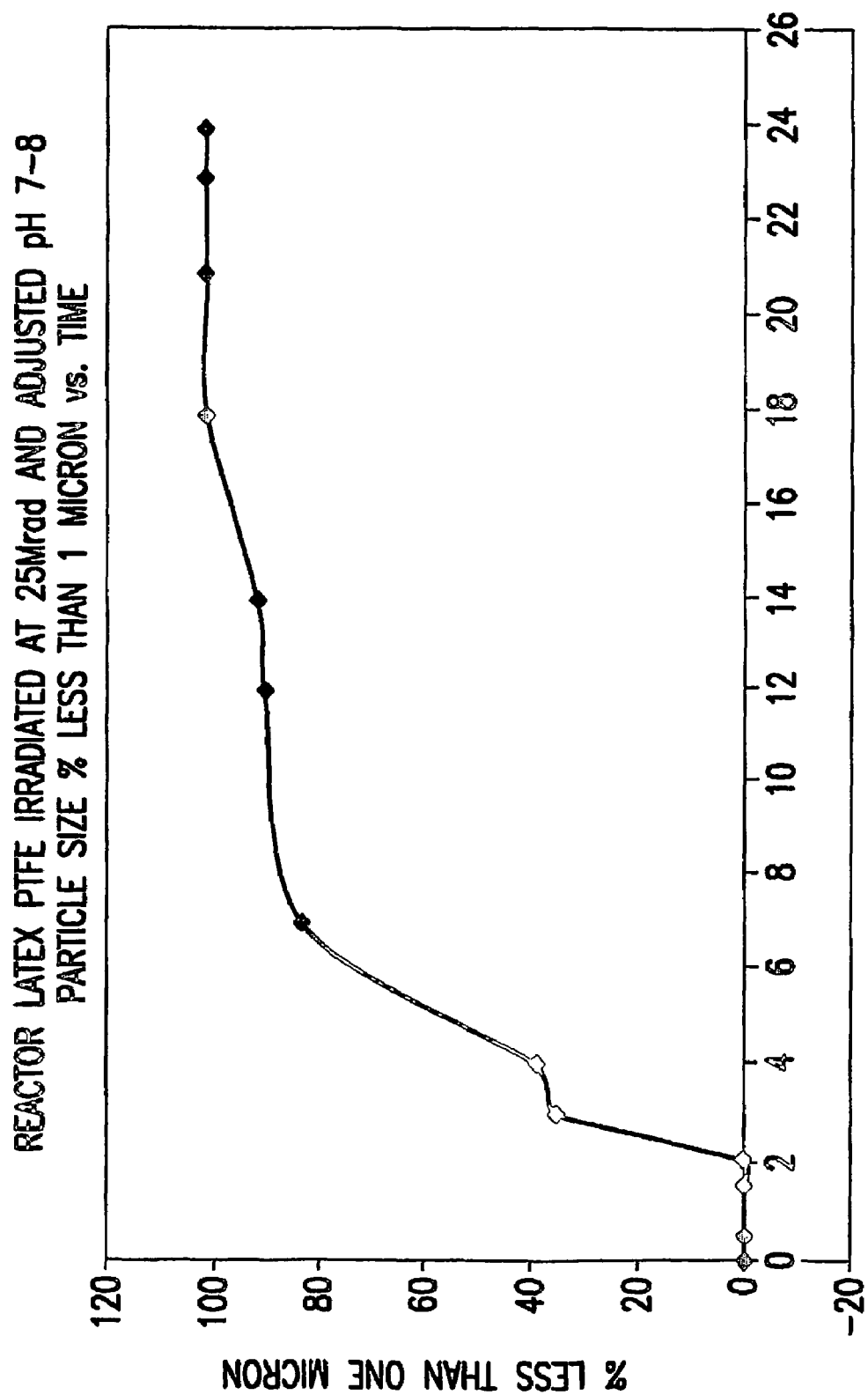
FIG. 31 shows a graph of the percentage of PTFE particles, from reactor latex PTFE irradiated at 25 Megarads and adjusted to a pH between 7 and 8, with a particle size less than 1.00 µm in size vs. time of sonication.

From the results recorded in Table 10 above, a plot was made of the particle size mean value of Sample 4.6 over time, and the plot is included as FIG. 30. As time increased to about 18 or more minutes, the PTFE particles in the sample were shown to be well dispersed to submicron size in that the mean particle size value was submicron after about 18 minutes. Similarly, a plot was made showing how the percentage of the PTFE particles that were less than 1.00 μm in size increased over time. The plot is included as FIG. 31, and after about 18 minutes of sonication and particle size analysis, it is evident that close to 100% of the PTFE particles were less than 1.00 μm in size and thus were dispersed to submicron size.

Lastly, in this Example, detailed particle size data was obtained for Sample 4.11, the sample of PTFE powder where the PTFE reactor latex starting material had been irradiated at a dose of 55 megarads. The sonication and particle size measurements persisted for 5 minutes, and the data obtained was recorded in Table 11 below:

TABLE 11

Particle Size Distribution Data for PTFE Powder Sample 4.11
(Reactor Latex Irradiated at 55 Megarads)

Figure 32A:
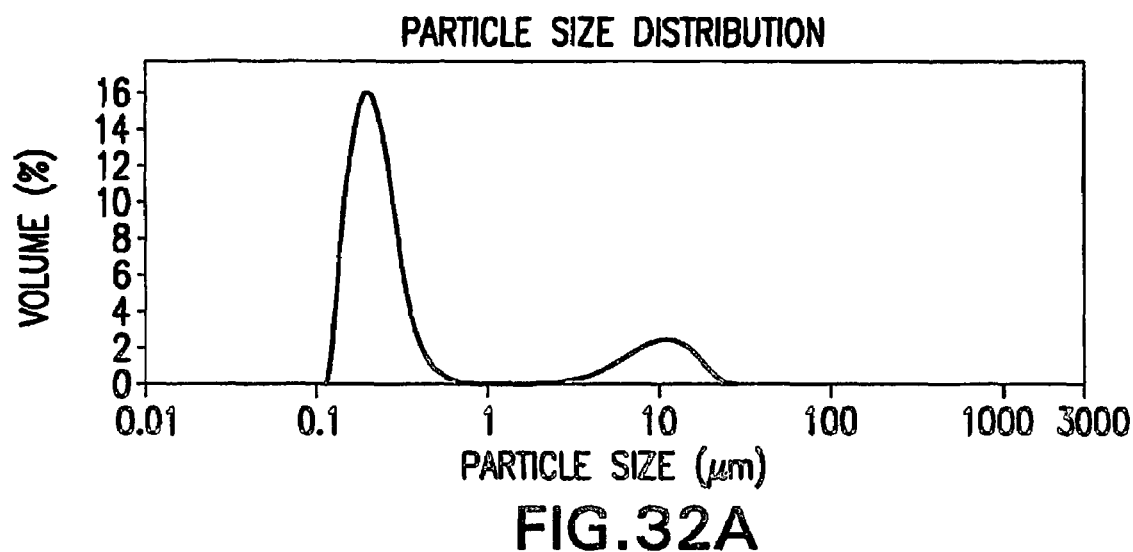
FIG. 32 shows a graph of particle size distribution data of PTFE powder from reactor latex PTFE irradiated at 55 Megarads and sonicated for (a) 0 minutes; (b) 1 minutes; (c) 2 minutes; (d) 3 minutes; (e) 4 minutes; (f) 5 minutes.
Figure 32B:
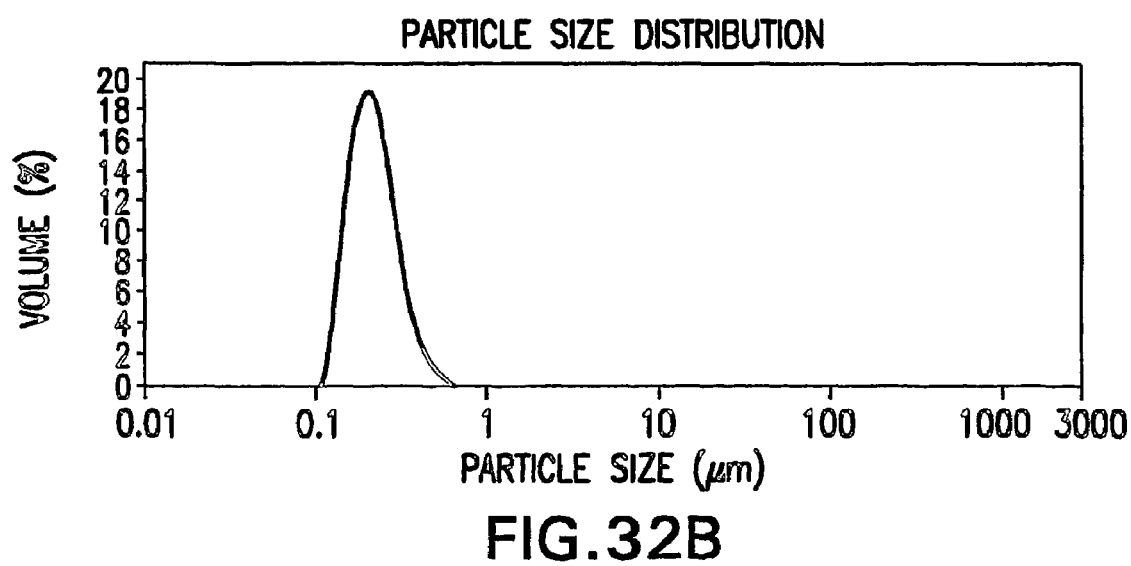
Figure 32C:
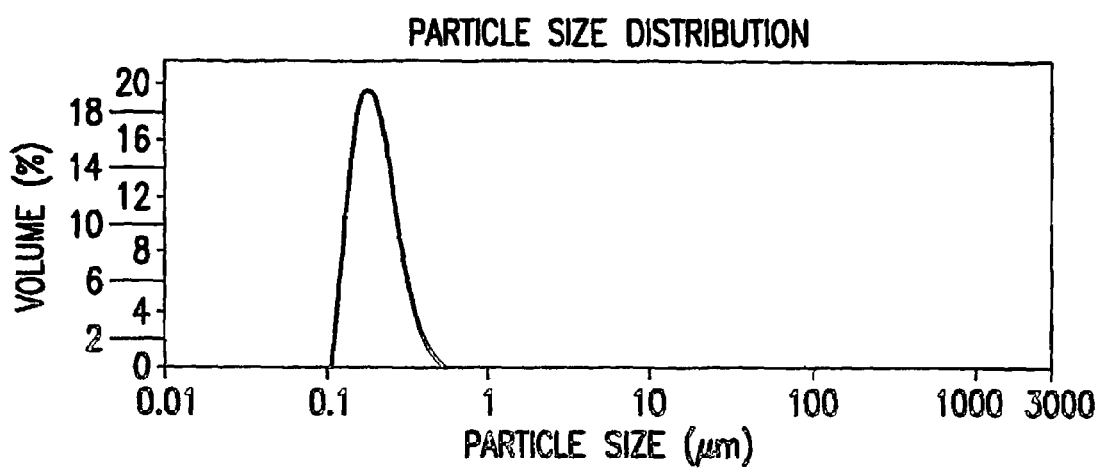
Figure 32D:
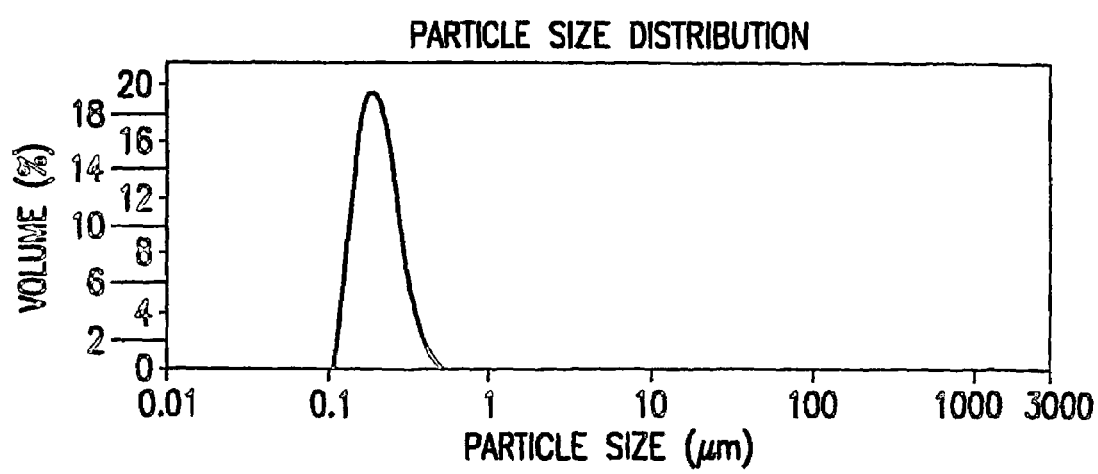
Figure 32E:
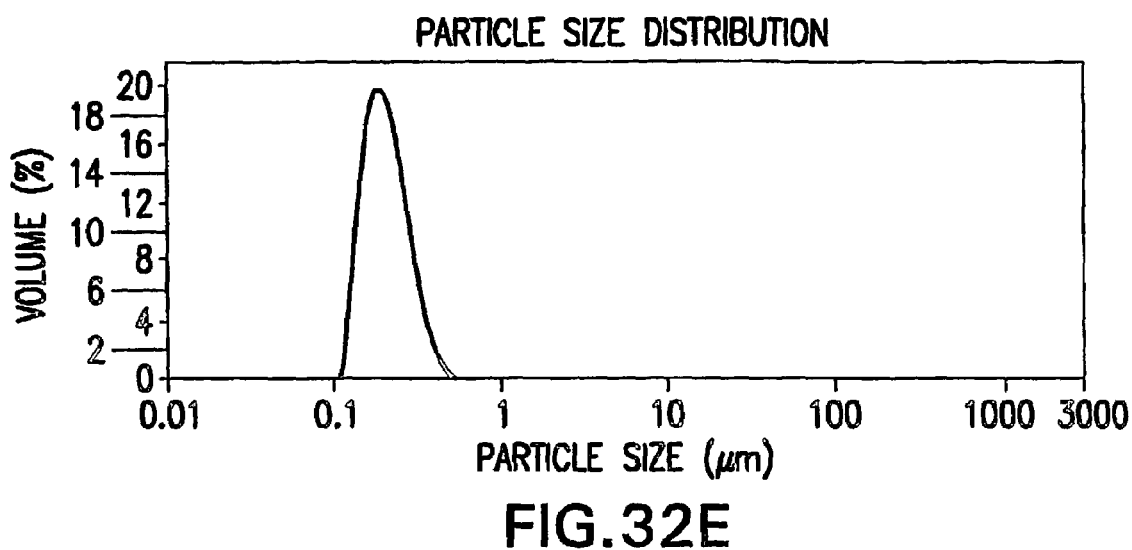
Figure 32F:
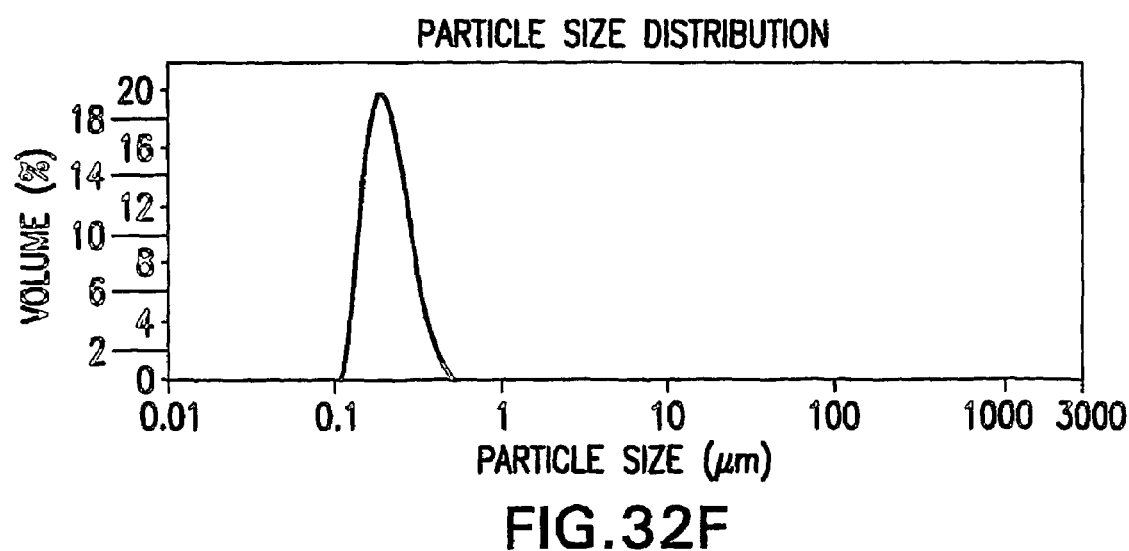

| Time of Sonication/Particle Size Measurement (Minutes) | Mean Value Particle Size (μm) | Percentage of PTFE Particles Below 1.00 μm in Size (%) | FIGURE Number (Showing Particle Size Distribution Graph) |
| --- | --- | --- | --- |
| 0 | 2.182 | 81.48 | FIG. 32(A) |
| 1 | 0.237 | 100.00 | FIG. 32(B) |
| 2 | 0.224 | 100.00 | FIG. 32(C) |
| 3 | 0.223 | 100.00 | FIG. 32(D) |
| 4 | 0.223 | 100.00 | FIG. 32(E) |
| 5 | 0.223 | 100.00 | FIG. 32(F) |

Figure 33:
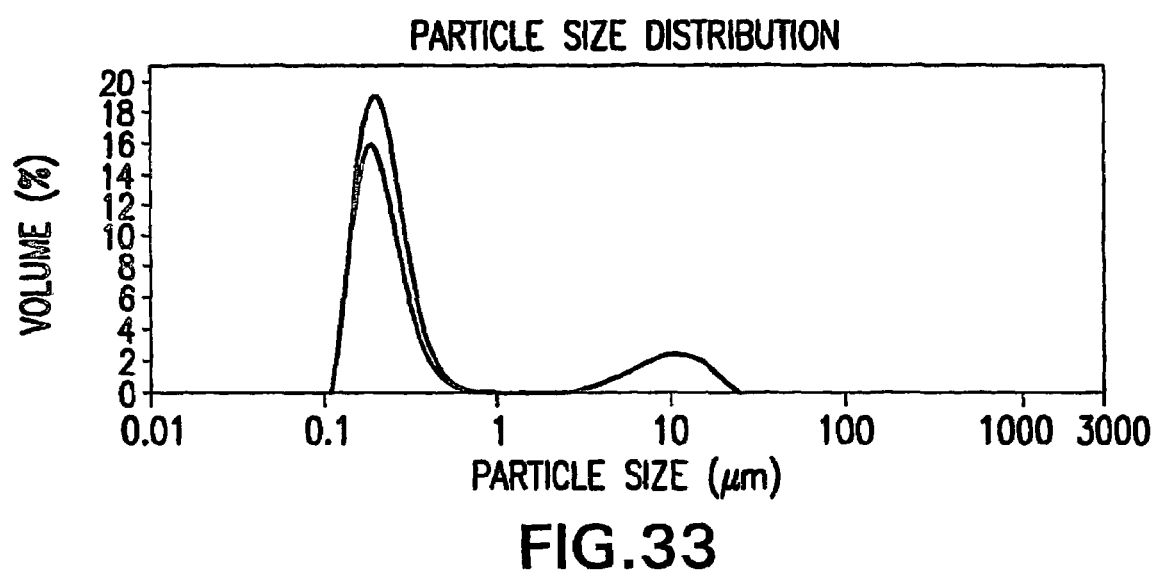
FIG. 33 shows a graph of the particle size distribution curves of PTFE powder from reactor latex PTFE irradiated at 55 Megarads and sonicated for 0 minutes and 1 minute superimposed to show how the particle size distribution changed during the 1-minute period of sonication.

Note that FIG. 32(B), the particle size distribution graph obtained after only about 1 minute of sonication, represents the point at which 100% of the PTFE particle in Sample 4.11 were below 1.00 μm in size. Thus, a particle size distribution graph showing the two distribution curves taken during the approximately 1 minute time period was obtained and is included as FIG. 33. The results shown in FIG. 33 allow the user to see how the particle size distribution curve quickly changed during the 1-minute period of sonication and particle size measurement for Sample 4.11.

Figure 34:
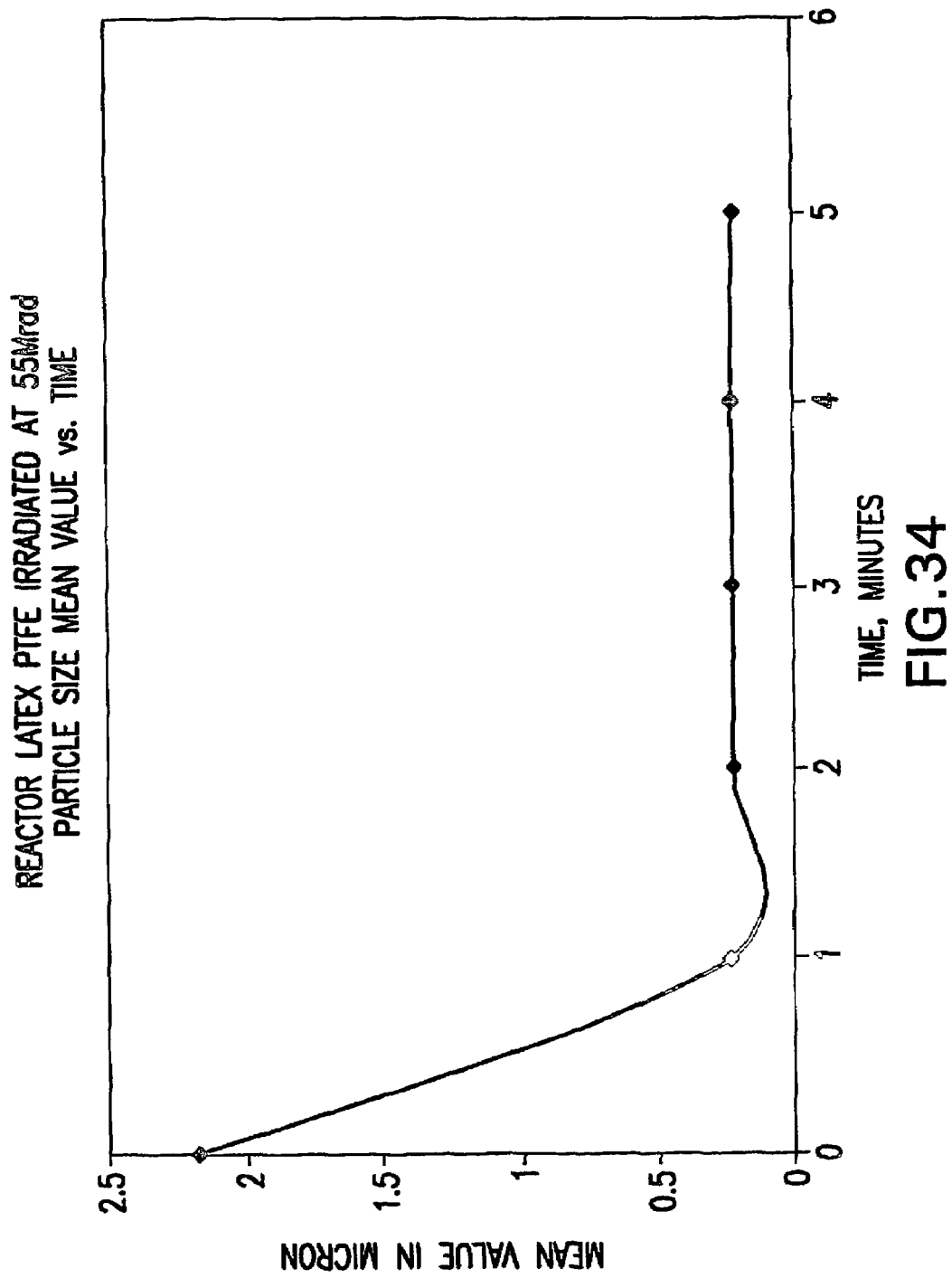
FIG. 34 shows a graph of the mean PTFE particle size of samples irradiated at 55 Megarads vs. time of sonication.

From the results recorded in Table 11 above, a plot was made of the particle size mean value of Sample 4.11 over time, and the plot is included as FIG. 34. As time increased to only 1 minute, the PTFE particles in the sample were shown to be well dispersed to submicron size in that the mean particle size value was submicron after less than about 1 minute. Similarly, a plot was made showing how the percentage of the PTFE particles that were less than 1.00 μm in size increased over time. The plot is included as FIG. 35, and after only about 1 minute of sonication and particle size analysis, it was evident that 100% of the PTFE particles were less than 1.00 μm in size and thus were dispersed to submicron size.

The results of Example 4 generally show that as the dose of electron beam irradiation to which the PTFE reactor latex samples were exposed increased, the PTFE particles in the dry submicron PTFE powder dispersed to submicron in size in significantly less time. For example, for Sample 4.1, which had been irradiated at a dose of only 5 megarads, the sonication during particle size analysis had to continue for about 18-19 minutes or more in order for the PTFE particles in PTFE powder Sample 4.1 to disperse to submicron in size. In contrast, however, for Sample 4.11, which had been irradiated at a dose of 55 megarads, the sonication during particle size analysis only had to continue for less than 1 minute in order for the PTFE particles in PTFE powder Sample 4.11 to disperse to submicron in size.

The invention claimed is:

1. A method for preparing a sample of polytetrafluoroethylene (PTFE) for dispersal as submicron size PTFE particles in an application system, wherein the application system may be aqueous or organic, the method comprising the steps of: (a) placing PTFE raw material in reactor latex form in an environment that suppresses surface oxidation of the PTFE raw material; (b) irradiating the PTFE raw material with radiation having an intensity of about 5 to about 120 megarads; and (c) collecting a portion of the irradiated PTFE material as the sample for dispersal in an application system.

2. The method of claim 1 wherein the PTFE raw material in reactor latex form is produced in a reactor by an emulsion polymerization process.

3. The method of claim 1 wherein the PTFE raw material in reactor latex form comprises from about 10% to about 40% weight of PTFE in water.

4. The method of claim 1 wherein steps (a) and (b) are performed in the absence of additional surfactants, wetting agents, rheology agents, and pH-adjusting agents.

5. The method of claim 1 wherein the PTFE raw material in reactor latex form obtained at step (a) is stabilized by an additive selected from the group of surfactants, wetting agents, rheology agents, and pH-adjusting agents and combinations thereof.

6. The method of claim 1 wherein the radiation at step (b) comprises electron beam radiation.

7. The method of claim 1 wherein the radiation at step (b) comprises gamma rays.

8. The method of claim 1 wherein the portion of the irradiated PTFE material collected as the sample comprises about 25% solid material by weight of PTFE.

9. The method of claim 1 further comprising the step (d) of concentrating the irradiated PTFE material prior to step (c).

10. The method of claim 9 wherein the portion of the irradiated PTFE material collected as the sample comprises about 50% to 70% solid material by weight of PTFE.

11. The method of claim 9, further comprising the step (e) of recovering dry PTFE material from the PTFE material concentrated at step (d).

12. The method of claim 11, wherein step (e) is a process step selected from the group of filtration, drying, centrifugation, evaporation and a combination thereof.

13. The method of claim 12, further comprising performing a particle size analysis of a part of the result of step (e).

14. The method of claim 1 wherein steps (a) and (b) are performed concurrently.

15. A method of dispersing submicron size PTFE particles in an application system, wherein said application system may be aqueous or organic, the method comprising mixing a sample of PTFE prepared by the method of claim 1 into the application system, whereby submicron size PTFE particles are dispersed in the application system.

16. The method of claim 15 further comprises mixing additives to the application system along with a sample of PTFE prepared by the method of claim 1.

17. The method of claim 15, wherein the application system is one of a resin, a polymer, a monomer, a wax and a combination thereof, and wherein the mixing is performed using a device selected from the group consisting of a single screw melt extruder, a twin screw melt extruder, a multi-screw melt extruder, a banburry mixer and a dispersion mixer.

18. A polytetrafluoroethylene (PTFE) powder for dispersal as submicron size PTFE particles in an application system, wherein the PTFE powder is prepared using the method of claim 1, and wherein the PTFE powder is free-flowing, readily dispersible, non-agglomerating, not sticky, and does not exhibit fibrillation.

19. An application system comprising polytetrafluoroethylene (PTFE) prepared using the method of claim 1, wherein the PTFE is dispersed in the application system as submicron sized particles, and wherein more than about 50% of the dispersed PTFE particles are below about 1.00 μm in size.

* * * * *

UNITED STATES PATENT AND TRADEMARK OFFICE
CERTIFICATE OF CORRECTION

PATENT NO. : 7,491,791 B2  Page 1 of 1
APPLICATION NO. : 10/543514
DATED : February 17, 2009
INVENTOR(S) : Charles A. Cody et al.

It is certified that error appears in the above-identified patent and that said Letters Patent is hereby corrected as shown below:

Title Page; should read;
(75) Charles A. Cody, Nashville IN

Signed and Sealed this

Fourteenth Day of July, 2009

JOHN DOLL
*Acting Director of the United States Patent and Trademark Office*